(12) United States Patent
Horimai

(10) Patent No.: US 7,215,628 B2
(45) Date of Patent: May 8, 2007

(54) OPTICAL INFORMATION RECORDING APPARATUS AND METHOD USING HOLOGRAPHY

(75) Inventor: Hideyoshi Horimai, Kanagawa (JP)

(73) Assignee: Optware Corporation, Kanagawa (JP)

( * ) Notice: Subject to any disclaimer, the term of this patent is extended or adjusted under 35 U.S.C. 154(b) by 494 days.

(21) Appl. No.: 10/433,644

(22) PCT Filed: Dec. 6, 2001

(86) PCT No.: PCT/JP01/10681

§ 371 (c)(1),
(2), (4) Date: Oct. 9, 2003

(87) PCT Pub. No.: WO02/49018

PCT Pub. Date: Jun. 20, 2002

(65) Prior Publication Data

US 2004/0062178 A1 Apr. 1, 2004

(30) Foreign Application Priority Data

Dec. 11, 2000 (JP) .............................. 2000-375452

(51) Int. Cl.
*G11B 7/00* (2006.01)
*G11B 7/135* (2006.01)
(52) U.S. Cl. .................. 369/103; 369/112.17
(58) Field of Classification Search ............ None
See application file for complete search history.

(56) References Cited

U.S. PATENT DOCUMENTS

| 4,104,489 | A |   | 8/1978  | Satoh et al. |
| 4,224,480 | A |   | 9/1980  | Satoh et al. |
| 4,550,395 | A |   | 10/1985 | Carlson et al. |
| 4,918,679 | A | * | 4/1990  | Opheij et al. ............ 369/44.23 |
| 5,056,080 | A | * | 10/1991 | Russell ........................ 369/100 |
| 5,144,604 | A |   | 9/1992  | Sugiura |
| 5,465,248 | A |   | 11/1995 | Fuji |
| 5,835,470 | A | * | 11/1998 | Campbell et al. ........... 369/103 |
| 5,917,798 | A |   | 6/1999  | Horimai et al. |
| 5,978,112 | A |   | 11/1999 | Psaltis et al. |
| 6,088,321 | A | * | 7/2000  | Yamaji et al. ............... 369/103 |
| 6,272,095 | B1| * | 8/2001  | Liu et al. ..................... 369/103 |

FOREIGN PATENT DOCUMENTS

EP    1 065 658 A1    1/2001

(Continued)

*Primary Examiner*—Brian E. Miller
*Assistant Examiner*—Peter Vincent Agustin
(74) *Attorney, Agent, or Firm*—Oliff & Berridge PLC

(57) ABSTRACT

It is an object of the invention to allow the use of a practical light source to record information in each information recording area of a recording medium having a plurality of information recording areas through the use of holography while moving the recording medium.

When recording information in the information recording areas (7) of the recording medium, the irradiating position (101) of information light and recording-specific reference light is moved such that the irradiating position (101) follows a single moving information recording area (7) for a predetermined period. Consequently, the single information recording area (7) keeps being irradiated with the information light and the recording-specific reference light for the predetermined period. Information is thus recorded in this information recording area (7) in the form of an interference pattern as a result of interference between the information light and the recording-specific reference light.

8 Claims, 36 Drawing Sheets

FOREIGN PATENT DOCUMENTS

| | | |
|---|---|---|
| JP | A-54-115145 | 9/1979 |
| JP | A-62-16246 | 1/1987 |
| JP | A-2-163789 | 6/1990 |
| JP | A-3-52126 | 3/1991 |
| JP | A-3-58323 | 3/1991 |
| JP | A-3-288338 | 12/1991 |
| JP | A-5-182266 | 7/1993 |
| JP | A-6-195793 | 7/1994 |
| JP | A-6-266275 | 9/1994 |
| JP | A-8-161763 | 6/1996 |
| JP | A-8-287499 | 11/1996 |
| JP | A-9-161309 | 6/1997 |
| JP | A-10-124872 | 5/1998 |
| JP | A-10-302293 | 11/1998 |
| JP | A-133842 | 5/1999 |
| JP | A-11-311936 | 11/1999 |
| JP | A-11-311937 | 11/1999 |
| JP | A-11-311938 | 11/1999 |

* cited by examiner

OPTICAL INFORMATION RECORDING APPARATUS AND METHOD USING HOLOGRAPHY

TECHNICAL FIELD

The present invention relates to an optical information recording apparatus and method for recording information in each information recording area of a recording medium having a plurality of information recording areas through the use of holography.

BACKGROUND ART

In general, holographic recording for recording information in a recording medium through the use of holography is performed by superimposing light that carries image information on reference light within the recording medium and by writing a resultingly generated interference pattern into the recording medium. For reproducing the information recorded, the recording medium is irradiated with reference light such that the image information is reproduced through diffraction derived from the interference pattern.

In recent years, volume holography, or digital volume holography in particular, has been developed and is attracting attention in practical fields for ultra-high density optical recording. Volume holography is a method for writing a three-dimensional interference pattern by making positive use of a recording medium in a direction of its thickness as well, and is characterized in that it is possible to enhance the diffraction efficiency by increasing the thickness of the medium, and a greater recording capacity can be achieved by employing multiplex recording. Digital volume holography is a computer-oriented holographic recording method which uses the same recording medium and recording method as with the volume holography, whereas the image information to be recorded is limited to binary digital patterns. In the digital volume holography, analog image information such as a picture is once digitized and developed into two-dimensional digital pattern information, and then it is recorded as image information. For reproduction, this digital pattern information is read and decoded to restore the original image information for display. Consequently, even if the signal-to-noise ratio (hereinafter referred to as SN ratio) during reproduction is somewhat poor, it is possible reproduce the original information with extremely high fidelity by performing differential detection and/or error correction on the binary data encoded.

By the way, typical recording apparatuses that record information on a disk-shaped recording medium through the use of light comprise an optical head for irradiating the recording medium with light for information recording. In these recording apparatuses, the recording medium is rotated while the optical head irradiates the recording medium with the light for information recording, thereby recording information on the recording medium. In these recording apparatuses, a semiconductor laser is typically used as the light source for generating the light for information recording.

For holographic recording, as in the typical recording apparatuses described above, the recording medium can also be rotated while the recording medium is irradiated with information light and reference light so that information is recorded in a plurality of information recording areas of the recording medium in succession. In this case, as with the typical recording apparatuses, a practical semiconductor laser is desirably used as the light source of the information light and the reference light.

When existing photosensitive material for holography is used to make a recording medium for holographic recording and this recording medium is rotated while the recording medium is irradiated with the information light and the reference light that are generated by a semiconductor laser, however, there arises a problem as follows. That is, in this case, it is difficult to give exposure energy sufficient to record information in the form of an interference pattern to a single information recording area of the recording medium in a short time. To cope with this, the exposure time may be extended to give sufficient exposure energy to a single information recording area. Nevertheless, this can increase the moving distance of the information recording areas within the exposure time for a single information recording area, resulting in deterioration in information accuracy.

Here, the forgoing problem will be detailed with a concrete example. If a high-power light source such as a pulse laser is used as the light source instead of a semiconductor laser, then it is satisfactorily possible to record information on the recording medium while rotating the recording medium. Take, for example, the case where a pulse laser which has a maximum power of several kilowatts and is capable of generating pulsed light of several tens of nanoseconds is used as the light source. Here, assume the light intensity on the recording medium to be 200 W. The pulse width of the pulsed light shall be 20 ns, and the linear speed of the information recording areas 2 m/s. In this case, the moving distance of the information recording areas within the exposure time for a single information recording area is 0.04 μm, not exceeding one tenth of the wavelength of the light, so that it is possible to maintain sufficient information accuracy. The use of such a pulse laser as described above for the light source is impractical, however.

Next, turn to the case where a semiconductor laser is used as the light source. Here, assume that the light intensity on the recording medium is 20 mW and the linear speed of the information recording areas is 2 m/s. In this case, an exposure time of 200 μs, or 10000 times as much as with the foregoing pulse laser, is required in order to give a single information recording area the same amount of exposure energy as with the pulse laser. The moving distance of the information recording areas for this exposure time reaches 400 μm, making it difficult to record information in the form of interference patterns.

DISCLOSURE OF THE INVENTION

It is an object of the invention to provide an optical information recording apparatus and method in which a practical light source can be used to record information in each information recording area of a recording medium having a plurality of information recording areas through the use of holography while moving the recording medium.

An optical information recording apparatus of the invention is an apparatus for recording information through the use of holography in each information recording area of a recording medium having a plurality of information recording areas. The apparatus comprises:

an irradiating device for irradiating the recording medium with information light and reference light such that information is recorded in the information recording areas in the form of interference patterns resulting from interference between the information light and the reference light;

a recording medium moving device for moving the recording medium; and an irradiating position moving device for moving an irradiating position of the information light and the reference light such that the irradiating position of the information light and the reference light follows a single moving information recording area for a predetermined period.

In the optical information recording apparatus of the invention, the recording medium moving device moves the recording medium, and the irradiating device irradiates this recording medium with the information light and the reference light. The irradiating position moving means device the irradiating position of the information light and the reference light such that the irradiating position of the information light and the reference light follows a single moving information recording area for a predetermined period. Consequently, the single information recording area keeps being irradiated with the information light and the reference light for the predetermined period. It is therefore possible to irradiate the information recording areas with the information light and the reference light for a sufficient time period to record information in the information recording areas without causing a deviation between the information recording areas and the irradiating position of the information light and the reference light.

In the optical information recording apparatus of the invention, the recording medium moving device may rotate the recording medium.

In the optical information recording apparatus of the invention, the irradiating position moving device may move the position of emission of the information light and the reference light in the irradiating means device.

In the optical information recording apparatus of the invention, the recording medium may contain identification information for identifying the individual information recording areas, and the optical information recording apparatus may further comprise a detector for detecting the identification information.

In the optical information recording apparatus of the invention, the recording medium may contain positioning information for adjusting the irradiating position of the information light and the reference light with respect to the individual information recording areas, and the optical information recording apparatus may further comprise means a detector for detecting the positioning information.

In the optical information recording apparatus of the invention, the irradiating device may apply the information light and the reference light to the same side of the information recording area coaxially such that they converge to become minimum in diameter at an identical position.

In the optical information recording apparatus of the invention, the irradiating device may apply the information light and the reference light to opposite sides of the information recording area coaxially such that they converge to become minimum in diameter at an identical position.

An optical information recording method of the invention is a method for recording information through the use of holography in each information recording area of a recording medium having a plurality of information recording areas. The method comprises the steps of:

moving the recording medium;

irradiating the recording medium with information light and reference light such that information is recorded in the information recording areas in the form of interference patterns resulting from interference between the information light and the reference light; and moving an irradiating position of the information light and the reference light such that the irradiating position of the information light and the reference light follows a single moving information recording area for a predetermined period.

In the optical information recording method of the invention, the information light and the reference light are applied to the recording medium while it is moving. In the step of moving the irradiating position, the irradiating position of the information light and the reference light is moved to follow a single moving information recording area for a predetermined period. Consequently, the single information recording area keeps being irradiated with the information light and the reference light for the predetermined period. It is therefore possible to irradiate the information recording areas with the information light and the reference light for a sufficient time period to record information in the information recording areas without causing a deviation between the information recording areas and the irradiating position of the information light and the reference light.

Other objects, features and advantages of the invention will become sufficiently clear from the following description.

BEST MODE FOR CARRYING OUT THE INVENTION

Hereinafter, embodiments of the invention will be described in detail with reference to the drawings.

[First Embodiment]

Figure 1:
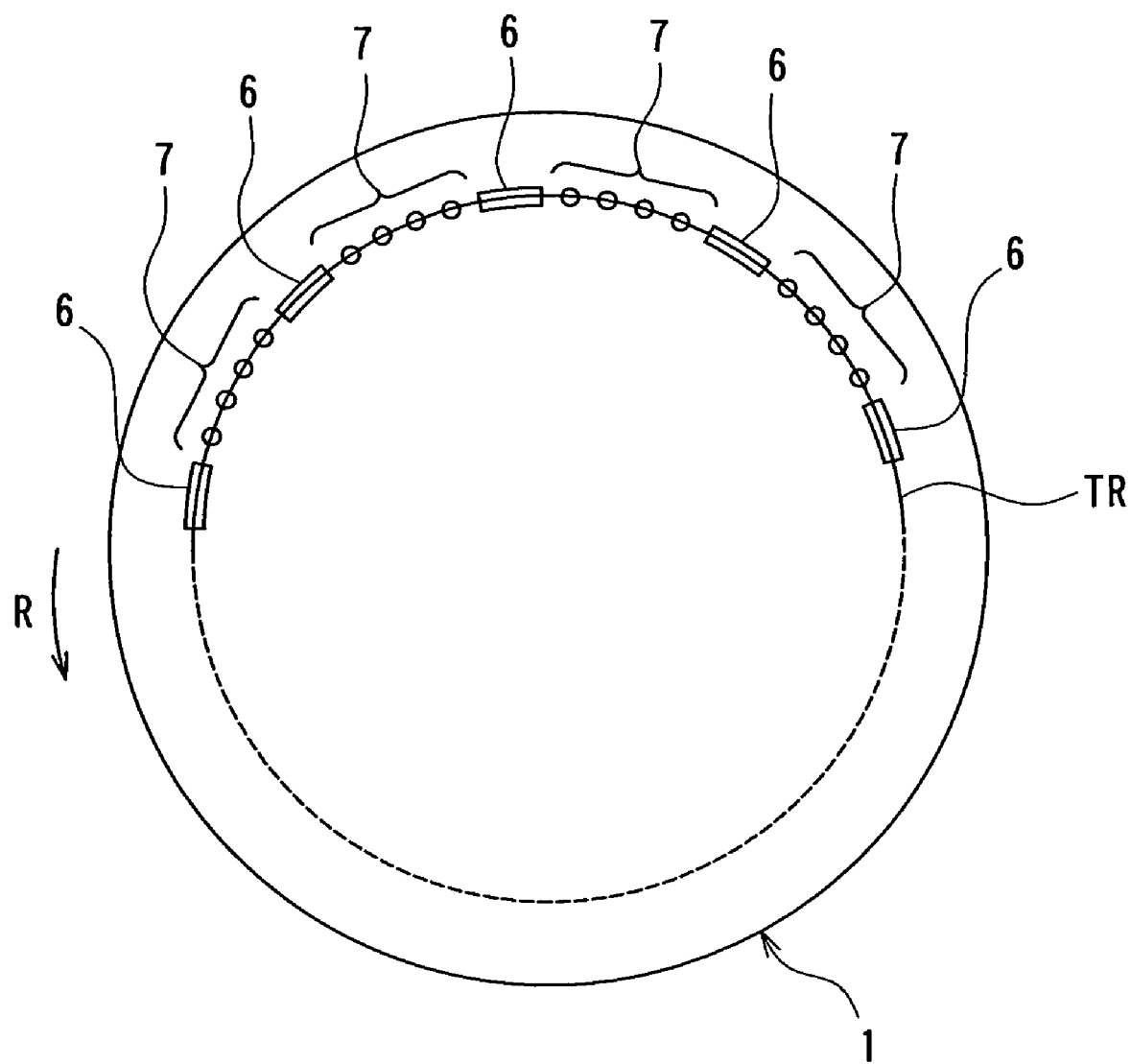
FIG. 1 is an explanatory diagram showing a recording medium used in a first embodiment of the invention.

First, with reference to FIG. 1, an overview will be given of a recording medium 1 used in a first embodiment of the invention. FIG. 1 shows a part of a track of the recording medium 1. The recording medium 1 is disk-shaped and has a plurality of tracks TR. Each of the tracks TR has a plurality of address servo areas 6 arranged at regular intervals. One or more information recording areas 7 are provided between adjacent ones of the address servo areas 6. FIG. 1 shows an example where four information recording areas 7 are arranged at regular intervals between adjacent ones of the address servo areas 6.

Information for generating a basic clock, i.e., a timing reference for various operations of an optical information recording/reproducing apparatus, information for performing focus servo using a sampled servo system, information for performing tracking servo using the sampled servo system, and address information are recorded in advance in the form of emboss pits in the address servo areas 6. However, the information for performing focus servo is not necessarily required to be recorded in the address servo areas 6. In that case, focus servo may be performed using an interface between an air gap layer and a reflecting film to be described later. The address information is intended for identifying the individual information recording areas 7, and corresponds to the identification information of the invention. The information for generating a basic clock, the information for performing focus servo, and the information for performing tracking servo serve to adjust the irradiating positions of information light, recording-specific reference light, and reproduction-specific reference light with respect to the information recording areas 7, and correspond to the positioning information of the invention.

Now, with reference to FIG. 1, an overview will be given of an optical information recording method according to the present embodiment. In the present embodiment, to record information in the information recording areas 7 of the recording medium 1, the recording medium 1 is rotated (moved) in the direction shown by the symbol R in FIG. 1, for example. Address servo areas 6 and the information recording areas 7 thus move in the direction shown by the symbol R. An optical head to be described later irradiates the recording medium 1 with information light and recording-specific reference light so that information is recorded in the information recording areas 7 in the form of interference patterns resulting from interference between the information light and the recording-specific reference light. The optical head moves the irradiating position of the information light and the recording-specific reference light such that the irradiating position follows a single moving information recording area 7 for a predetermined period. Consequently, the single information recording area 7 keeps being irradiated with the information light and the recording-specific reference light for the predetermined period. It is therefore possible to irradiate the information recording areas 7 with the information light and the recording-specific reference light for a sufficient time period to record information in the information recording areas 7 without causing a deviation between the information recording areas 7 and the irradiating position of the information light and the recording-specific reference light.

Next, with reference to FIG. 2, description will be given of a configuration of an optical information recording/reproducing apparatus including an optical information recording apparatus according to the present embodiment. The optical information recording/reproducing apparatus 10 has: a spindle 81 on which the recording medium 1 is mounted; a spindle motor 82 for rotating the spindle 81; and a spindle servo circuit 83 for controlling the spindle motor 82 to keep the rotation speed of the recording medium 1 at a predetermined value. The optical information recording/reproducing apparatus 10 further has an optical head 40 and a driving device 84. The optical head 40 is provided for irradiating the recording medium 1 with information light and recording-specific reference light to thereby record information, and for irradiating the recording medium 1 with reproduction-specific reference light and detecting reproduction light to thereby reproduce information recorded in the recording medium 1. The driving device 84 allows the optical head 40 to be movable in a direction of the radius of the recording medium 1.

The optical information recording/reproducing apparatus 10 further has a detection circuit 85, a focus servo circuit 86, a tracking servo circuit 87, and a slide servo circuit 88. The detection circuit 85 detects a focus error signal FE, a tracking error signal TE and a reproduction signal RF from the output signal of the optical head 40. The focus servo circuit 86 performs focus servo by moving a head body of the optical head 40, which will be described later, in a direction perpendicular to the surface of the recording medium 1 based on the focus error signal FE detected by the detection circuit 85. The tracking servo circuit 87 performs tracking servo by moving the head body in a direction of the radius of the recording medium 1 based on the tracking error signal TE detected by the detection circuit 85. The slide servo circuit 88 performs slide servo by controlling the driving device 84 to move the optical head 40 in a direction of the radius of the recording medium 1 based on the tracking error signal TE and a command from a controller to be described later.

The optical information recording/reproducing apparatus 10 further has a signal processing circuit 89, a controller 90, and an operating portion 91. The signal processing circuit 89 decodes data outputted by a CCD array in the optical head 40, which will be described later, to thereby reproduce data recorded in the information recording areas 7 of the recording medium 1. It also reproduces a basic clock and determines addresses from the reproduction signal RF from the detection circuit 85. The controller 90 controls the optical information recording/reproducing apparatus 10 as a whole, and the operating portion 91 supplies various instructions to the controller 90.

The optical information recording/reproducing apparatus 10 further has an inclination detection circuit 92 and an inclination correction circuit 93. The inclination detection circuit 92 detects relative inclination between the recording medium 1 and the head body based on the output signal of the signal processing circuit 89. Based on the output signal of this inclination detection circuit 92, the inclination correction circuit 93 changes the position of the head body in such directions that the head body changes in inclination with respect to the surface of the recording medium 1, and thereby corrects the relative inclination between the recording medium 1 and the head body.

The optical information recording/reproducing apparatus 10 further has a follow-up control circuit 94. The follow-up control circuit 94 moves the head body in a direction generally along the tracks at the time of recording information, so that the irradiating position of the information light and the recording-specific reference light is controlled to follow a single moving information recording area 7 for a predetermined period.

The controller 90 receives input of the basic clock and address information outputted by the signal processing circuit 89 and controls the parts such as the optical head 40, the spindle servo circuit 83, the slide servo circuit 88 and the follow-up control circuit 94. The spindle servo circuit 83 receives input of the basic clock outputted by the signal processing circuit 89. The controller 90 has a CPU (central processing unit), a ROM (read only memory) and a RAM (random access memory). The CPU executes programs stored in the ROM using the RAM as a work area to perform the functions of the controller 90.

Figure 3:
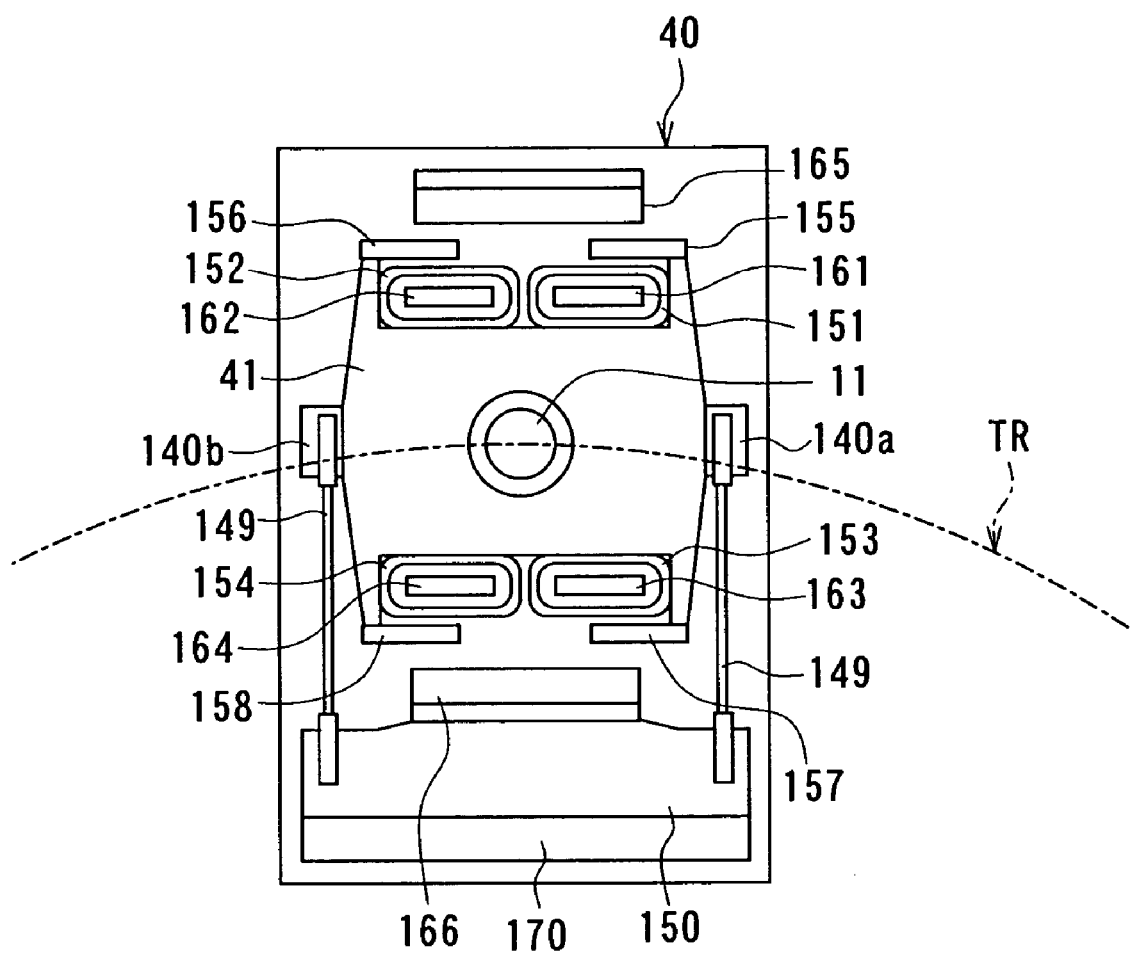
FIG. 3 is a plan view of an optical head according to the first embodiment of the invention.

Next, with reference to FIG. 3, description will be given of a driving mechanism of the head body of the optical head 40. FIG. 3 is a plan view of the optical head 40. In FIG. 3, the symbol TR represents a track of the recording medium 1. The optical head 40 has the head body 41 which records information on the recording medium 1 and reproduces information from the recording medium 1. The head body 41 has an objective lens 11 opposing to the recording medium 1. Elastic arm fixing portions 140a and 140b are provided at both ends of the head body 41 in a direction tangential to the track (horizontal directions in FIG. 3). Elastic arms 149 made of elastic members such as rubber, a plate spring, a coil spring, and a wire are fixed at one end each to these elastic arm fixing portions 140a and 140b. The other ends of the elastic arms 149 are fixed to an arm support portion 150. The arm support portion 150 is attached to a piezoelectric actuator 170 which is capable of moving this arm support portion 150 in a direction of the radius of the recording medium 1 (vertical directions in FIG. 3) within a predetermined range.

Coils 151, 152 for focus servo and inclination adjustment, and coils 155, 156 for irradiating position follow-up, are attached to one end of the head body 41 along a direction of the radius of the recording medium 1. Likewise, coils 153, 154 for focus servo and inclination adjustment, and coils 157, 158 for irradiating position follow-up, are attached to the other end of the head body 41 along the direction of the radius of the recording medium 1.

The optical head 40 further has: magnets 161, 162, 163, and 164 which are arranged to penetrate through the coils 151, 152, 153, and 154, respectively; a magnet 165 which is located in a position opposite to the coils 155 and 156; and a magnet 166 which is located in a position opposite to the coils 157 and 158.

In the optical head 40, the coils 151 to 154 and the magnets 161 to 164 can change the position of the head body 41 in a direction perpendicular to the surface of the recording medium 1 (a direction perpendicular to the plane of the drawing sheet of FIG. 3) and in such a direction that the head body 41 varies in inclination with respect to the surface of the recording medium 1. Moreover, in the optical head 40, the piezoelectric actuator 170 can change the position of the head body 41 in a direction of the radius of the recording medium 1. Furthermore, in the optical head 40, the elastic arms 149, the coils 155 to 158, and the magnets 165 and 166 can change the position of the head body 41 in a direction generally along the track TR. The elastic arms 149, the coils 155 to 158, and the magnets 165 and 166 correspond to the irradiating position moving device of the invention.

Figure 2:
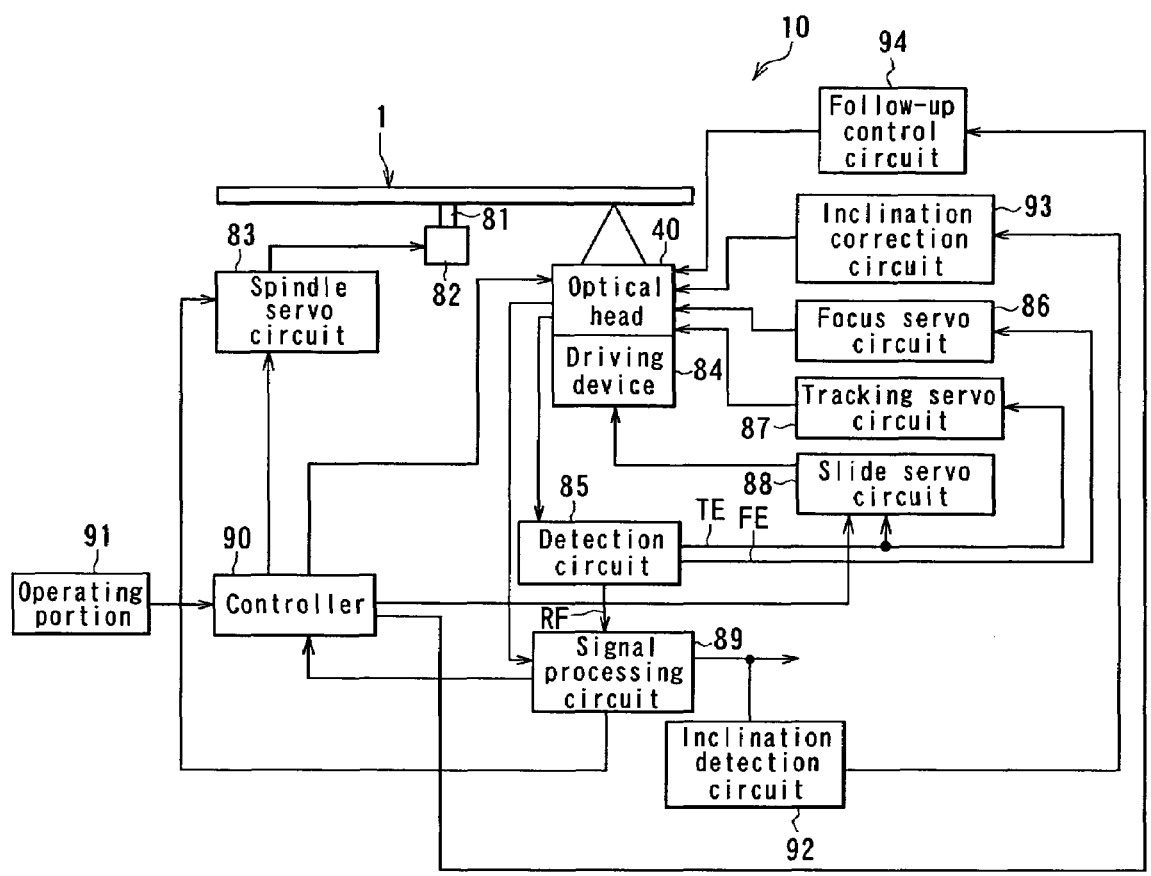
FIG. 2 is a block diagram showing a configuration of an optical information recording/reproducing apparatus according to the first embodiment of the invention.

The coils 151 to 154 are driven by the focus servo circuit 86 and the inclination correction circuit 93 in FIG. 2. The coils 155 to 158 are driven by the follow-up control circuit 94 in FIG. 2. The piezoelectric actuator 170 is driven by the tracking servo circuit 87 in FIG. 2.

Next, with reference to FIG. 4, description will be given of the configuration of the recording medium for use in the present embodiment. The recording medium 1 of the present embodiment comprises a disk-shaped transparent substrate 2 made of polycarbonate or the like, and an information recording layer 3, an air gap layer 4, and a reflecting film 5 that are arranged in this order from the transparent substrate 2, on a side of the transparent substrate 2 opposite from the light incident/exit side. The information recording layer 3 is a layer on which information is recorded through the use of holography, and is made of a hologram material which varies, when irradiated with light, in its optical characteristics such as refractive index, permittivity, and reflectance, depending on the intensity of the light. The available hologram material includes photopolymer HRF-600 (product name) manufactured by Dupont and photopolymer ULSH-500 (product name) manufactured by Aprils. The reflecting film 5 is made of aluminum, for example. Incidentally, in the recording medium 1, the information recording layer 3 and the reflecting film 5 may be arranged next to each other without the air gap layer 4.

Next, description will be given of the principle of information recording in the optical information recording/reproducing apparatus according to the present embodiment. In the embodiment, information light and recording-specific reference light are generated, and the information recording layer 3 of the recording medium 1 is irradiated with the information light and the recording-specific reference light so that information is recorded in the information recording layer 3 in the form of an interference pattern resulting from interference between the information light and the recording-specific reference light. The information light is generated by spatially modulating the phase of light based on the information to be recorded.

Hereinafter, the optical information recording method according to the present embodiment will be described in detail with reference to FIG. 4. FIG. 4 illustrates part of an example of a recording/reproducing optical system of the optical information recording/reproducing apparatus according to the embodiment. In this example, the recording/reproducing optical system has an objective lens 11 facing toward the transparent-substrate-2 side of the recording medium 1, and a beam splitter 12 and a phase spatial light modulator 13 that are arranged in this order from the objective lens 11, on a side of the objective lens 11 opposite from the recording medium 1. The beam splitter 12 has a semi-reflecting surface 12a that is inclined at 45° in the normal direction with respect to the direction of the optical axis of the objective lens 11. The recording/reproducing optical system shown in FIG. 4 also has a photodetector 14. The photodetector 14 is provided in a direction in which return light from the recording medium 1 is reflected by the semi-reflecting surface 12a of the beam splitter 12. The phase spatial light modulator 13 has a number of pixels arranged in a matrix, and is capable of spatially modulating the phase of light by selecting the phase of outgoing light for each of the pixels. The photodetector 14 also has a number of pixels arranged in a matrix, and is capable of detecting the intensity of received light for each of the pixels.

Figure 4:
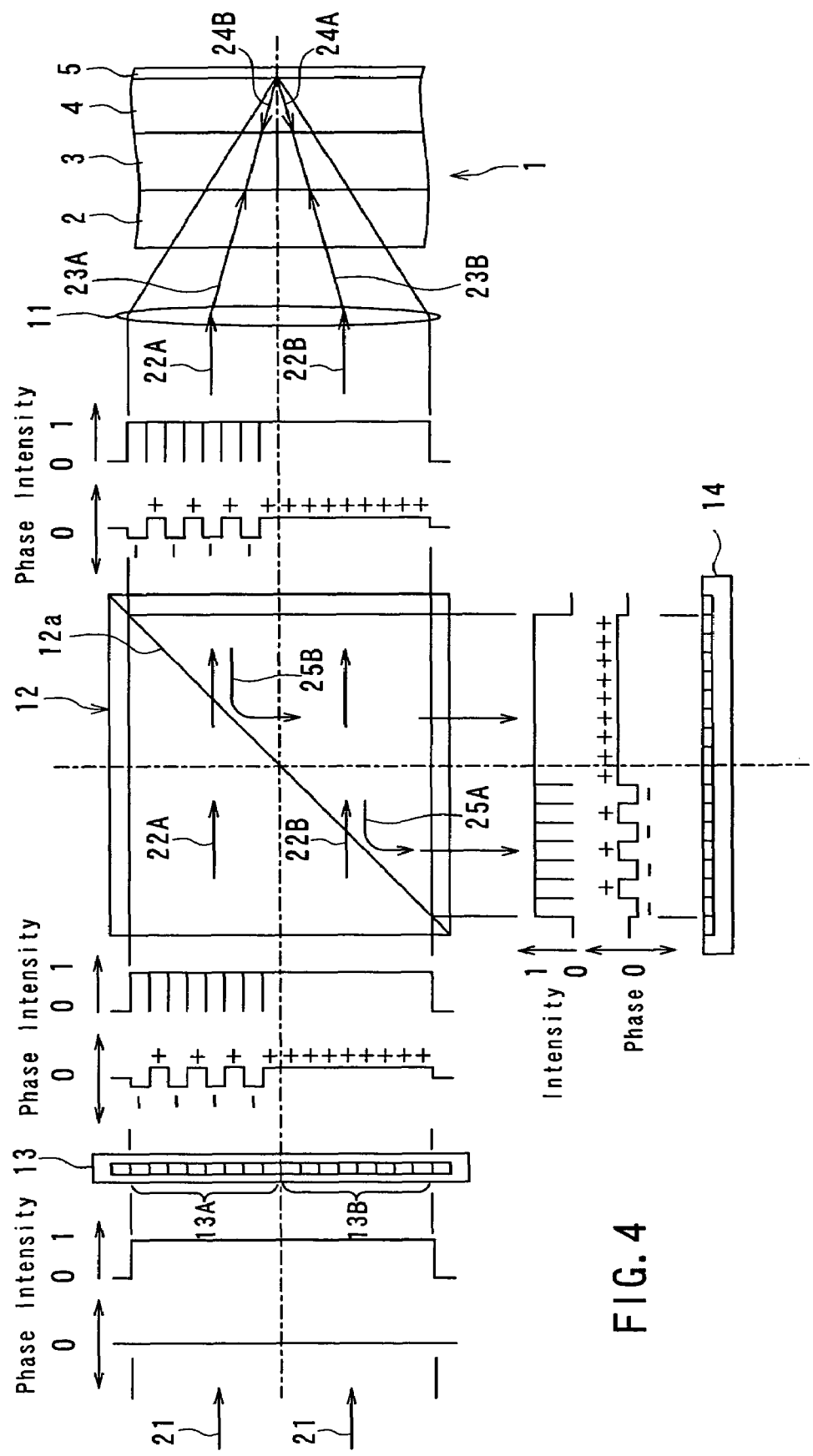
FIG. 4 is an explanatory diagram illustrating the principle of information recording in the first embodiment of the invention.

In the example shown in FIG. 4, the phase spatial light modulator 13 generates the information light and the recording-specific reference light. Coherent parallel light having a constant phase and intensity is incident on the phase spatial light modulator 13. For information recording, the phase spatial light modulator 13, in a half area 13A thereof, selects the phase of the outgoing light for each pixel based on the information to be recorded, thereby modulating the phase of the light spatially to generate the information light. In the other half area 13B, it renders the phase of the outgoing light identical for all the pixels to generate the recording-specific reference light.

In the area 13A, the phase spatial light modulator 13 sets the phase of the light after the modulation for each pixel, to either a first phase having a phase difference of $+\pi/2$ (rad) with respect to a predetermined reference phase, or a second phase having a phase difference of $-\pi/2$ (rad) with respect to the reference phase. The phase difference between the first phase and the second phase is $\pi$ (rad). Incidentally, in the area 13A, the phase spatial light modulator 13 may set the phase of the light after the modulation at any of three or more values for each pixel. In the area 13B, the phase spatial light modulator 13 sets the phase of the outgoing light for every pixel to the first phase having a phase difference of $+\pi/2$ (rad) with respect to the predetermined reference phase. Incidentally, in the area 13B, the phase spatial light modulator 13 may set the phase of the outgoing light for every pixel to the second phase or a certain phase different from both the first phase and the second phase.

FIG. 4 shows the phases and intensities of incident light on the phase spatial light modulator 13, outgoing light from the phase spatial light modulator 13, incident light on the objective lens 11 yet to be applied to the recording medium 1, and return light from the recording medium 1 reflected by the semi-reflecting surface 12a of the beam splitter 12. In FIG. 4, the symbol "+" represents the first phase, and the symbol "−" the second phase. FIG. 4 also shows the maximum value of intensity as "1" and the minimum value of intensity as "0".

In the example shown in FIG. 4, for information recording, coherent parallel light 21 having a constant phase and intensity is incident on the phase spatial light modulator 13. Of the light incident on the phase spatial light modulator 13, the light that has passed through the area 13A becomes information light 22A, being spatially modulated in phase based on the information to be recorded. The information light 22A locally drops in intensity at the borders between first-phase pixels and second-phase pixels. Meanwhile, of the light incident on the phase spatial light modulator 13, the light that has passed through the area 13B becomes recording-specific reference light 22B without being spatially modulated in phase. The information light 22A and the recording-specific reference light 22B are incident on the beam splitter 12. Part of them passes through the semi-reflecting surface 12a, and further through the objective lens 11 to turn into converging information light 23A and converging recording-specific reference light 23B, respectively, with which the recording medium 1 is irradiated. The information light 23A and the recording-specific reference light 23B pass through the information recording layer 3, converge to become minimum in diameter on the interface between the air gap layer 4 and the reflecting film 5, and are reflected by the reflecting film 5. Information light 24A and recording-specific reference light 24B that have been reflected by the reflecting film 5 become divergent light to pass through the information recording layer 3 again.

In the information recording layer 3, the information light 23A yet to be reflected by the reflecting film 5 and the recording-specific reference light 24B that has been reflected by the reflecting film 5 interfere with each other to form an interference pattern, and the information light 24A that has been reflected by the reflecting film 5 and the recording-specific reference light 23B yet to be reflected by the reflecting film 5 interfere with each other to form an interference pattern. Then, these interference patterns are volumetrically recorded in the information recording layer 3.

The information light 24A and the recording-specific reference light 24B having been reflected by the reflecting film 5 are emitted from the recording medium 1, and become parallel information light 25A and parallel recording-specific reference light 25B through the objective lens 11. The light 25A and the light 25B are incident on the beam splitter 12, and part of each of them is reflected by the semi-reflecting surface 12a and received by the photodetector 14.

Next, description will be given of the principle of information reproduction in the optical information recording/reproducing apparatus according to the present embodiment. In the embodiment, reproduction-specific reference light is generated, and the information recording layer 3 of the recording medium 1 is irradiated with this reproduction-specific reference light. Then, reproduction light that is generated from the information recording layer 3 irradiated with the reproduction-specific reference light is collected. The reproduction light is superimposed on the reproduction-specific reference light to generate composite light, and this composite light is detected.

Hereinafter, with reference to FIG. 5, detailed description will be given of the optical information reproducing method according to the present embodiment. Like FIG. 4, FIG. 5 illustrates part of an example of the recording/reproducing optical system of the optical information recording/reproducing apparatus according to the embodiment.

Figure 5:
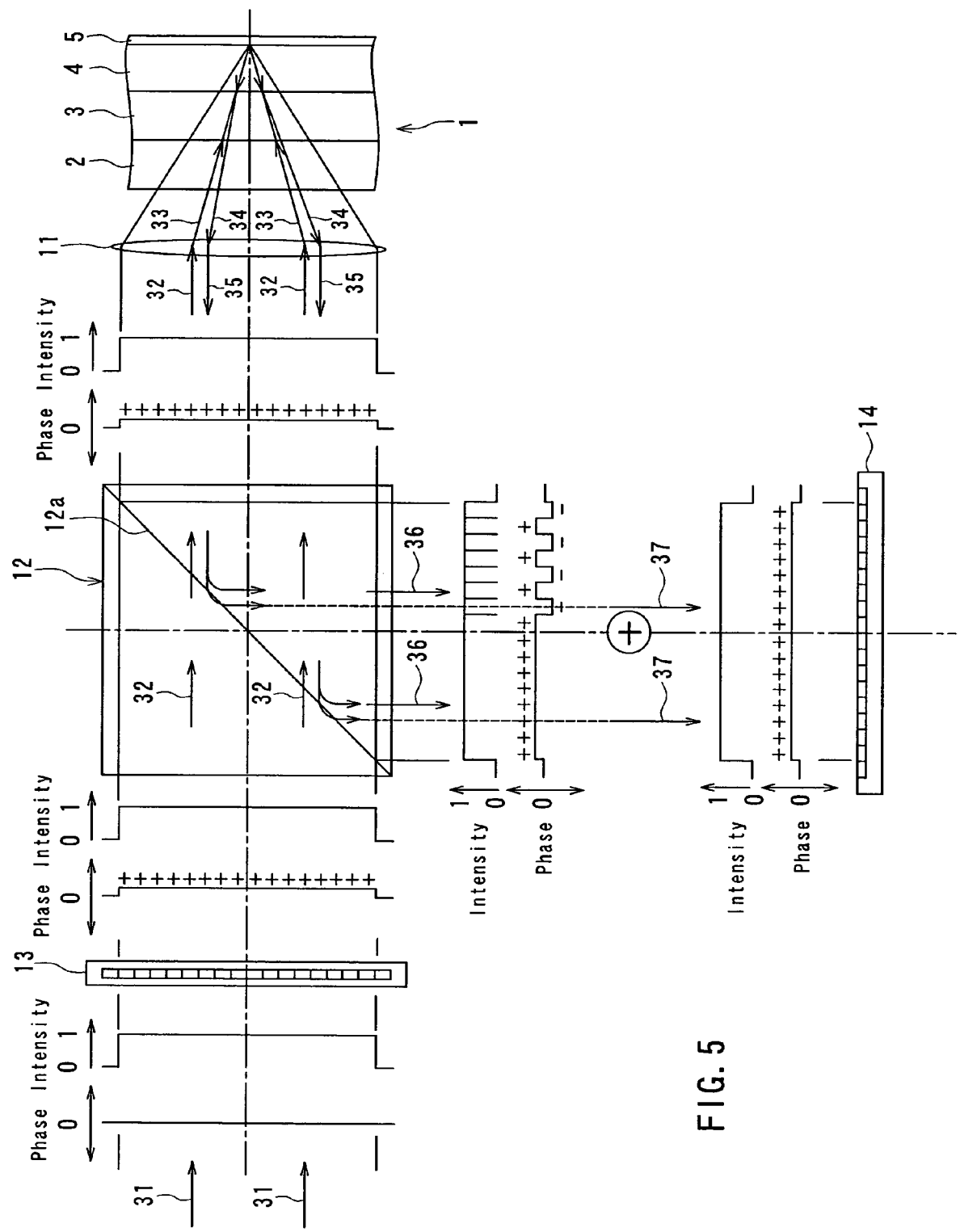
FIG. 5 is an explanatory diagram illustrating the principle of information reproduction in the first embodiment of the invention.

FIG. 5 shows the phases and intensities of the incident light on the phase spatial light modulator 13, the outgoing light from the phase spatial light modulator 13, the incident light on the objective lens 11 yet to be applied to the recording medium 1, and the return light from the recording medium 1 reflected by the semi-reflecting surface 12a of the beam splitter 12. In FIG. 5, the phases and intensities are expressed in the same manner as in FIG. 4.

In the example shown in FIG. 5, for information reproduction, coherent parallel light 31 having a constant phase and intensity is incident on the phase spatial light modulator 13. For information reproduction, the phase spatial light modulator 13 sets the phase of the outgoing light for every pixel to a first phase having a phase difference of $+\pi/2$ (rad) with respect to a predetermined reference phase, thereby generating reproduction-specific reference light 32. The reproduction-specific reference light 32 is incident on the beam splitter 12, and part thereof passes through the semi-reflecting surface 12a, and further through the objective lens 11 to turn into converging reproduction-specific reference light 33, with which the optical information recording medium 1 is irradiated. The reproduction-specific reference light 33 passes through the information recording layer 3, converges to become minimum in diameter on the interface between the air gap layer 4 and the reflecting film 5, and is reflected by the reflecting film 5. Having been reflected by the reflecting film 5, the reproduction-specific reference light becomes divergent light to pass through the information recording layer 3 again.

In the information recording layer 3, the reproduction-specific reference light 33 yet to be reflected by the reflecting film 5 causes reproduction light that travels away from the reflecting film 5. The reproduction-specific reference light that has been reflected by the reflecting film 5 causes reproduction light that travels toward the reflecting film 5. The reproduction light traveling away from the reflecting film 5 is emitted as-is from the recording medium 1. The reproduction light traveling toward the reflecting film 5 is reflected by the reflecting film 5 and emitted from the recording medium 1.

Thus, at the time of reproduction, return light 34 from the recording medium 1 includes the reproduction light and the reproduction-specific reference light that has been reflected by the reflecting film 5. The return light 34 is turned into parallel return light 35 through the objective lens 11, and incident on the beam splitter 12. Part of the light is reflected by the semi-reflecting surface 12a, and received by the photodetector 14. The return light 35 incident on the photodetector 14 includes reproduction light 36 and reproduction-specific reference light 37 that has been reflected by the reflecting film 5. The reproduction light 36 is light that is spatially modulated in phase according to the information recorded in the information recording layer 3. For the sake of convenience, FIG. 5 shows the reproduction light 36 and the reproduction-specific reference light 37 separately, along with their respective phases and intensities. In reality, however, the reproduction light 36 is superimposed on the reproduction-specific reference light 37 to generate composite light, and this composite light is received by the photodetector 14. The composite light is light that is spatially modulated in intensity according to the information recorded. Thus, the photodetector 14 detects a two-dimensional intensity pattern of the composite light, from which the information is reproduced.

As shown in FIG. 4 and FIG. 5, the optical information recording/reproducing apparatus according to the present embodiment performs the irradiation with the information light, the recording-specific reference light and the reproduction-specific reference light and the collection of the reproduction light on the same side of the information recording layer 3 so that the information light, the recording-specific reference light, the reproduction-specific reference light and the reproduction light are arranged coaxially. All of the information light, the recording-specific reference light and the reproduction-specific reference light converge to become minimum in diameter at the same position. In FIG. 4, the information light 23A and the recording-specific reference light 23B to irradiate the information recording layer 3 with are light beams that are semicircular in cross section. Those beams are coaxial since they constitute respective halves of a light beam that is circular in cross section.

Figure 6:
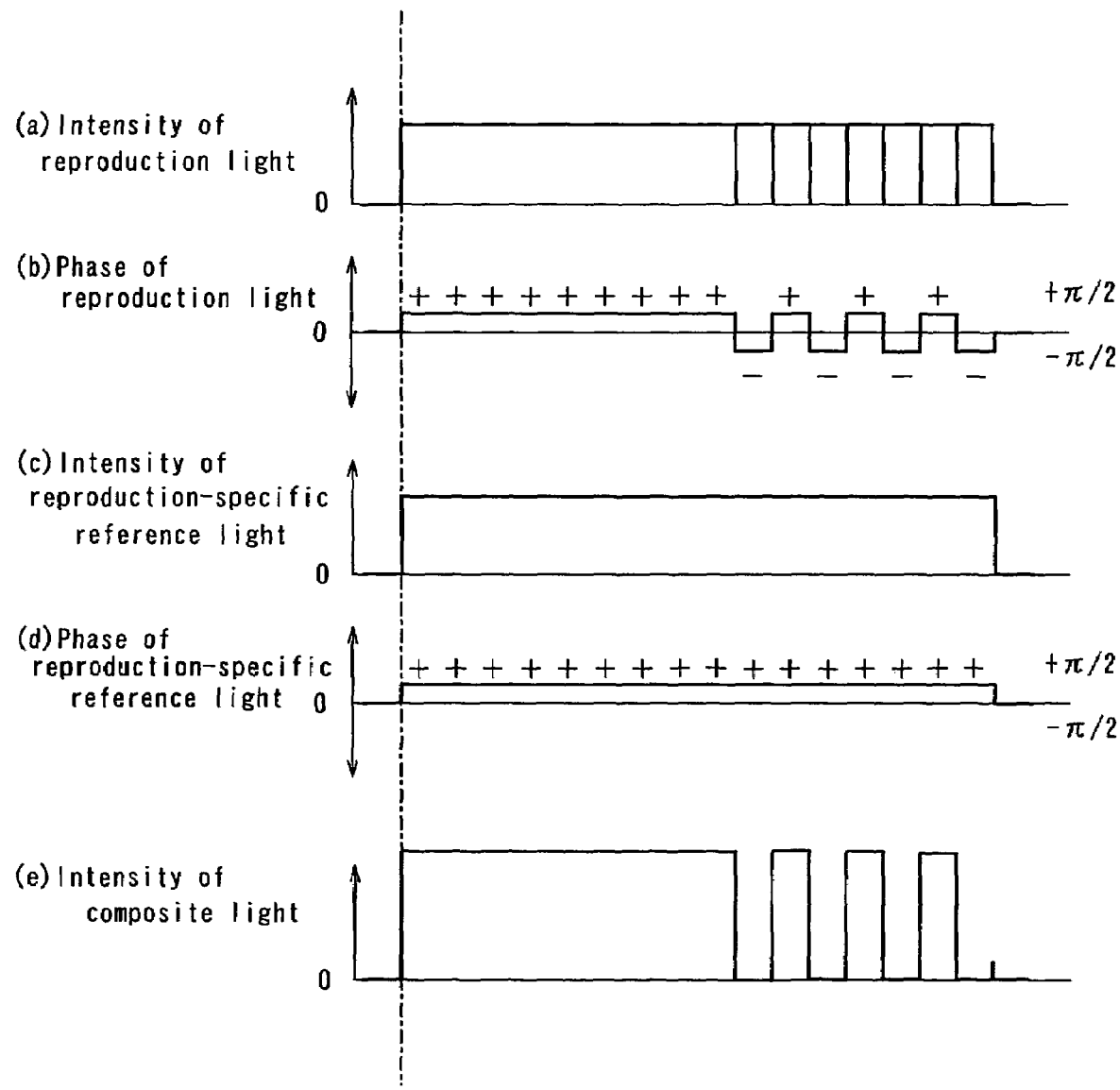
FIG. 6 is a waveform diagram for explaining in detail the principle of information reproduction in the first embodiment of the invention.

Now, with reference to FIG. 6, detailed description will be given of the reproduction light 36, the reproduction-specific reference light 37, and the composite light mentioned above. In FIG. 6, (a) represents the intensity of the reproduction light 36, (b) the phase of the reproduction light 36, (c) the intensity of the reproduction-specific reference light 37, (d) the phase of the reproduction-specific reference light 37, and (e) the intensity of the composite light. FIG. 6 shows an example where the phase of the information light for each pixel is set to either the first phase having a phase difference of $+\pi/2$ (rad) with respect to the reference phase, or the second phase having a phase difference of $-\pi/2$ (rad) with respect to the reference phase. Consequently, in the example shown in FIG. 6, the reproduction light 36 has either the first phase or the second phase pixel by pixel as the information light does. The reproduction-specific reference light 37 has the first phase for every pixel. Assuming here that the reproduction light 36 and the reproduction-specific reference light 37 are equal in intensity, the composite light exceeds the reproduction light 36 and the reproduction-specific reference light 37 in intensity at pixels where the reproduction light 36 has the first phase, and the composite light theoretically becomes zero in intensity at pixels where the reproduction light 36 has the second phase, as shown in FIG. 6(e).

Now, detailed description will be given of the relationship between the phase of the reproduction light and the intensity of the composite light, including situations where the phase of the information light is set at either of two values and where the phase of the information light is set at any of three or more values for recording.

The composite light is made by superimposing one of two lightwaves, the reproduction light, on the other, the reproduction-specific reference light. Thus, the intensity I of the composite light is given by the following equation (1), where $a_0$ is both the amplitude of the reproduction light and the amplitude of the reproduction-specific reference light, and $\delta$ is a phase difference between the reproduction light and the reproduction-specific reference light:

$$I = 2a_0^2 + 2a_0^2 \cos\delta \quad (1)$$
$$= 2a_0^2(1+\cos\delta)$$
$$= 4a_0^2 \cos^2(\delta/2).$$

Since the phase of the reproduction-specific reference light is constant irrespective of pixel, from the foregoing equation, it can be seen that the intensity I of the composite light varies with the phase of the reproduction light. Moreover, when the phase of the information light is set at any of n values (n is an integer no less than 2) within a range of, e.g., $+\pi/2$ (rad) to $-\pi/2$ (rad), the intensity I of the composite light also takes any of the n values.

As above, according to the optical information reproducing method of the present embodiment, the two-dimensional intensity pattern of the composite light generated by superimposing the reproduction light on the reproduction-specific reference light is detected to reproduce the information recorded in the information recording layer 3 in the form of an interference pattern resulting from the interference between the information light that is spatially modulated in phase based on the information to be recorded, and the recording-specific reference light.

By the way, in the present embodiment, recording-specific reference light and reproduction-specific reference light that are spatially modulated in phase may be used to achieve both multiple recording by phase encoding multiplexing and reproduction of the information multiple-recorded in this way. Hereinafter, with reference to FIG. 7 to FIG. 9, description will be given of the principle of information recording and the principle of information reproduction for the case where multiple recording by phase-encoding multiplex is performed.

Figure 7:
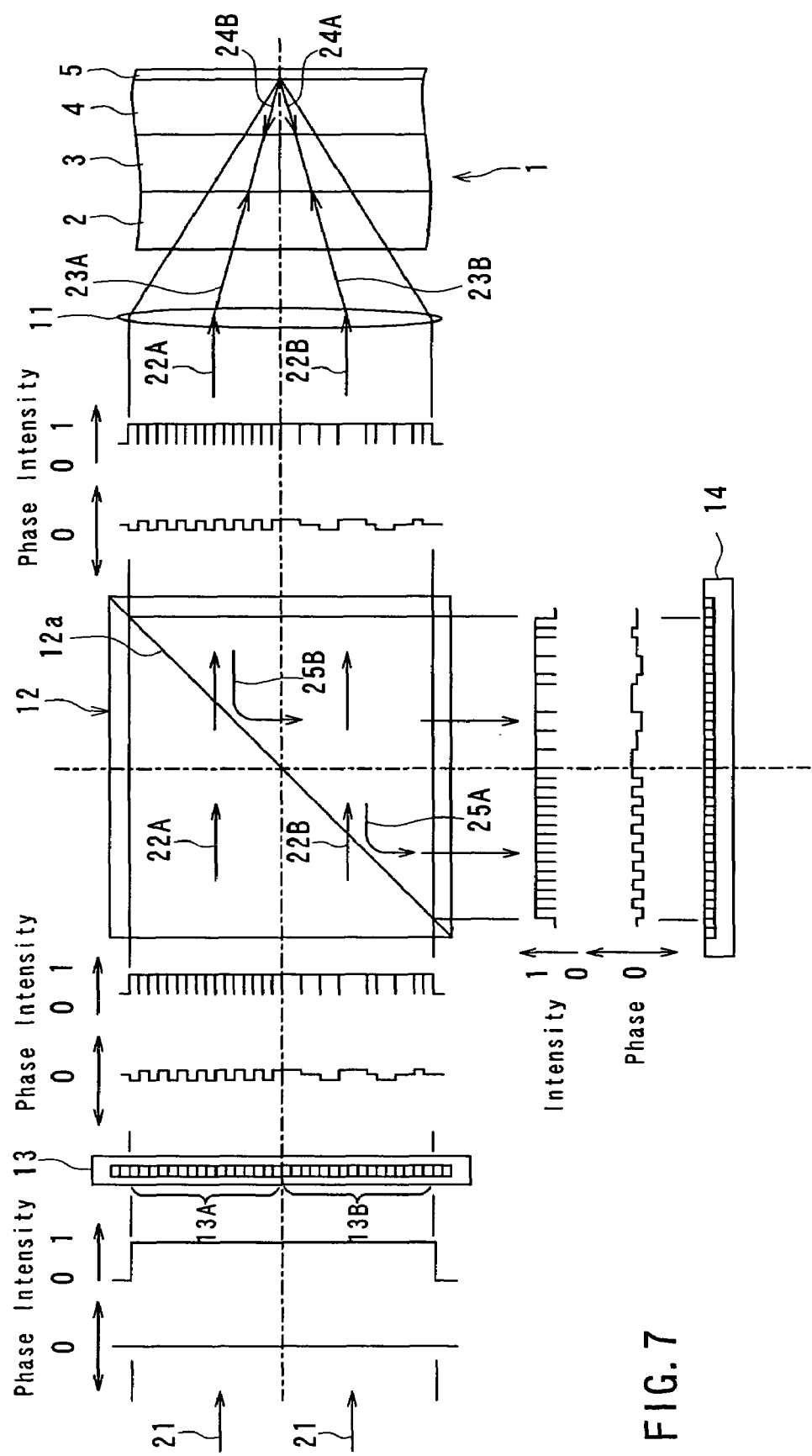
FIG. 7 is an explanatory diagram showing the principle of information recording for the case where multiple recording by phase encoding multiplexing is performed in the first embodiment of the invention.

First, with reference to FIG. 7, description will be given of the principle of information recording for the case where multiple recording by phase-encoding multiplex is performed. FIG. 7 shows part of an example of the recording/reproducing optical system of the optical information recording/reproducing apparatus according to the embodiment. The optical system shown in FIG. 7 has the same configuration as in FIG. 4. FIG. 7 illustrates the phases and intensities of incident light on the phase spatial light modulator 13, outgoing light from the phase spatial light modulator 13, incident light on the objective lens 11 yet to irradiate the recording medium 1 with, and return light from the recording medium 1 reflected by the semi-reflecting surface 12a of the beam splitter 12. In FIG. 7, the phases and intensities of the light are expressed in the same manner as in FIG. 4.

When recording information, coherent parallel light 21 having a constant phase and intensity is incident on the phase spatial light modulator 13. A half area 13A of the phase spatial light modulator 13 selects the phase of outgoing light from between two values or from among three or more values for each pixel based on information to be recorded, thereby generating information light 22A that is spatially modulated in phase. Here, for ease of explanation, the area 13A shall modulate the phase of the outgoing light spatially by setting the phase of the outgoing light to either a first phase having a phase difference of $+\pi/2$ (rad) with respect to a predetermined reference phase or a second phase having a phase difference of $-\pi/2$ (rad) with respect to the reference phase for each pixel. Meanwhile, the other half area 13B of the phase spatial light modulator 13 selects the phase of the outgoing light from between two values or from among three or more values for each pixel, thereby generating recording-specific reference light 22B that is spatially modulated in phase. Here, for ease of explanation, the area 13B shall modulate the phase of the outgoing light spatially by setting the phase of the outgoing light at any of the reference phase, the first phase, and the second phase for each pixel.

The information light 22A and the recording-specific reference light 22B are incident on the beam splitter 12. Part of them pass through the semi-reflecting surface 12a, and further through the objective lens 11 to turn into converging information light 23A and converging recording-specific reference light 23B, respectively, with which the recording medium 1 is irradiated. The information light 23A and the recording-specific reference light 23B pass through the information recording layer 3, converge to become minimum in diameter on the interface between the air gap layer 4 and the reflecting film 5, and are reflected by the reflecting film 5. Information light 24A and recording-specific reference light 24B that has been reflected by the reflecting film 5 become divergent light to pass through the information recording layer 3 again.

In the information recording layer 3, the information light 23A yet to be reflected by the reflecting film 5 and the recording-specific reference light 24B that has been reflected by the reflecting film 5 interfere with each other to form an interference pattern, and the information light 24A that has been reflected by the reflecting film 5 and the recording-specific reference light 23B yet to be reflected by the reflecting film 5 interfere with each other to form an interference pattern. Then, these interference patterns are volumetrically recorded in the information recording layer 3.

The information light 24A and the recording-specific reference light 24B having been reflected by the reflecting film 5 are emitted from the recording medium 1, and become parallel information light 25A and parallel recording-specific reference light 25B through the objective lens 11. The light 25A and the light 25B are incident on the beam splitter 12. Part of them are reflected by the semi-reflecting surface 12a, and received by the photodetector 14.

Figure 8:
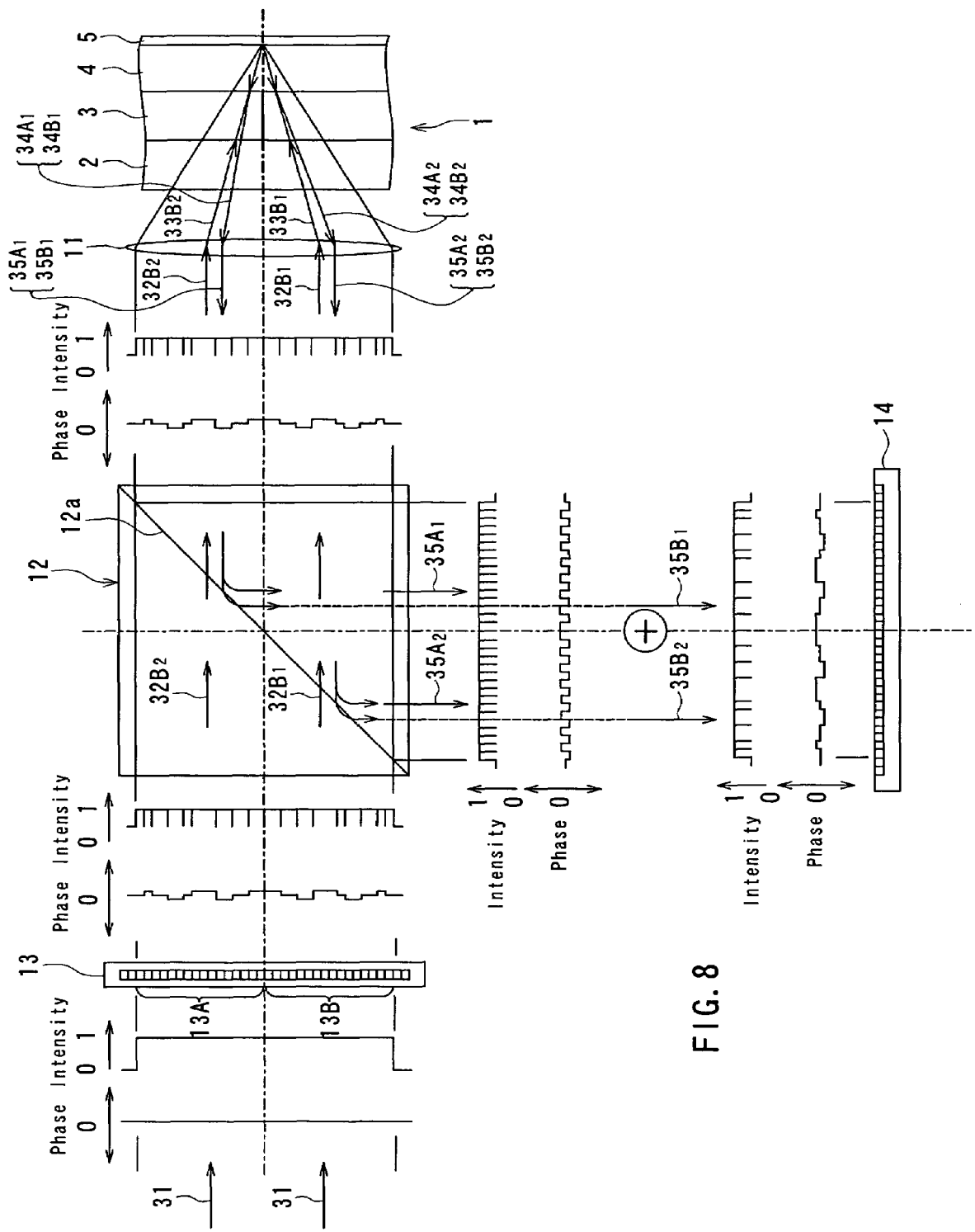
FIG. 8 is an explanatory diagram showing the principle of information reproduction for the case where multiple recording by phase encoding multiplexing is performed in the first embodiment of the invention.

Next, with reference to FIG. 8, description will be given of the principle of information reproduction for the case where multiple recording by phase-encoding multiplex is performed. FIG. 8 shows, like FIG. 7, part of an example of the recording/reproducing optical system in the optical information recording/reproducing apparatus according to the present embodiment. FIG. 8 illustrates the phases and intensities of incident light on the phase spatial light modulator 13, outgoing light from the phase spatial light modulator 13, incident light on the objective lens 11 yet to irradiate the recording medium 1 with, and return light from the recording medium 1 reflected by the semi-reflecting surface 12a of the beam splitter 12. In FIG. 8, the phases and intensities are expressed in the same manner as in FIG. 7.

When reproducing information, coherent parallel light 31 having a constant phase and intensity is incident on the phase spatial light modulator 13. The half area 13B of the phase spatial light modulator 13 selects the phase of the outgoing light from between two values or from among three or more values for each pixel, thereby generating reproduction-specific reference light $32B_1$ that is spatially modulated in phase in the same modulation pattern as that of the recording-specific reference light 22B. On the other hand, the half area 13A of the phase spatial light modulator 13 selects the phase of the outgoing light from between two values or from among three or more values for each pixel, thereby generating reproduction-specific reference light $32B_2$ that is spatially modulated in phase in a pattern that is point-symmetric to the modulation pattern of the reproduction-specific reference light $32B_1$ about a position of optical axis of the optical system that irradiates the information recording layer 3 with the recording-specific reference light and the reproduction-specific reference light.

The reproduction-specific reference light $32B_1$ and the reproduction-specific reference light $32B_2$ are incident on the beam splitter 12. Part of them pass through the semi-reflecting surface 12a, and further through the objective lens 11 to turn into converging reproduction-specific reference light $33B_1$ and $33B_2$, respectively, with which the recording medium 1 is irradiated. The reproduction-specific reference light $33B_1$ and the reproduction-specific reference light $33B_2$ pass through the information recording layer 3, converge to become minimum in diameter on the interface between the air gap layer 4 and the reflecting film 5, and are reflected by the reflecting film 5. Having been reflected by the reflecting film 5, the reproduction-specific reference light become divergent light to pass through the information recording layer 3 again.

In the information recording layer 3, the reproduction-specific reference light $33B_2$ yet to be reflected by the reflecting film 5 causes reproduction light that travels away from the reflecting film 5, while the reproduction-specific reference light $33B_2$ having been reflected by the reflecting film 5 causes reproduction light that travels toward the reflecting film 5. The reproduction light traveling away from the reflecting film 5 is emitted as-is from the recording medium 1. The reproduction light traveling toward the reflecting film 5 is reflected by the reflecting film 5 and emitted from the recording medium 1. Both of the reproduction light are represented by reference numeral $34A_1$.

In the information recording layer 3, on the other hand, the reproduction-specific reference light $33B_1$ yet to be reflected by the reflecting film 5 causes reproduction light that travels away from the reflecting film 5, while the reproduction-specific reference light $33B_1$ having been reflected by the reflecting film 5 causes reproduction light that travels toward the reflecting film 5. The reproduction light traveling away from the reflecting film 5 is emitted as-is from the recording medium 1. The reproduction light traveling toward the reflecting film 5 is reflected by the reflecting film 5 and emitted from the recording medium 1. Both of the reproduction light are represented by reference numeral $34A_2$.

Meanwhile, the reproduction-specific reference light $33B_1$ is reflected by the reflecting film 5 and becomes reproduction-specific reference light $34B_1$ that travels in the same direction as the reproduction light $34A_1$ does. The reproduction-specific reference light $33B_2$ is reflected by the reflecting film 5 and becomes reproduction-specific reference light $34B_2$ that travels in the same direction as the reproduction light $34A_2$ does.

The reproduction light $34A_1$, $34A_2$ and the reproduction-specific reference light $34B_1$, $34B_2$ are turned into parallel reproduction light $35A_1$, $35A_2$ and parallel reproduction-specific reference light $35B_1$, $35B_2$ through the objective lens 11, respectively, and are incident on the beam splitter 12. Then, part of them are reflected by the semi-reflecting surface 12a and received by the photodetector 14.

Both the reproduction light $35A_1$ and the reproduction light $35A_2$ are spatially modulated in phase as the information light for recording. The phase modulation patterns of the reproduction light $35A_1$ and the reproduction light $35A_2$ are mutually symmetrical with respect to a point.

Composite light produced by superimposing the reproduction light $35A_1$ on the reproduction-specific reference light $35B_1$ is incident on a half area of the photodetector 14. Composite light produced by superimposing the reproduction light $35A_2$ on the reproduction-specific reference light $35B_2$ is incident on the other half area of the photodetector 14. Both of the two types of composite light are spatially modulated in intensity according to the information recorded. The intensity modulation patterns of the two types of composite light are mutually symmetrical with respect to a point. Thus, the photodetector 14 can reproduce information by detecting a two-dimensional pattern of intensity of one of the two types of composite light. Here, information shall be reproduced by detecting the two-dimensional pattern of intensity of the composite light produced by superimposing the reproduction light $35A_1$ on the reproduction-specific reference light $35B_1$.

Figure 9:
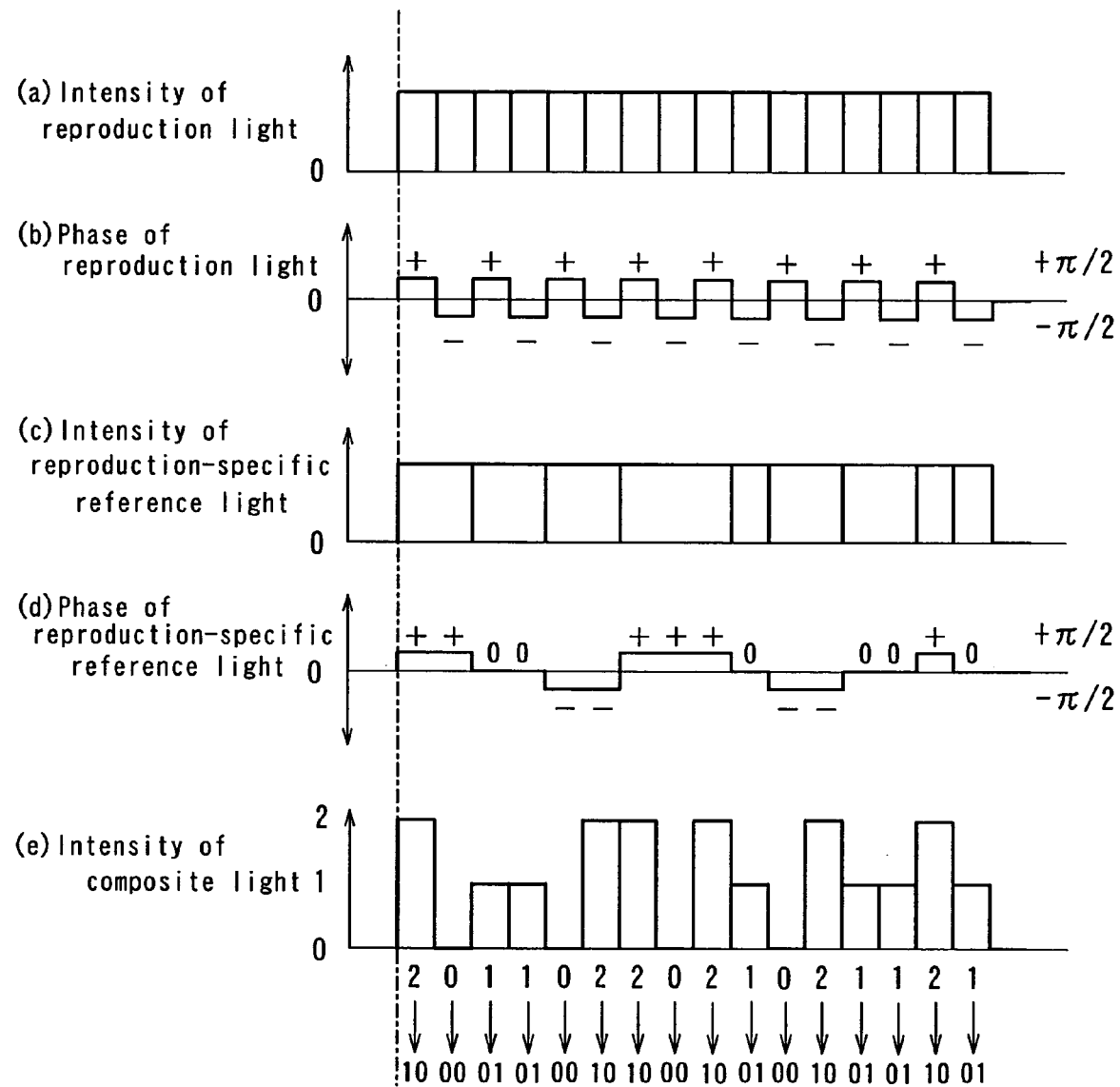
FIG. 9 is a waveform diagram for explaining in detail the principle of information reproduction for the case where multiple recording by phase encoding multiplexing is performed in the first embodiment of the invention.

Next, the reproduction light, the reproduction-specific reference light, and the composite light mentioned above will be described in detail with reference to FIG. 9. In FIG. 9, (a) shows the intensity of the reproduction light, (b) the phase of the reproduction light, (c) the intensity of the reproduction-specific reference light, (d) the phase of the reproduction-specific reference light, and (e) the intensity of the composite light. FIG. 9 shows an example where the phase of the information light is set at either the first phase or the second phase for each pixel, and the phases of the recording-specific reference light and the reproduction-specific reference light are set at any of the reference phase, the first phase, and the second phase for each pixel. In this case, the phase of the reproduction light for each pixel is either the first phase or the second phase like the information light. Consequently, the phase difference between the reproduction light and the reproduction-specific reference light is any of zero, $\pm\pi/2$ (rad), and $\pm\pi$ (rad). Suppose here that the intensity of the reproduction light and the intensity of the reproduction-specific reference light are equal. In that case, as shown in FIG. 9(e), the intensity of the composite light becomes maximum at pixels where the phase difference between the reproduction light and the reproduction-specific reference light is zero, and becomes theoretically zero at pixels where the phase difference between the reproduction light and the reproduction-specific reference light is $\pm\pi$ (rad). At pixels where the phase difference between the reproduction light and the reproduction-specific reference light is $\pm\pi/2$ (rad), the intensity becomes ½ that at a zero-phase-difference pixel. In FIG. 9(e), the intensity at the pixels where the phase difference is in (rad) is represented by "0", the intensity at the pixels where the phase difference is $\pm\pi/2$ (rad) is represented by "1", and the intensity at the pixels where the phase difference is zero is represented by "2".

In the example shown in FIG. 7 through FIG. 9, the intensity of the composite light has three values for each pixel. Then, for example, the intensity "0" can be associated with two bits of data "00", the intensity "1" with two bits of data "10", and the intensity "2" with two bits of data "10" as shown in FIG. 9(e). Thus, in the example shown in FIG. 7 through FIG. 9, the composite light can carry an increased amount of information with the same intensity and phase of the reproduction light as compared to the cases where the intensity of the composite light has two values for each pixel as shown in FIG. 4 through FIG. 6. As a result, the recording medium 1 can be enhanced in recording density.

Where the phase difference between the reproduction light and the reproduction-specific reference light is expressed as the intensity I of the composite light is given by the equation (1) mentioned previously. The equation (1) shows that the intensity I of the composite light varies according to the phase difference between the reproduction light and the reproduction-specific reference light. Consequently, when the absolute value of the phase difference between the reproduction light and the reproduction-specific reference light, i.e., the absolute value of the phase difference between the information light and the reproduction-specific reference light, has n values (n is an integer no less than 2) within the range of 0 to $\pi$ (rad), for example, the intensity I of the composite light also has the n values.

Meanwhile, when the information light and the recording-specific reference light that are spatially modulated in phase are used to record information on the information recording layer 3 of the recording medium 1 as described above, the phase modulation pattern of the information light is determined based on the information to be recorded and the phase modulation pattern of the recording-specific reference light to be used in recording the information. This will be described in detail with reference to FIG. 9. Since the information recorded on the information recording layer 3 is reproduced based on the intensity pattern of the composite light, the information to be recorded is converted into data on a desired intensity pattern of the composite light as shown in FIG. 9(e). The phase modulation pattern of the recording-specific reference light is the same as the phase modulation pattern of the reproduction-specific reference light as shown in FIG. 9(d). By means of phase calculation using the data on the desired intensity pattern of the composite light as shown in FIG. 9(e) and the data on the phase modulation patterns of the reproduction-specific reference light and the recording-specific reference light as shown in FIG. 9(d), the phase modulation pattern of the information light is determined so as to be the same as or point-symmetric to the desired phase modulation pattern of the reproduction light as shown in FIG. 9(b).

The information recording layer 3 on which information is recorded by using the information light having the phase modulation pattern determined as described above and the recording-specific reference light may be irradiated with the reproduction-specific reference light having the phase modulation pattern as shown in FIG. 9(d), which is the same as the phase modulation pattern of the recording-specific reference light. In such a case, composite light having the intensity pattern as shown in FIG. 9(e) is obtained.

The information recorded on the information recording layer 3 is reproduced based on the intensity pattern of this composite light.

The phase modulation patterns of the recording-specific reference light and the reproduction-specific reference light may be produced from information unique to an individual who is a user. Such information unique to an individual includes a personal identification number, a fingerprint, a voiceprint, and an iris pattern. In that case, information can be reproduced only by the certain individual who recorded the information on the recording medium 1.

As has been described, the use of the recording-specific reference light and the reproduction-specific reference light that are spatially modulated in phase allows both the multiple recording by phase encoding multiplexing and reproduction of the information multiple-recorded in this way.

Figure 10:
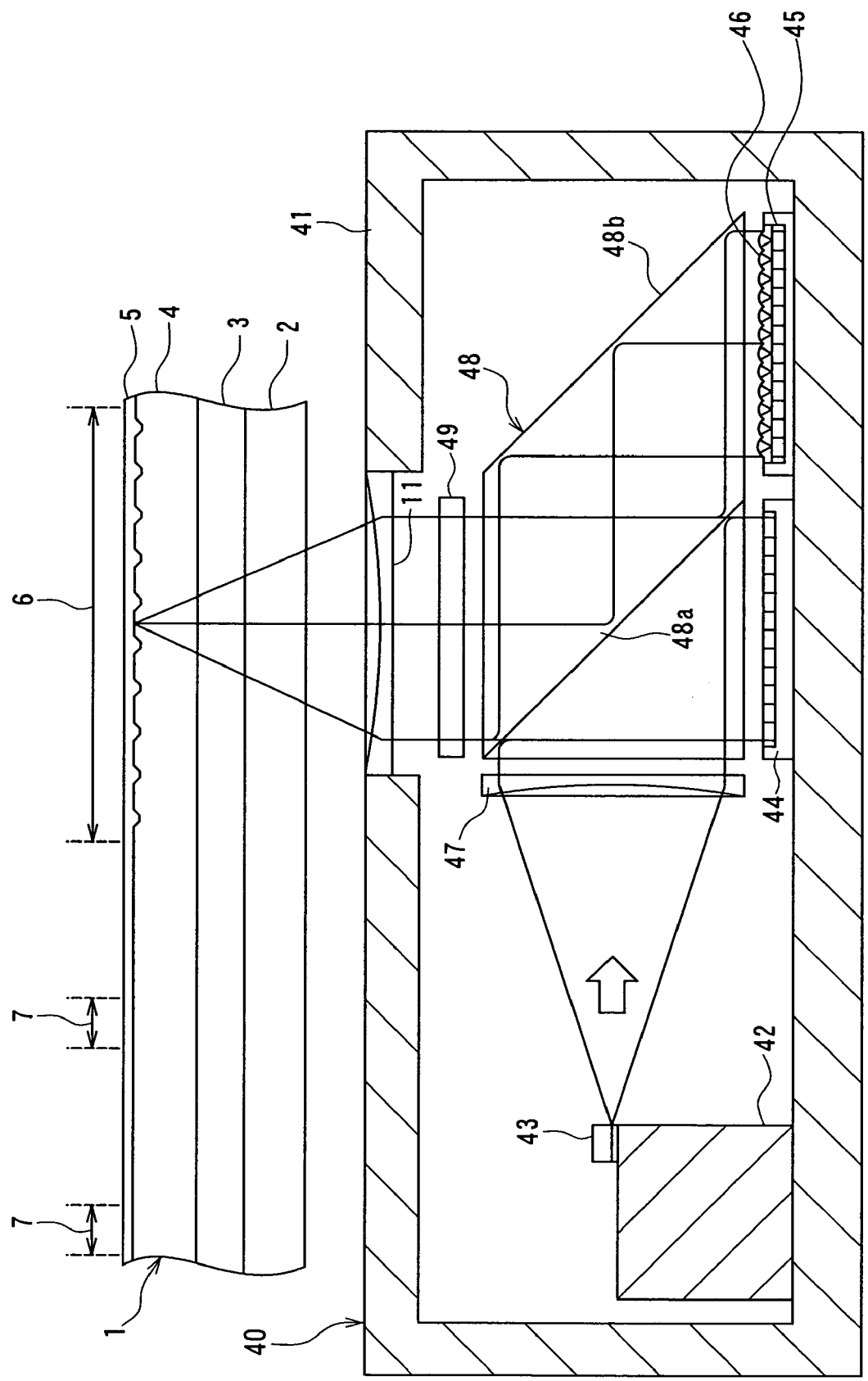
FIG. 10 is a cross-sectional view showing the optical head of the first embodiment of the invention.

Next, with reference to FIG. 10, description will be given of the recording/reproducing optical system provided in the optical head 40. FIG. 10 is a cross-sectional view showing the optical head 40. As shown in FIG. 10, the optical head 40 has a head body 41 that accommodates individual components to be described later. A semiconductor laser 43 is fixed to the internal bottom of the head body 41 via a support 42. A phase spatial light modulator 44 of reflection type and a photodetector 45 are also fixed thereto. A microlens array 46 is attached to the light-receiving surface of the photodetector 45. In the head body 41, a prism block 48 is provided above the phase spatial light modulator 44 and the photodetector 45. A collimator lens 47 is provided near an end of the prism block 48 closer to the semiconductor laser 43. The head body 41 has an opening at the surface facing toward the recording medium 1. An objective lens 11 is provided in this opening. A quarter-wave plate 49 is provided between the objective lens 11 and the prism block 48.

The phase spatial light modulator 44 has a number of pixels arranged in a matrix, and is capable of spatially modulating the phase of light by setting the phase of outgoing light for each pixel to either of two values differing by $\pi$ (rad) from each other.

Furthermore, the phase spatial light modulator 44 rotates the direction of polarization of the outgoing light by 90° with respect to the direction of polarization of the incident light. For example, a reflection-type liquid crystal device may be used for the phase spatial light modulator 44.

The photodetector 45 has a number of pixels arranged in a matrix, and is capable of detecting the intensity of received light for each pixel. The microlens array 46 includes a plurality of microlenses arranged to oppose to the light-receiving surfaces of the respective pixels of the photodetector 45.

A CCD-type solid image pick-up device or a MOS-type solid image pick-up device may be used as the photodetector 45. Alternatively, a smart light sensor in which a MOS type solid image pick-up device and a signal processing circuit are integrated on a single chip (for example, see the literature "O plus E, September 1996, No. 202, pp. 93–99") may be used. Since this smart light sensor has a high transfer rate and high-speed operation facilities, the use of this smart light sensor allows high-speed reproduction. For example, reproduction can be performed at transfer rates on the order of Gbit/s.

The prism block 48 has a polarization beam splitter surface 48a and a reflecting surface 48b. Of the polarization beam splitter surface 48a and the reflecting surface 48b, the polarization beam splitter surface 48a is located closer to the collimator lens 47. The polarization beam splitter surface 48a and the reflecting surface 48b are both inclined at 45° in the normal direction with respect to the direction of the optical axis of the collimator lens 47, and they are arranged in parallel to each other.

The phase spatial light modulator 44 is placed below the polarization beam splitter surface 48a, and the photodetector 45 is placed below the reflecting surface 48b. The quarter-wave plate 49 and the objective lens 11 are placed above the polarization beam splitter surface 48a. The collimator lens 47 and the objective lens 11 may be hologram lenses.

The polarization beam splitter surface 48a of the prism block 48, as will be detailed later, achieves separation between the optical path of the information light, the recording-specific reference light, and the reproduction-specific reference light yet to pass through the quarter-wave plate 49 and the optical path of the return light from the recording medium 1 having passed through the quarter-wave plate 49, according to the difference in directions of polarization.

The prism block 48, the phase spatial light modulator 44, and the photodetector 45 in FIG. 10 correspond to the beam splitter 12, the phase spatial light modulator 13, and the photodetector 14 in FIG. 4, respectively.

Next, description will be given of the operation of the recording/reproducing optical system in information recording. The semiconductor laser 43 emits coherent S-polarized light. S-polarization refers to linear polarization the direction of which is perpendicular to the incidence plane (plane of the drawing sheet of FIG. 10), whereas P-polarization to be described later refers to linear polarization the direction of which is parallel to the incidence plane.

The S-polarized laser light emitted from the semiconductor laser 43 is turned into parallel light through the collimator lens 47, incident on the polarization beam splitter surface 48a of the prism block 48, reflected by the polarization beam splitter surface 48a, and incident on the phase spatial light modulator 44. In a half area, the outgoing light from the phase spatial light modulator 44 becomes information light that is spatially modulated in phase based on the information to be recorded. In the other half area, the outgoing light becomes recording-specific reference light having an identical phase for all the pixels or recording-specific reference light that is spatially modulated in phase. The outgoing light from the phase spatial light modulator 44 is subjected to a rotation of the direction of polarization by 90° to become P-polarized light.

Since the information light and the recording-specific reference light, which have exited the phase spatial light modulator 44, are P-polarized light, they are transmitted through the polarization beam splitter surface 48a of the prism block 48, and become circularly polarized light by passing through the quarter-wave plate 49. The information light and the recording-specific reference light are condensed by the objective lens 11 to irradiate the recording medium 1 with. The information light and the recording-specific reference light pass through the information recording layer 3, converge to become minimum in diameter on the interface between the air gap layer 4 and the reflecting film 5, and are reflected by the reflecting film 5. Having been reflected by the reflecting film 5, the information light and the recording-specific reference light become divergent light to pass through the information recording layer 3 again. When the power of the semiconductor laser 43 is set at a high level suitable for recording, an interference pattern resulting from the interference between the information light and the recording-specific reference light is recorded on the information recording layer 3.

The return light from the recording medium 1 is turned into parallel light through the objective lens 11, and passes through the quarter-wave plate 49 to become S-polarized light. This return light is reflected by the polarization beam splitter surface 48a of the prism block 48, further reflected by the reflecting surface 48b, and incident on the photodetector 45 through the microlens array 46.

When recording information, while the light beam from the objective lens 11 passes through the address servo areas 6 of the recording medium 1, the power of the semiconductor laser 43 is set at a low level suitable for reproduction and the phase spatial light modulator 44 emits light having an identical phase for all the pixels, without modulating the phase of the light. Basic clock, address information, focus error signals and tracking error information can be obtained based on the output of the photodetector 45 at this time.

Next, description will be given of the operation of the recording/reproducing optical system in information reproduction. In information reproduction, the power of the semiconductor laser 43 is set at a low level suitable for reproduction. The S-polarized laser light emitted from the semiconductor laser 43 is turned into parallel light through the collimator lens 47, incident on the polarization beam splitter surface 48a of the prism block 48, reflected by the polarization beam splitter surface 48a, and incident on the phase spatial light modulator 44. The light that has exited the phase spatial light modulator 44 becomes reproduction-specific reference light having an identical phase for all the pixels, or reproduction-specific reference light that is spatially modulated in phase. The light that has exited the phase spatial light modulator 44 is subjected to a rotation of the direction of polarization by 90° to become P-polarized light.

Since the reproduction-specific reference light, which has exited the phase spatial light modulator 44, is P-polarized light, it is transmitted through the polarization beam splitter surface 48a of the prism block 48 and circularly polarized through the quarter-wave plate 49. The reproduction-specific reference light is condensed by the objective lens 11 to irradiate the recording medium 1 with. The reproduction-specific reference light passes through the information recording layer 3, converges to become minimum in diameter on the interface between the air gap layer 4 and the reflecting film 5, and is reflected by the reflecting film 5. Having been reflected by the reflecting film 5, the reproduction-specific reference light becomes divergent light to pass through the information recording layer 3 again. The reproduction-specific reference light causes reproduction light to be generated from the information recording layer 3.

The return light from the recording medium 1 includes the reproduction light and the reproduction-specific reference light. The return light is turned into parallel light through the objective lens 11, and S-polarized through the quarter-wave plate 49. The return light is reflected by the polarization beam splitter surface 48a of the prism block 48, further reflected by the reflecting surface 48b, and incident on the photodetector 45 through the microlens array 46. The information recorded on the recording medium 1 can be reproduced based on the output of the photodetector 45.

When reproducing information, while the light beam from the objective lens 11 passes through the address servo areas 6 of the recording medium 1, basic clock, address information, focus error signals and tracking error information can be obtained based on the output of the photodetector 45.

The phase spatial light modulator 44 may be one that causes no rotation in the direction of polarization of light. In this case, the polarization beam splitter surface 48a of the prism block 48 in FIG. 10 is replaced with a semi-reflecting surface. Alternatively, a quarter-wave plate may be provided between the prism block 48 and the phase spatial light modulator 44, so that the S-polarized light from the prism block 48 is converted into circularly-polarized light through the quarter-wave plate and incident on the phase spatial light modulator 44, and so that the circularly-polarized light from the phase spatial light modulator 44 is converted into P-polarized light through the quarter-wave plate and transmitted through the polarization beam splitter surface 48a. The phase spatial light modulator that is capable of setting the phase of the outgoing light to any of three or more values for each pixel is not limited to the one using liquid crystal. For example, it may have such configuration that micromirror devices are used to adjust the position of the reflecting surface in the traveling direction of the incident light for each pixel.

Figure 11:
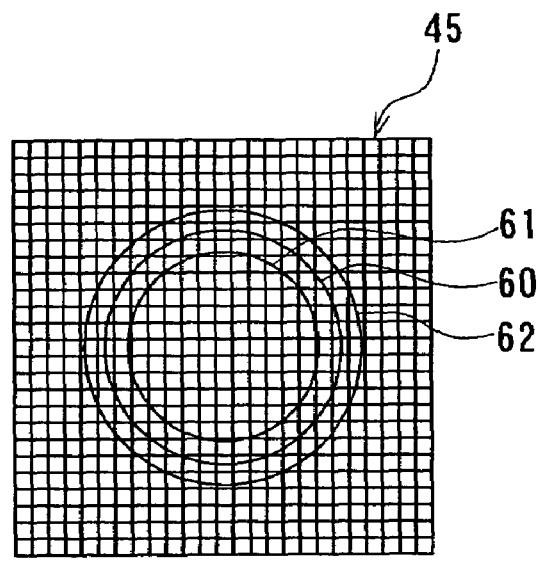
FIG. 11 is an explanatory diagram for explaining an example of a method for producing focus error information in the first embodiment of the invention.

Next, with reference to FIG. 11, description will be given of an example of a method for producing focus error information in the present embodiment. FIG. 11 is an explanatory diagram showing the outline of incident light on the light-receiving surface of the photodetector 45. In the method for producing focus error information of this example, focus error information is produced based on the size of the outline of the incident light on the light-receiving surface of the photodetector 45 in the following manner. Initially, in a focused state where the light beam from the objective lens 11 converges to become minimum in diameter on the interface between the air gap layer 4 and the reflecting film 5 of the recording medium 1, the incident light on the light-receiving surface of the photodetector 45 shall have the outline designated by the reference numeral 60 in FIG. 11. If the position at which the light beam from the objective lens 11 has the minimum diameter shifts back from the interface between the air gap layer 4 and the reflecting film 5, the outline of the incident light on the light-receiving surface of the photodetector 45 decreases in diameter as shown by the reference numeral 61 in FIG. 11. On the other hand, if the position at which the light beam from the objective lens 11 has the minimum diameter shifts forward beyond the interface between the air gap layer 4 and the reflecting film 5, the outline of the incident light on the light-receiving surface of the photodetector 45 increases in diameter as shown by the reference numeral 62 in FIG. 11. Consequently, a focus error signal can be obtained by detecting a signal responsive to a change in the diameter of the outline of the incident light on the light-receiving surface of the photodetector 45, with reference to the focused state. Specifically, for example, the focus error signal can be produced based on fluctuations in the number of pixels corresponding to a bright area in the light-receiving surface of the photodetector 45 with reference to the focused state.

In present the embodiment, the position of the optical head body 41 in a direction perpendicular to the recording medium 1 is adjusted based on the focus error signal so that the light beam is always in the focused state, thereby effecting focus servo. When the light beam passes through the information recording areas 7, no focus servo is performed and the state at the passing of the previous address servo area 6 is maintained.

Figure 12:
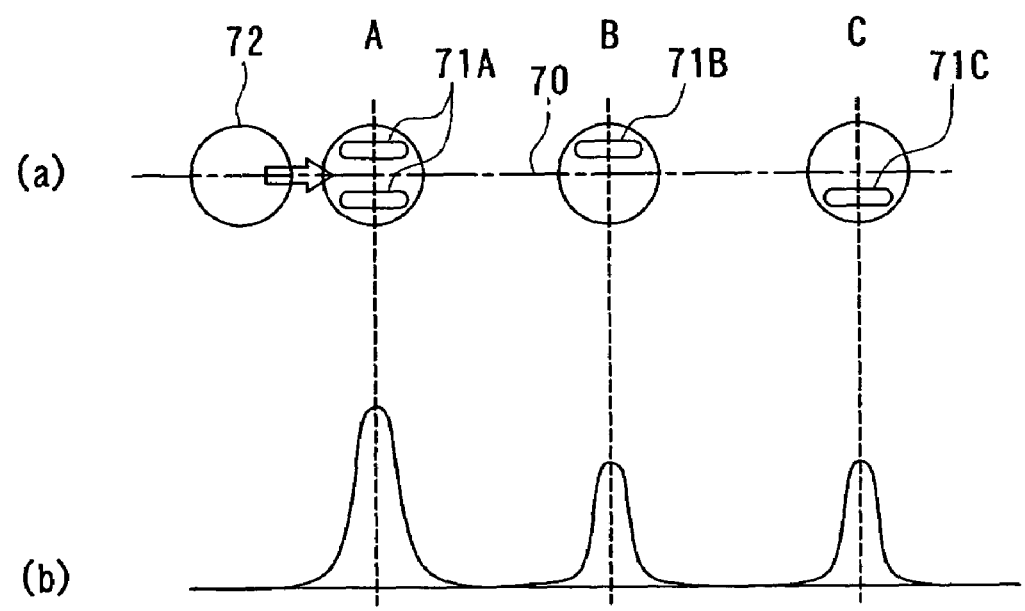
FIG. 12 is an explanatory diagram for explaining an example of a method for producing tracking error information and a method for tracking servo in the first embodiment of the invention.

Next, with reference to FIG. 12 and FIG. 13, description will be given of an example of a method for producing tracking error information and a method for tracking servo in the present embodiment. In this example, as shown in FIG. 12(a), the address servo areas 6 of the recording medium 1 have two pits 71A, a single pit 71B, and a single pit 71C that are formed in this order in a traveling direction of a light beam 72 along a track 70, as positioning information to be used for tracking servo. The two pits 71A are arranged at a position designated by the symbol A in FIG. 12, symmetrically across the track 70. The pit 71B is located at a position designated by the symbol B in FIG. 12, being shifted to one side with respect to the track 70. The pit 71C is located at a position designated by the symbol C in FIG. 12, being shifted to the side opposite from the pit 71B, with respect to the track 70.

As shown in FIG. 12(a), in the case where the light beam 72 travels on the track 70 accurately, the respective total amounts of light received by the photodetector 45 at the time when the light beam 72 passes through the positions A, B, and C are as shown in FIG. 12(b). That is, the amount of light received is greatest at the time of passing through the position A, and the amounts of light received at the time of passing through the position B and at the time of passing through the position C are the same, which are lower than the amount at the time of passing through the position A.

On the other hand, as shown in FIG. 13(a), in the case where the light beam 72 travels off the track 70 with a deviation toward the pit 71C, the respective total amounts of light received by the photodetector 45 at the time when the light beam 72 passes through the positions A, B, and C are as shown in FIG. 13(b). That is, the amount of light received is greatest at the time of passing through the position A, second greatest at the time of passing through the position C, and smallest at the time of passing through the position B. The absolute value of difference between the amounts of light received at the time of passing through the position B and at the time of passing through the position C increases with increasing amount of deviation of the light beam 72 from the track 70.

Although not shown, when the light beam 72 travels off the track 70 with a deviation toward the pit 71B, the amount of light received is greatest at the time of passing through the position A, second greatest at the time of passing through the position B, and smallest at the time of passing through the position C. The absolute value of difference between the amounts of light received at the time of passing through the position B and at the time of passing through the position C increases with increasing amount of deviation of the light beam 72 from the track 70.

From the foregoing, the direction and magnitude of deviation of the light beam 72 with respect to the track 70 can be seen from a difference between the amounts of light received at the time of passing through the position B and at the time of passing through the position C. Consequently, the difference between the amounts of light received at the time of passing through the position B and at the time of passing through the position C can be used as a tracking error signal. The pits 71A serve as the reference of timing for detecting the amounts of light received at the time of passing through the position B and at the time of passing through the position C.

Specifically, the tracking servo in this example is performed in the following manner. Initially, the timing at which the total amount of light received by the photodetector 45 reaches a first peak, i.e., the timing of passing through the position A, is detected. Next, the timing of passing through the position B and the timing of passing through the position C are estimated with reference to the timing of passing through the position A. Next, the amount of light received at the time of passing through the position B and the amount of light received at the time of passing through the position C are detected at the respective estimated timing. Finally, a difference between the amounts of light received at the time of passing through the position B and at the time of passing through the position C is detected as a tracking error signal. Then, based on the tracking error signal, tracking servo is performed so that the light beam 72 follows the track 70 all the time. However, when the light beam 72 passes through the information recording areas 7, no tracking servo is performed and the state at the time of passing through the previous address servo area 6 is maintained.

A method for producing the tracking error information and a method for tracking servo in the present embodiment are not limited to the foregoing ones, but a push-pull method may also be used, for example. In this case, the address servo areas 6 are provided with a row of pits along the direction of the track, as positioning information to be used for tracking servo, and then, a variation in the shape of light incident on the light-receiving surface of the photodetector 45 is detected to produce tracking error information.

Figure 14:
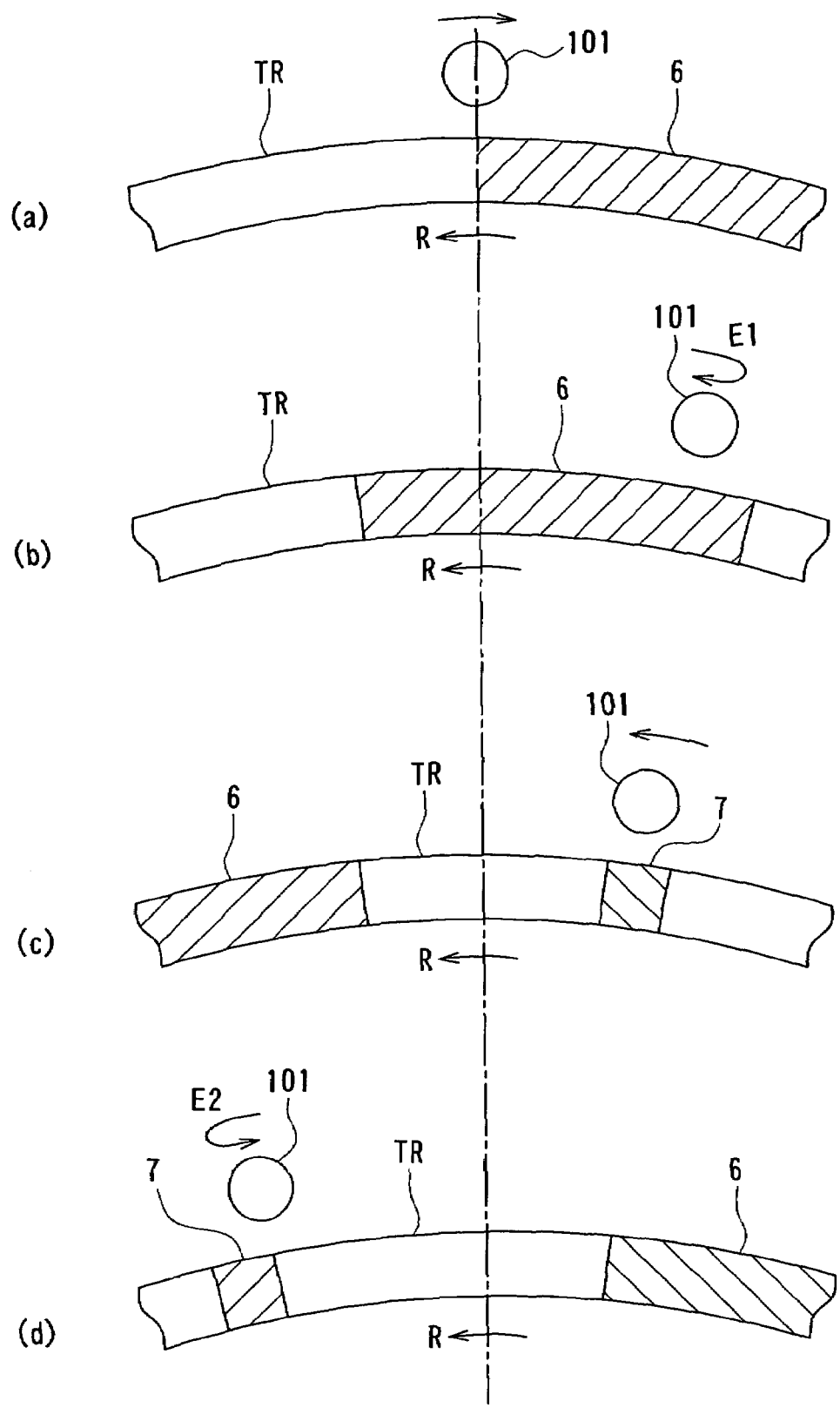
FIG. 14 is an explanatory diagram showing the operation of the optical head during information recording in the first embodiment of the invention.

Now, with reference to FIG. 14, description will be given of the operation of the optical head 40 at the time of recording information. FIG. 14 shows how a track TR and an irradiating position 101 of the information light and the recording-specific reference light move during information recording. In FIG. 14, the symbol R represents the moving direction of the recording medium 1. Although for the sake of convenience FIG. 14 shows the irradiating position 101 so as not to fall on the track TR, in fact the irradiating position 101 falls on the track TR.

In the present embodiment, as shown in FIG. 14(*a*), the irradiating position 101 is moved off the neutral position in a direction (hereinafter referred to as leading direction) that is opposite to the moving direction R of the recording medium 1 before information is recorded in an information recording area 7 of the recording medium 1. Then, the irradiating position 101 passes through an address servo area 6, and the information recorded in the address servo area 6 is detected by the optical head 40.

Next, as shown in FIG. 14(*b*), when the irradiating position 101 has reached the end E1 of its moving range in the leading direction, the irradiating position 101 is then moved in the moving direction R of the recording medium 1 (hereinafter referred to as lagging direction). Immediately after the start of movement of the irradiating position 101 in the lagging direction, the moving speed of the irradiating position 101 is lower than the moving speed of a desired information recording area 7 in which information is to be recorded. Hence, the irradiating position 101 finally overlaps the desired information recording area 7.

As shown in FIG. 14(*c*), when the irradiating position 101 overlaps the desired information recording area 7, the moving speed of the irradiating position 101 is adjusted to become equal to the moving speed of the information recording area 7. Consequently, the irradiating position 101 is moved so as to follow the desired information recording area 7.

Next, as shown in FIG. 14(*d*), when the irradiating position 101 has reached the end E2 of its moving range in the lagging direction, the irradiating position 101 is then moved in the leading direction again to perform the operation shown in FIG. 14(*a*). In this way, the operations shown in FIGS. 14(*a*)–(*d*) are repeated.

As described above, in the present embodiment, the irradiating position 101 of the information light and the recording-specific reference light is moved such that the irradiating position 101 follows a single moving information recording area 7 for a predetermined period. Consequently, the single information recording area 7 is kept being irradiated with the information light and the recording-specific reference light for the predetermined period. Information is thereby recorded in this information recording area 7 in the form of an interference pattern resulting from interference between the information light and the recording-specific reference light. Hereinafter, the period for which the irradiating position 101 follows the information recording area 7 is referred to as a follow-up period, while the other period is referred to as a catch-up period.

Figure 15:
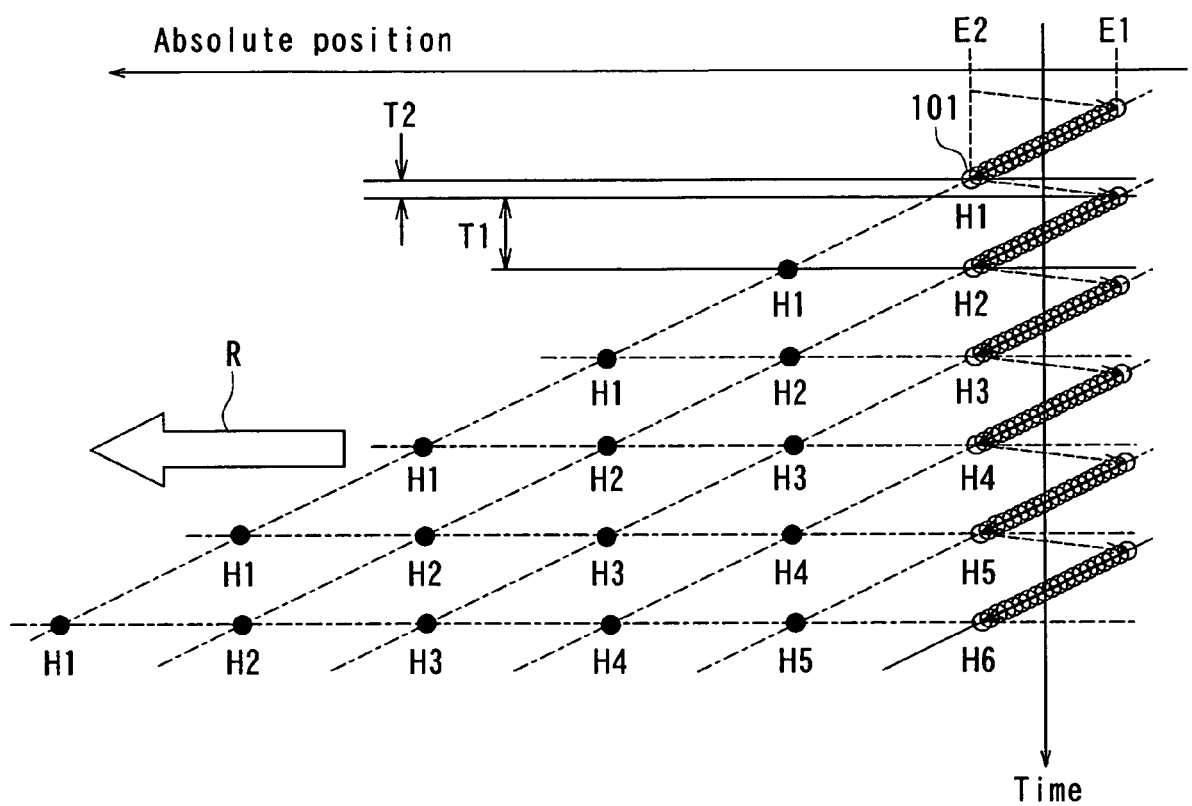
FIG. 15 is an explanatory diagram showing the movement of the irradiating position of the information light and recording-specific reference light in the first embodiment of the invention.

FIG. 15 shows the above-described movement of the irradiating position 101 on the coordinates with the absolute position on the abscissa and the time on the ordinate. As in the foregoing description, the symbols R, E1, and E2 in FIG. 15 represent the moving direction of the recording medium 1, the end of the moving range of the irradiating position 101 in the leading direction, and the end of the moving range of the irradiating position 101 in the lagging direction. In FIG. 15, the symbol T1 represents the follow-up period, and the symbol T2 represents the catch-up period.

As shown in FIG. 15, in the present embodiment, a single information recording area 7 keeps being irradiated with the information light and the recording-specific reference light over the follow-up period T1. An interference pattern resulting from interference between the information light and the recording-specific reference light, i.e., an information-carrying hologram is thereby formed in the information recording area 7. In FIG. 15, the symbols H1 to H6 represent holograms which are recorded in this order.

Figure 16:
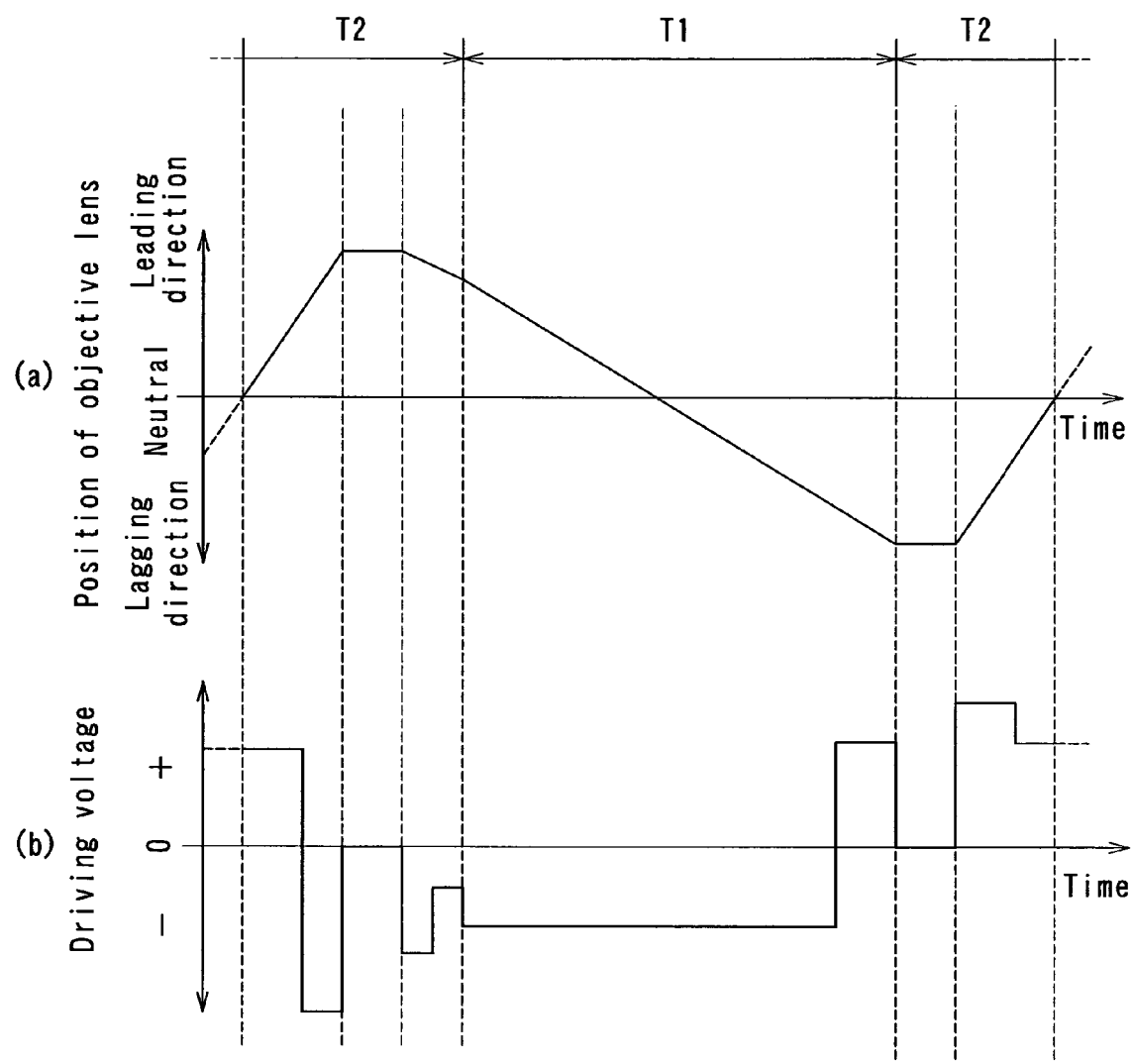
FIG. 16 is an explanatory diagram showing an example of changes in the position of the objective lens and changes in the driving voltage for moving the head body in a direction tangential to the tracks in the first embodiment of the invention.

The movement of the irradiating position 101 is effected by moving the head body 41 which includes the objective lens 11, or the point of emission of the information light and the recording-specific reference light, in a direction generally along the tracks. Here, FIG. 16 shows an example of changes in the position of the objective lens 11 and changes in the driving voltage of the coils 155 to 158 for moving the head body 41 in the direction generally along the tracks. In FIG. 16, (a) illustrates changes in the position of the objective lens 11, and (b) illustrates changes in the driving voltage.

In the example shown in FIG. 16(*a*), for the follow-up period T1, the objective lens 11 moves at a constant speed that is equal to the moving speed of the information recording area 7. During the catch-up period T2, the objective lens 11 stops temporarily at the position of the end of the moving range in the lagging direction, and then starts moving in the leading direction.

Reaching the end of the moving range in the leading direction, the objective lens 11 stops temporarily at that position, and then starts moving in the lagging direction at a speed lower than the moving speed of the information recording area 7.

In the example shown in FIG. 16(*b*), the driving voltage gives the head body 41 power for moving in the leading direction when it has a positive value. The driving voltage gives the head body 41 power for moving in the lagging direction when it has a negative value.

Figure 17:
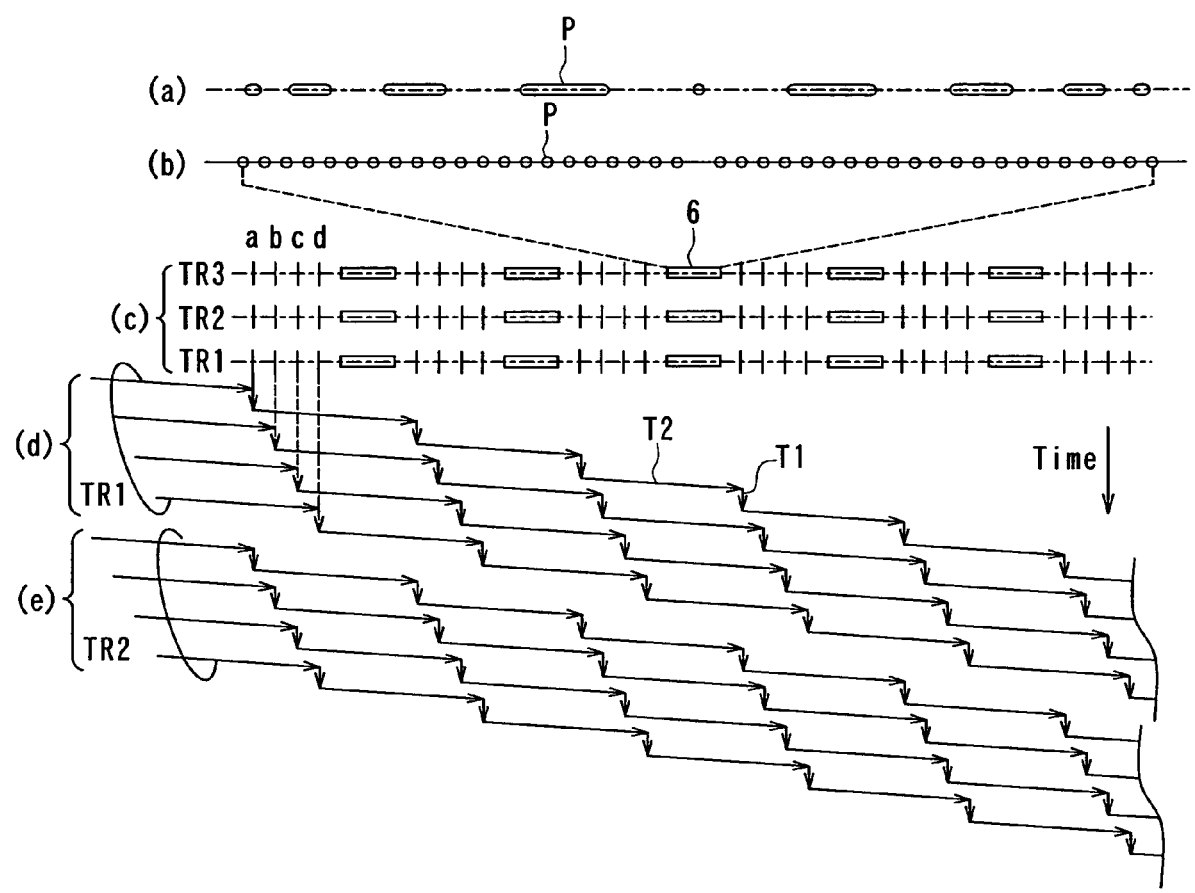
FIG. 17 is an explanatory diagram for explaining a method for adjusting the irradiating position of the information light and the recording-specific reference light to the position of a desired information recording area in the first embodiment of the invention.

Next, with reference to FIG. 17, description will be given of a method for adjusting the irradiating position 101 of the information light and the recording-specific reference light to the position of a desired information recording area 7. FIG. 17(*c*) shows three tracks TR1, TR2, and TR3. In each of the tracks, four information recording areas 7 are arranged between two adjacent address servo areas 6. In FIG. 17(*c*), the positions of these four information recording areas 7 are designated by the symbols a, b, c, and d.

In FIG. 17, (d) and (e) show the traces of the irradiating position 101 of the information light and the recording-specific reference light in performing recording on the tracks TR1 and TR2, respectively. In FIG. 17(*d*) and FIG. 17(*e*), the abscissa represents a relative position of the irradiating position 101 with respect to the tracks shown in FIG. 17(*c*), while the ordinate represents the time. In the present embodiment, during the catch-up period T2, the irradiating position 101 passes through an address servo area 6 so that the information recorded in the address servo area 6 is detected by the optical head 40. Based on the detection output of the optical head 40, the controller 90 in FIG. 2 recognizes the addresses of the information recording areas 7 that lie between the address servo area 6 which the irradiating position 101 has just passed through and the next address servo area 6. While the irradiating position 101 passes through an address servo area 6, a basic clock is generated based on the detection output of the optical head 40.

The controller 90 selects an information recording area 7 to record information in, out of the four information recording areas 7 lying between two adjacent address servo areas 6. The positions of the four information recording areas 7 lying between the two adjacent address servo areas 6, or the positions a to d in FIG. 17(*c*), can be determined by the time that is expressed using the basic clock mentioned above. In accordance with the position of the information recording area 7 to record information in, the controller 90 changes the profile of the driving voltage such as the one shown in FIG. 16, thereby adjusting the irradiating position 101 to the position of that information recording area 7.

In the present embodiment, as shown in FIG. 17(*d*) and FIG. 17(*e*), information recording on a predetermined track is performed as follows. Initially, while the recording medium 1 makes a single turn, information is recorded in each of the information recording areas 7 that fall on the position a of FIG. 17(*c*) on a single track. During the next turn, information is recorded in each of the information recording areas 7 that fall on the position b of FIG. 17(*c*) on the same track. Subsequently, during the next turn, information is likewise recorded in each of the information recording areas 7 that fall on the position c of FIG. 17(*c*) on the same track. During the yet next turn, information is recorded in each of the information recording areas 7 that fall on the position d of FIG. 17(*c*) on the same track. When the recording of information on the information recording areas 7 lying in all the positions a to d on the single track is completed, recording is performed on the next track in the same manner. In FIG. 17(*d*) and FIG. 17(*e*), the traces of the irradiating position 101 for respective turns of the recording medium 1 are shown compressed in the direction of the time axis.

By the way, in the catch-up periods T2, the relative speed of the irradiating position 101 with respect to the recording medium 1 (address servo areas 6) varies in the order of an increase, constant, and decrease. In the case where the information recorded in the address servo areas 6 is detected only in the periods where the relative speed of the irradiating position 101 is constant, the lengths of pits to be recorded in the address servo areas 6 and the lengths between two adjacent pits may be integer multiples of a reference length, for example. In this case, however, the address servo areas 6 cannot be made so great in length.

If the information recorded in the address servo areas 6 is rendered detectable not only in the periods where the relative speed of the irradiating position 101 is constant but also in the periods where the relative speed of the irradiating position 101 increases or decreases, the address servo areas 6 can be made greater in length to record a greater amount of information in the address servo areas 6. In this case, however, the time of pits and the time between pits in the detection output of the optical head 40 vary depending on the relative speed of the irradiating position 101 even if the lengths of the pits and the lengths between two adjacent pits are constant. Some measures are thus required in order to generate accurate basic clocks and recognize the information recorded in the address servo areas 6 with accuracy. Hereinafter, two examples will be given of such measures.

For a first measure, as shown in FIG. 17(*a*), the reference length to the lengths of the pits P to be recorded in the address servo areas 6 and to the lengths between two adjacent pits P is changed in proportion to the relative speed of the irradiating position 101. In FIG. 17(*a*), the center pit is a special pit indicating the center position of the address servo area 6.

For a second measure, as shown in FIG. 17(*b*), the reference length to the lengths of the pits P to be recorded in the address servo areas 6 and to the lengths between two adjacent pits P is unchanged while the signal processing circuit 89 in FIG. 2 converts the time of pits and the time between pits in the detection output of the optical head 40 into actual lengths of the pits and actual lengths between the pits.

Figure 18:
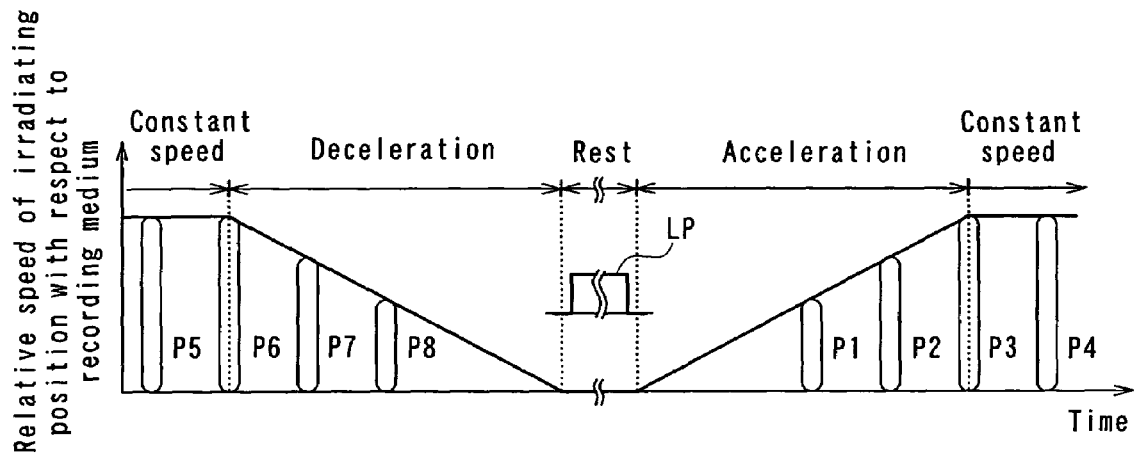
FIG. 18 is an explanatory diagram showing a concrete example of variations in the length of a pit in the first embodiment of the invention.

FIG. 18 shows a concrete example of changes in the length of a pit when the foregoing first measure is adopted. In FIG. 18, the ordinate shows the relative speed of the irradiating position 101 with respect to the recording medium 1 (address servo areas 6), and the abscissa shows the time. In FIG. 18, the symbols P1 to P8 represent the pits at the respective timing. The pits P1 to P8 shall be considered to have the same length in terms of signal processing. In FIG. 18, the symbol LP represents a change in the power of the semiconductor laser 43. In the first measure, the pits P1 to P8 have lengths proportional to the relative speed of the irradiating position 101. In the detection output of the optical head 40, the pits P1 to P8 are thus of constant time. Consequently, when the first measure is adopted, the lengths of pits and the lengths between pits can be recognized from the time of the pits and the time between the pits in the detection output of the optical head 40 as is, which allows recognition of the information recorded in the address servo areas 6.

Figure 19:
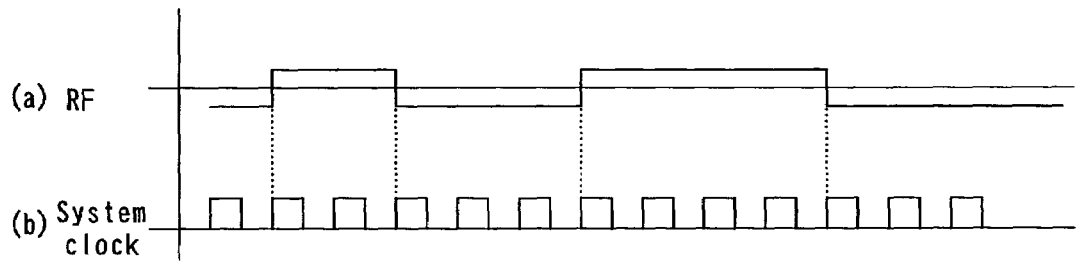
FIG. 19 is an explanatory diagram showing a concrete example of variations in the time for a pit and the time between pits in the first embodiment of the invention.

FIG. 19 shows a concrete example of changes in the time of a pit and the time between pits when the foregoing second measure is adopted. FIG. 19 shows the case where the irradiating position 101 passes through a pit row having pits of constant length and constant intervals, in a period where the relative speed of the irradiating position 101 decreases. In FIG. 19, (a) shows a reproduction signal RF outputted from the detection circuit 85 in FIG. 2; and (b) shows the system clock used in the optical information recording/reproducing apparatus. In (a), a high-level period corresponds to the period of a pit, and a low level period corresponds to the period between two adjacent pits. As shown in FIG. 19(a), in the period where the relative speed of the irradiating position 101 decreases, the time of pits and the time between pits in the reproduction signal RF increase gradually even if the lengths of the pits and the lengths between the pits are constant. The signal processing circuit 89 in FIG. 2 obtains the information on the relative speed of the irradiating position 101 from the controller 90, and multiplies the time of the pits and the time between the pits in the reproduction signal RF by the relative speed of the irradiating position 101 to determine the lengths of the pits and the lengths between the pits. The lengths of the pits and the lengths between the pits calculated in this way coincide with the actual lengths of the pits and the actual lengths between the pits. Thus, when the second measure is adopted, the lengths of the pits and the lengths between the pits obtained by calculation can be used to recognize the information recorded in the address servo areas 6.

As has been described, in the present embodiment, the irradiating position of the information light and the recording-specific reference light is moved so as to follow a single moving information recording area 7 for a predetermined period. As a result, the single information recording area 7 is kept being irradiated with the information light and the recording-specific reference light for the predetermined period. Therefore, according to the embodiment, it is possible to irradiate the information recording areas 7 with the information light and the recording-specific reference light for a sufficient time period to record information in the information recording areas 7 without causing a deviation between the information recording areas 7 and the irradiating position of the information light and the recording-specific reference light. Consequently, according to the embodiment it is possible to record information in each of a plurality of information recording areas 7 through the use of holography with the semiconductor laser 43, which is a practical light source, while rotationally moving the recording medium 1 having the plurality of information recording areas 7.

In the present embodiment, the recording medium 1 is provided with the address servo areas 6. The address servo areas 6 contain address information for identifying the individual information recording areas 7 and positioning information for adjusting the irradiating position of the information light, the recording-specific reference light, and the reproduction-specific reference light with respect to the individual information recording areas 7. The optical information recording/reproducing apparatus detects the address information recorded in the address servo areas 6 and thereby identifies the individual information recording areas 7. According to the present embodiment, it is thus easy to identify the individual information recording areas 7. In addition, the optical information recording/reproducing apparatus detects the positioning information recorded in the address servo areas 6, and thereby adjusts the irradiating position of the information light, the recording-specific reference light, and the reproduction-specific reference light with respect to the individual information recording areas 7. According to the present embodiment, the irradiating position of the information light, the recording-specific reference light, and the reproduction-specific reference light can thus be easily adjusted to the individual information recording areas 7.

In the present embodiment, for information recording, the information recording layer 3 of the recording medium 1 is irradiated with the information light that is spatially modulated in phase based on information to be recorded, and the recording-specific reference light, so that the information is recorded on the information recording layer 3 in the form of an interference pattern resulting from interference between the information light and the recording-specific reference light. For information reproduction, the information recording layer 3 is irradiated with the reproduction-specific reference light. Then, reproduction light thereby generated from the information recording layer 3 is superimposed on the reproduction-specific reference light to produce composite light, and this composite light is detected to reproduce the information.

Consequently, according to the present embodiment, the reproduction light and the reproduction-specific reference light need not be separated from each other at the time of information reproduction. Then, at the time of information recording, it is not necessary that the information light and the recording-specific reference light form a predetermined angle therebetween when incident on the recording medium. In fact, in the embodiment, irradiation with the information light, the recording-specific reference light and the reproduction-specific reference light, and collection of the reproduction light are performed on the same side of the information recording layer 3 such that the information light, the recording-specific reference light, the reproduction-specific reference light and the reproduction light are arranged coaxially. Accordingly, the present embodiment allows a compact configuration of the optical system for recording and reproduction.

In conventional methods for reproduction, the reproduction light and the reproduction-specific reference light are separated to detect the reproduction light alone. Hence, there has been a problem that the reproduced information deteriorates in S/N ratio if the reproduction-specific reference light is also incident on the photodetector for detecting the reproduction light. On the contrary, in the present embodiment, both the reproduction light and the reproduction-specific reference light are used to reproduce information, and therefore the S/N ratio of the reproduced information cannot be deteriorated by the reproduction-specific reference light. Consequently, the present embodiment can improve the S/N ratio of the reproduced information.

Moreover, according to the present embodiment, the information light, the recording-specific reference light, and the reproduction-specific reference light are all arranged coaxially and converge to become minimum in diameter at the same position. The optical system for recording and reproduction can thus be simplified in configuration.

[Second Embodiment]

Figure 20:
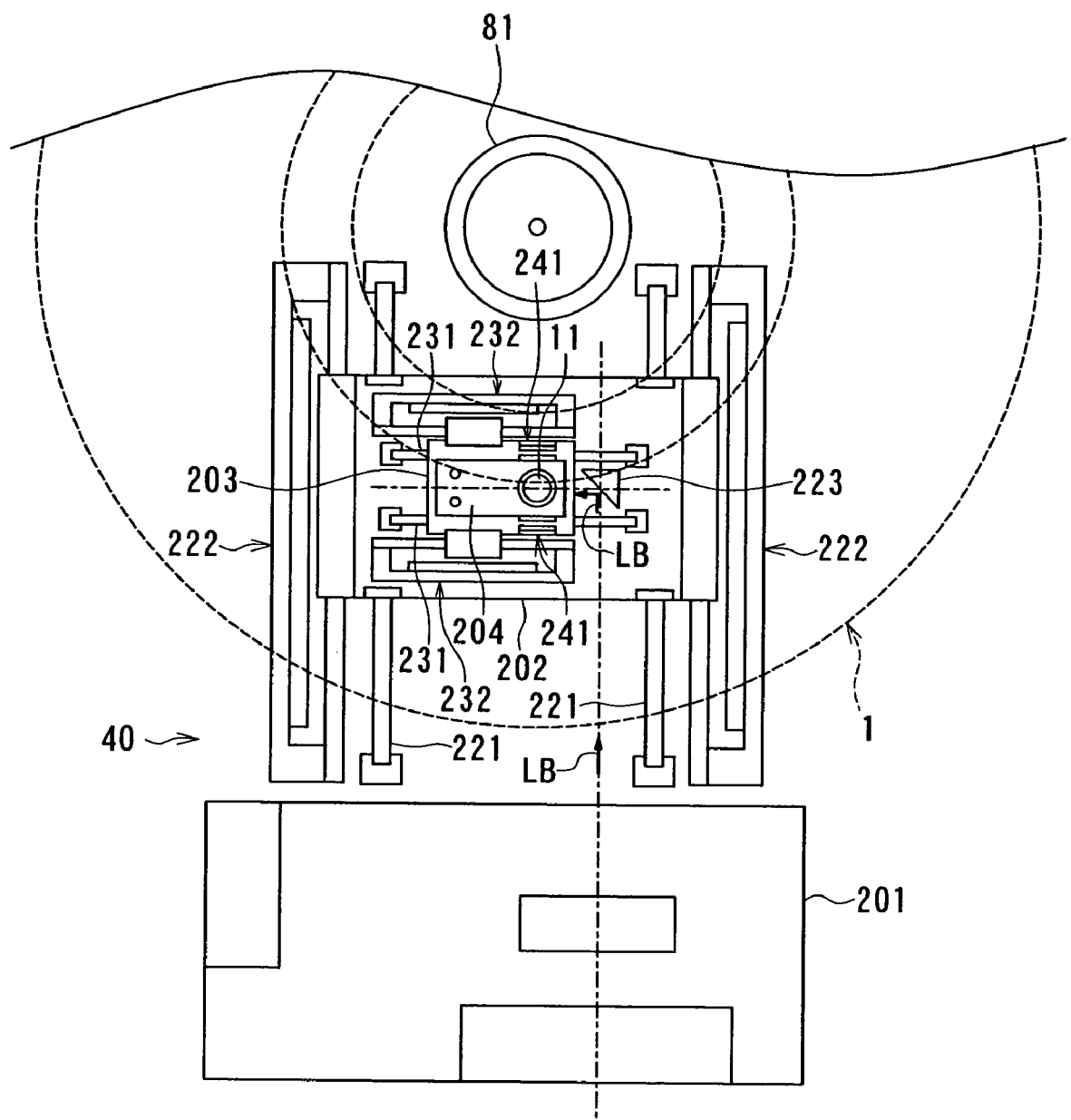
FIG. 20 is a plan view showing a driving mechanism of an optical head of an optical information recording/reproducing apparatus according to a second embodiment of the invention.

Next, description will be given of an optical information recording/reproducing apparatus according to a second embodiment of the invention. FIG. 20 is a plan view showing the driving mechanism of an optical head of the optical information recording/reproducing apparatus according to the present embodiment. The present embodiment differs from the first embodiment as to the driving mechanism of the optical head.

The optical head 40 of the present embodiment has a fixed portion 201, a first movable portion 202, and a second movable portion 203. The fixed portion 201 is fixed to the body of the optical information recording/reproducing apparatus. Two rails 221 extending in a direction of the radius of the recording medium 1 (vertical direction in FIG. 20) are attached to the body of the optical information recording/reproducing apparatus. The first movable portion 202 is supported by the two rails 221 so as to be movable in a direction of the radius of the recording medium 1. The optical head 40 further has linear motors 222 for moving the first movable portion 202 with respect to the body of the optical information recording/reproducing apparatus in a direction of the radius of the recording medium 1.

Two rails 231 extending in a direction tangential to the tracks (horizontal direction in FIG. 20) are attached to the first movable portion 202. The second movable portion 203 is supported by the two rails 231 so as to be movable in a direction tangential to the tracks. The optical head 40 further has linear motors 232 for moving the second movable portion 203 with respect to the first movable portion 202 in a direction tangential to the tracks.

A support plate 204 for supporting the objective lens 11 to be movable in a direction perpendicular to the surface of the recording medium 1 (a direction orthogonal to the plane of the drawing sheet of FIG. 20) is attached to the second movable portion 203. The optical head 40 also has an actuator 241 for moving the objective lens 11 with respect to the second movable portion 203 in a direction perpendicular to the surface of the recording medium 1.

In the optical head 40 of the present embodiment, of the recording/reproducing optical system, the objective lens 11 is attached to the support plate 204, while most of the other parts are provided on the fixed portion 201. The first movable portion 202 and the second movable portion 203 have a relay optical system for directing the light LB from the optical system provided on the fixed portion 201 to the objective lens 11 and for directing the light incident on the objective lens 11 from the recording medium 1 to the optical system provided on the fixed portion 201. FIG. 20 shows a mirror 223 which is fixed to the first movable portion 202 and constitutes part of the relay optical system.

According to the optical head 40 of the present embodiment, the actuator 241 can change the position of the objective lens 11 in a direction perpendicular to the surface of the recording medium 1, thereby allowing focus servo. In addition, according to the optical head 40, the linear motors 222 can change the position of the objective lens 11 in a direction of the radius of the recording medium 1, thereby allowing access to a desired track and tracking servo. Furthermore, according to the optical head 40, the linear motors 232 can change the position of the objective lens 11 in a direction tangential to the tracks, i.e., in a direction generally along the tracks. This allows control of the irradiating position of the information light and the recording-specific reference light to follow the information recording areas 7. The linear motors 232 correspond to the irradiating position moving device of the invention.

The actuator 241 is driven by the focus servo circuit 86 shown in FIG. 2. The linear motors 222 are driven by the tracking servo circuit 87 and the slide servo circuit 88 shown in FIG. 2. The linear motors 232 are driven by the follow-up control circuit 94 shown in FIG. 2.

In the present embodiment, the driving device 84 shown in FIG. 2 is not provided because the optical head 40 has the function of the driving device 84. The present embodiment is not provided with the function of correcting the relative inclination between the recording medium 1 and the optical head 40. Thus, the inclination correction circuit 93 shown in FIG. 2 is not provided.

The remainder of the configuration, operations, and effects of the present embodiment are the same as those of the first embodiment.

[Third Embodiment]

Figure 21:
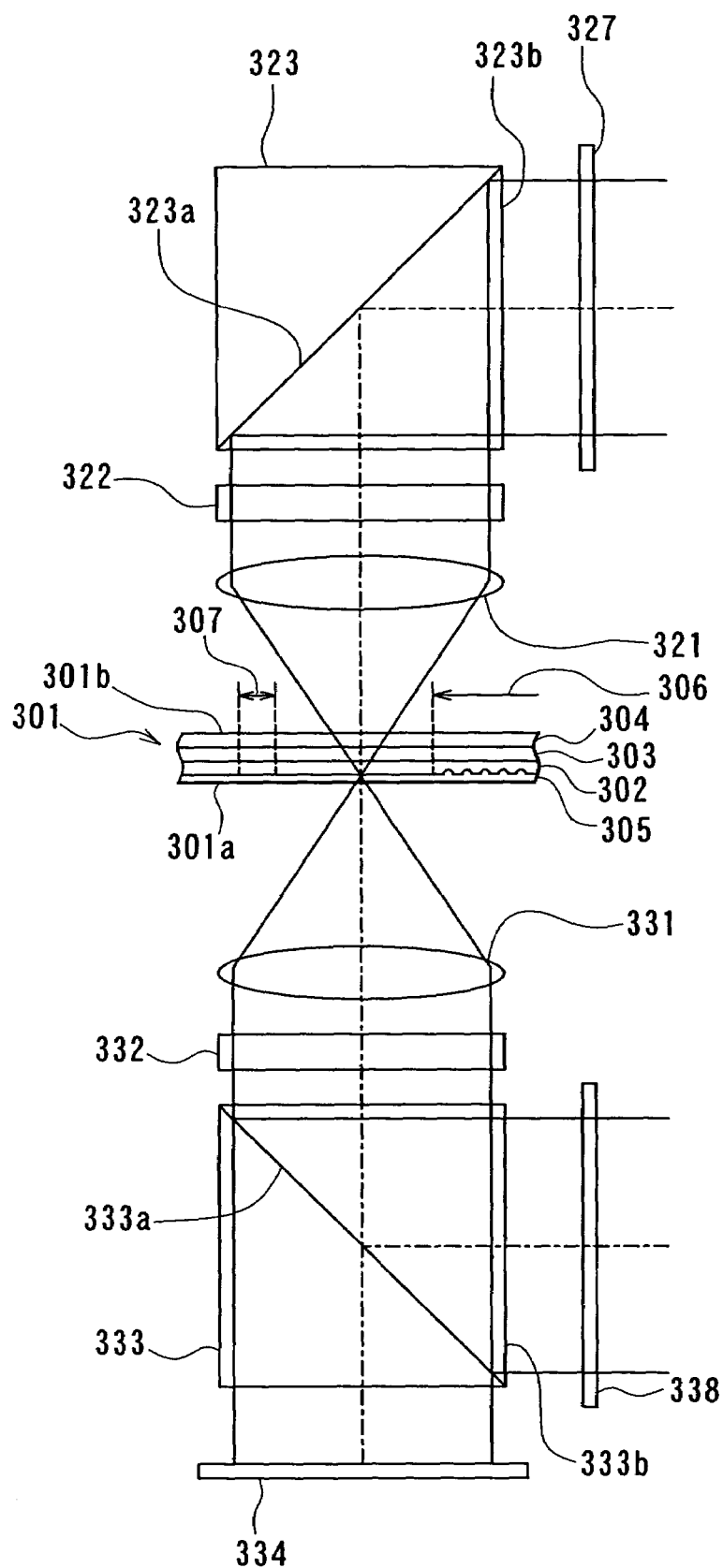
FIG. 21 is an explanatory diagram showing essential parts of a recording/reproducing optical system of an optical information recording/reproducing apparatus according to a third embodiment of the invention.

Next, description will be given of an optical information recording/reproducing apparatus according to a third embodiment of the invention. FIG. 21 is an explanatory diagram showing essential parts of a recording/reproducing optical system of the optical information recording/reproducing apparatus according to the present embodiment.

First, with reference to FIG. 21, description will given of a configuration of a recording medium according to the present embodiment. The recording medium 301 according to the present embodiment is disk-shaped and has a plurality of tracks, like the recording medium 1 of the first embodiment. Each of the tracks has a plurality of address servo areas 306 arranged at regular intervals. One or more information recording areas 307 are provided between adjacent ones of the address servo areas 306.

The recording medium 301 comprises two disk-shaped transparent substrates 302 and 304 made of polycarbonate or the like, an information recording layer 303 provided between the transparent substrates 302 and 304, and a protective layer 305 provided to be adjacent to a surface of the transparent substrate 302 opposite to the information recording layer 303.

The information recording layer 303 is a layer on which information is recorded through the use of holography, and is made of the same hologram material as that for the information recording layer 3 of the recording medium 1 of the first embodiment.

In the recording medium 301, the surface of the protective layer 305 opposite to the transparent substrate 302 (the lower surface in FIG. 21) acts as a first surface 301a on which recording-specific reference light and reproduction-specific reference light are incident and from which reproduction light exits. The surface of the transparent substrate 304 opposite to the information recording layer 303 (the upper surface in FIG. 21) acts as a second surface 301b on which information light carrying information to be recorded is incident.

In the address servo areas 306, emboss pits for expressing address information and the like are formed in the interface between the transparent substrate 302 and the protective layer 305. Focus servo may also be performed by using the interface between the transparent substrate 302 and the protective layer 305.

Figure 22:
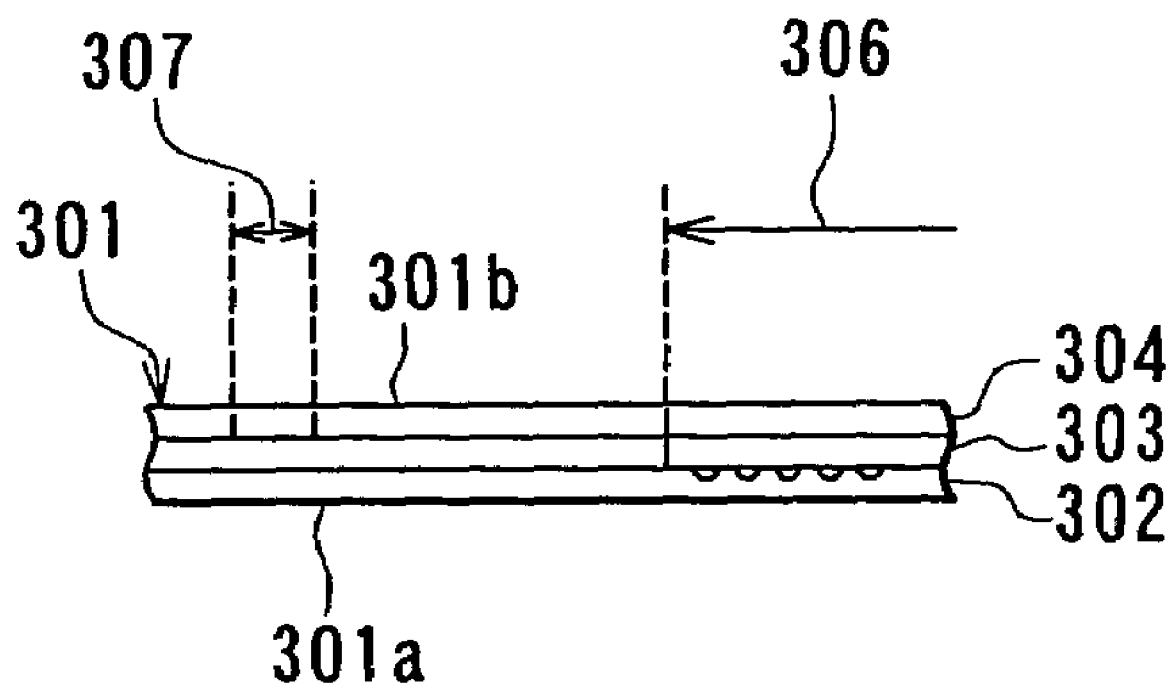
FIG. 22 is an explanatory diagram showing another example of an optical information recording medium in the third embodiment of the invention.

As shown in FIG. 22, the recording medium 301 may be designed such that the emboss pits for expressing address information and the like are formed in the interface between the transparent substrate 302 and the information recording layer 303 in the address servo areas 306. In this case, the protective layer 305 is unnecessary.

Now, with reference to FIG. 21, description will be given of essential parts of the recording/reproducing optical system of the optical information recording/reproducing apparatus according to the present embodiment. The recording/reproducing optical system has an objective lens 321 that faces toward the transparent substrate 304 of the recording medium 301, and a quarter-wave plate 322 and a polarization beam splitter 323 that are arranged in this order from the objective lens 321, on a side of the objective lens 321 opposite from the recording medium 301. The polarization beam splitter 323 has a polarization beam splitter surface 323a for reflecting S-polarized light and transmitting P-polarized light. The polarization beam splitter surface 323a forms 45° with the surface of the recording medium 301. In the polarization beam splitter 323, the surface on the right side in FIG. 21 serves as an information light incidence surface 323b. The recording/reproducing optical system further has a spatial light modulator 327 which is disposed on the optical path of light incident on the information light incidence surface 323b of the polarization beam splitter 323. The spatial light modulator 327 has a number of pixels arranged in a matrix, and is capable of generating information light that carries information by spatially modulating the intensity of outgoing light, by selecting, for example, a light-transmitting state or a light-blocking state for each of the pixels. For example, a liquid crystal device may be used as the spatial light modulator 327.

The recording/reproducing optical system further has an objective lens 331 that faces toward the protective layer 305 of the recording medium 301, and a quarter-wave plate 332, a polarization beam splitter 333, and a photodetector 334 that are arranged in this order from the objective lens 331, on a side of the objective lens 331 opposite from the recording medium 301. The polarization beam splitter 333 has a polarization beam splitter surface 333a for reflecting S-polarized light and transmitting P-polarized light. The polarization beam splitter surface 333a forms 45° with the surface of the recording medium 301. In the polarization beam splitter 333, the surface on the right side in FIG. 21 serves as a reference light incidence surface 333b. The recording/reproducing optical system further has a phase spatial light modulator 338 which is disposed on the optical path of light incident on the reference light incidence surface 333b of the polarization beam splitter 333. The phase spatial light modulator 338 has a number of pixels arranged in a matrix, and is capable of spatially modulating the phase of light by selecting the phase of outgoing light from between two values or from among three or more values for each of the pixels.

The photodetector 334 has a number of pixels arranged in a matrix, and is capable of detecting the intensity of light received by each pixel. A CCD type solid state image pick-up device, a MOS type solid state image pick-up device, or a smart optical sensor may be used for the photodetector 334.

A general configuration of the recording/reproducing optical system of the optical information recording/reproducing apparatus according to the present embodiment will now be described with reference to FIG. 23.

Initially, description will be given of the parts of the recording/reproducing optical system related to information light. The recording/reproducing optical system has the objective lens 321, the quarter-wave plate 322, and the polarization beam splitter 323 described above. The recording/reproducing optical system further has a convex lens 324, a pin hole 325, a convex lens 326, and the spatial light modulator 327 that are arranged in this order from the polarization beam splitter 323 on the optical path of light incident on the information light incidence surface 323b of the polarization beam splitter 323.

The convex lens 324 and the convex lens 326 have the same focal length. The focal length shall be indicated by fs. The center of the convex lens 324, the pin hole 325, the center of the convex lens 326, and the image forming plane of the spatial light modulator 327 are arranged at intervals of the focal length fs. Thus, parallel beams having passed through the spatial light modulator 327 are collected by the convex lens 326 to become minimum in diameter at the position of the pin hole 325, and pass through the pin hole 325. The light having passed through the pin hole 325 becomes diverging light, and is incident on the convex lens 324. It then becomes parallel beams to be incident on the information light incidence surface 323b of the polarization beam splitter 323. An image plane 351 conjugate to the image forming plane of the spatial light modulator 327 is formed between the convex lens 324 and the polarization beam splitter 323 at a distance of the focal length fs from the center of the convex lens 324.

Where f1 represents a distance between the center of the polarization beam splitter 323 and the image plane 351, f2 represents a distance between the center of the polarization beam splitter 323 and the center of the objective lens 321, and f represents the focal length of the objective lens 321, there holds $f=f1+f2$. The interface between the transparent substrate 302 and the protective layer 305 of the recording medium 301 is located at a distance of the focal length f from the center of the objective lens 321. With such a configuration, it is possible to locate the spatial light modulator 327 at a distance from the objective lens 321, which allows greater design flexibility in the optical system.

Now, description will be given of the parts of the recording/reproducing optical system related to recording-specific reference light, reproduction-specific reference light, and reproduction light. The recording/reproducing optical system has the objective lens 331, the quarter-wave plate 332, the polarization beam splitter 333, and the photodetector 334 described previously. The recording/reproducing optical system further has a polarization beam splitter 335 which is disposed on the optical path of light incident on the reference light incidence surface 333b of the polarization beam splitter 333. The polarization beam splitter 335 has a polarization beam splitter surface 335a for reflecting S-polarized light and transmitting P-polarized light. The polarization beam splitter surface 335a lies in parallel with the polarization beam splitter surface 333a of the polarization beam splitter 333.

The recording/reproducing optical system further has a convex lens 336, a concave lens 337, and the phase spatial light modulator 338 that are arranged in this order from the polarization beam splitter 335, below the polarization beam splitter 335 in FIG. 23. The phase spatial light modulator 338 is of reflection type. An image plane 352 conjugate to the image forming plane of the phase spatial light modulator 338 is formed between the polarization beam splitter 335 and the polarization beam splitter 333.

The distance between the center of the polarization beam splitter 333 and the image plane 352 is f1, the same as the distance between the center of the polarization beam splitter 323 and the image plane 351. The distance between the center of the polarization beam splitter 333 and the center of the objective lens 331 is f2, the same as the distance between the center of the polarization beam splitter 323 and the center of the objective lens 321. The focal length of the objective lens 331 is f, the same as the focal length of the objective lens 321. The interface between the transparent substrate 302 and the protective layer 305 of the recording medium 301 is located at a distance of the focal length f from the center of the objective lens 331. With such a configuration, it is possible to locate the phase spatial light modulator 338 at a distance from the objective lens 331, which allows greater design flexibility in the optical system.

Figure 23:
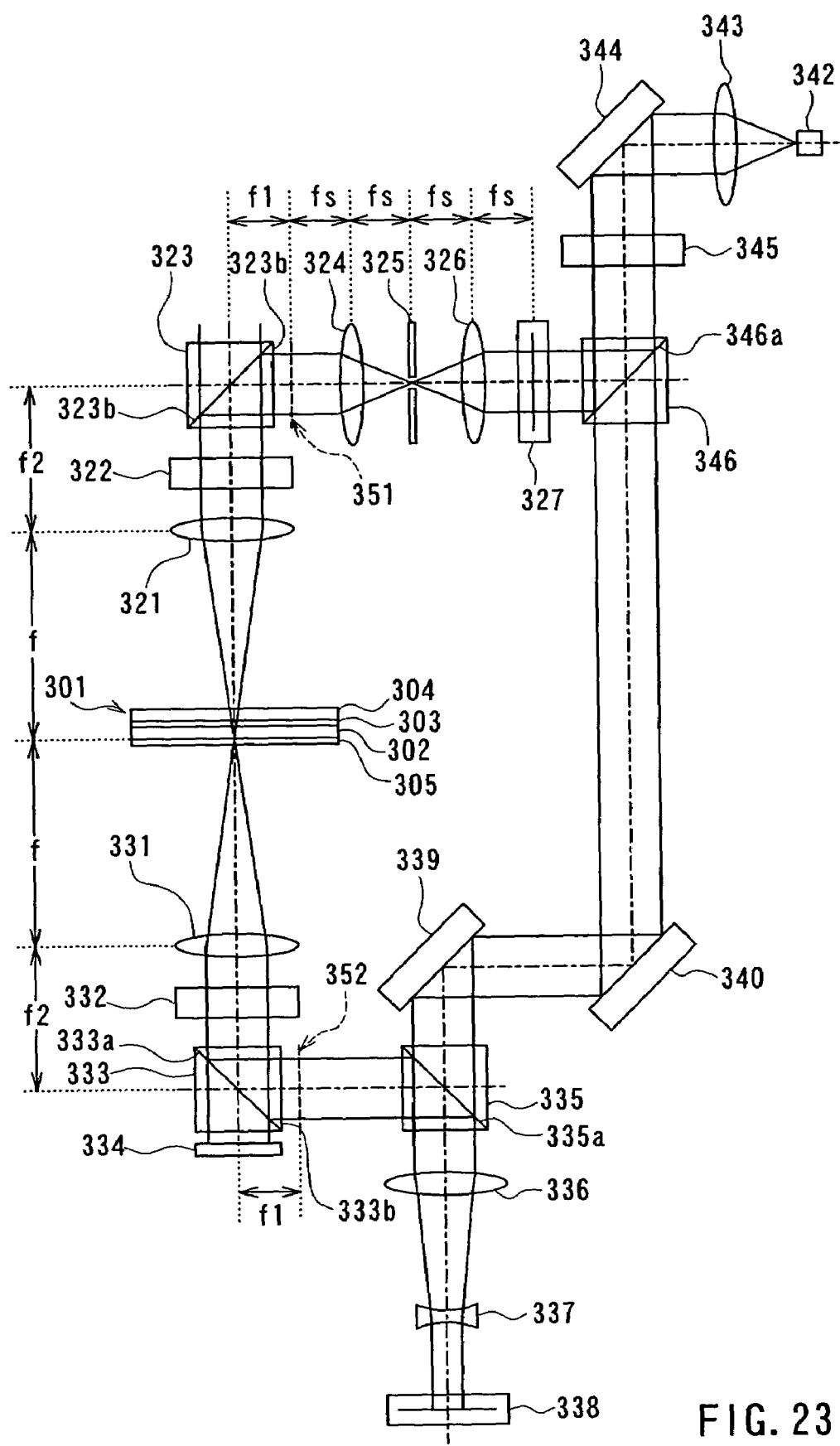
FIG. 23 is an explanatory diagram showing a general configuration of the recording/reproducing optical system of the optical information recording/reproducing apparatus according to the third embodiment of the invention.

Above the polarization beam splitter 335 in FIG. 23, the recording/reproducing optical system further has a mirror 339 disposed to form 90° with respect to the polarization beam splitter surface 335a, and a mirror 340 disposed in parallel with the mirror 339.

Now, description will be given of the parts of the recording/reproducing optical system common to the information light, the recording-specific reference light, and the reproduction-specific reference light. The recording/reproducing optical system has a semiconductor laser 342 that emits coherent linearly polarized laser light, and a collimator lens 343, a mirror 344, a rotation-causing optical element 345, and a polarization beam splitter 346 that are arranged in this order from the semiconductor laser 342 on the optical path of the light emitted from the semiconductor laser 342. For example, a half-wave plate or an optical rotation plate is used as the rotation-causing optical element 345. The polarization beam splitter 346 has a polarization beam splitter surface 346a for reflecting S-polarized light and transmitting P-polarized light.

For plain representation of the essential parts of the recording/reproducing optical system shown in FIG. 23, FIG. 21 shows the spatial light modulator 327 as being located at the position of the image plane 351 and the phase spatial light modulator 338 as being transmission type and located at the position of the image plane 352.

Description will now be given of the outline of operation of the recording/reproducing optical system shown in FIG. 23. The semiconductor laser 342 emits S-polarized linear light or P-polarized linear light. The collimator lens 343 collimates the light emitted by the semiconductor laser 342 into parallel beams for exit therefrom. The rotation-causing optical element 345 optically rotates the light that has exited the collimator lens 343 and has been reflected by the mirror 344, to emit light including S-polarized components and P-polarized components.

The S-polarized components of the light having exited the rotation-causing optical element 345 are reflected by the polarization beam splitter surface 346a of the polarization beam splitter 346 to be incident on the spatial light modulator 327. The spatial light modulator 327 spatially modulates the intensity of the light to generate information light. The information light having exited the spatial light modulator 327 passes through the convex lens 326, the pin hole 325, and the convex lens 324 in succession, and is reflected by the polarization beam splitter surface 323a of the polarization beam splitter 323 to be incident on the quarter-wave plate 322. The information light having passed through the quarter-wave plate 322 becomes circularly polarized light, is collected by the objective lens 321, and is applied to the recording medium 301 while converging to become minimum in diameter on the interface between the transparent substrate 302 and the protective layer 305. The optical system consisting of the convex lens 326, the pin hole 325, and the convex lens 324 may exercise spatial filtering.

On the other hand, the P-polarized components of the light having exited the rotation-causing optical element 345 are transmitted through the polarization beam splitter surface 346a of the polarization beam splitter 346, reflected by the mirrors 340 and 339, transmitted through the polarization beam splitter surface 335a of the polarization beam splitter 335, pass through the convex lens 336 and the concave lens 337, and impinge on the phase spatial light modulator 338 as parallel beams. For example, the phase spatial light modulator 338 sets the phase of outgoing light to either of two values differing by π (rad) from each other for each pixel, thereby spatially modulating the phase of the light. The light modulated by the phase spatial light modulator 338 serves as recording-specific reference light or reproduction-specific reference light. Furthermore, the phase spatial light modulator 338 rotates the direction of polarization of outgoing light by 90° with respect to the direction of polarization of incident light. The light that exits the phase spatial light modulator 338 thus becomes S-polarized light. The light having exited the phase spatial light modulator 338 passes through the concave lens 337 and the convex lens 336, is reflected by the polarization beam splitter surface 335a of the polarization beam splitter 335, and is further reflected by the polarization beam splitter surface 333a of the polarization beam splitter 333 to be incident on the quarter-wave plate 332. The light having passed through the quarter-wave plate 332 becomes circularly polarized light, is collected by the objective lens 331, and is applied to the recording medium 301 while converging to become minimum in diameter on the interface between the transparent substrate 302 and the protective layer 305.

Return light that results when the light applied to the recording medium 301 by the objective lens 331 is reflected off the interface between the transparent substrate 302 and the protective layer 305, or reproduction light that occurs from the information recording layer 303 according to the reproduction-specific reference light applied to the recording medium 301 by the objective lens 331 is collimated through the objective lens 331, passes through the quarter-wave plate 332 to become P-polarized light, and passes through the polarization beam splitter surface 333a of the polarization beam splitter 333 to be incident on the photodetector 334.

When the recording medium 301 is configured as shown in FIG. 22, the light from the objective lens 321 and the light from the objective lens 331 are both applied to the recording medium 301 while converging to become minimum in diameter on the interface between the transparent substrate 302 and the information layer 303.

Next, with reference to FIG. 24, description will be given of the configuration of the optical information recording/reproducing apparatus according to the present embodiment. The optical information recording/reproducing apparatus 310 has an optical head lower portion 40A, an optical head upper portion 40B, and a fixed portion 40C instead of the optical head 40 and the driving device 84 in the optical information recording/reproducing apparatus 10 according to the first embodiment which is shown in FIG. 2. The optical head lower portion 40A is placed under the recording medium 301 to irradiate the recording medium 301 with recording-specific reference light or reproduction-specific reference light and to collect reproduction light. The optical head upper portion 40B is placed over the recording medium 301 to irradiate the recording medium 301 with information light. The fixed portion 40C is fixed to the body of the optical information recording/reproducing apparatus 310.

Among the components of the recording/reproducing optical system shown in FIG. 23, the optical head lower portion 40A contains the objective lens 331, the quarter-wave plate 332, the polarization beam splitter 333, the photodetector 334, the polarization beam splitter 335, the convex lens 336, the concave lens 337, the phase spatial light modulator 338, and the mirror 339. Among the components of the recording/reproducing optical system shown in FIG. 23, the optical head upper portion 40B contains the objective lens 321, the quarter-wave plate 322, the polarization beam splitter 323, the convex lens 324, the pin hole 325, the convex lens 326, and the phase spatial light modulator 327. The fixed portion 40C contains the semiconductor laser 342, the collimator lens 343, the mirror 344, the rotation-causing optical element 345, the polarization beam splitter 346, and the mirror 340.

The optical head lower portion 40A and the optical head upper portion 40B are each driven by the same driving mechanism as that of the optical head 40 shown in FIG. 20, while maintaining an opposite positional relationship with each other with the recording medium 301 in between. In the present embodiment, the driving device 84 shown in FIG. 2 is not provided because the optical head lower portion 40A and the optical head upper portion 40B each have the function of the driving device 84. The present embodiment is not provided with the function of correcting the relative inclinations of the recording medium 301 to the optical head lower portion 40A and the optical head upper portion 40B. Thus, the inclination correction circuit 93 shown in FIG. 2 is not provided. The circuit configuration of the optical information recording/reproducing apparatus 310 is otherwise the same as that of the optical information recording/reproducing apparatus 10 shown in FIG. 2.

According to the optical head lower portion 40A and the optical head upper portion 40B of the present embodiment, the actuator 241 in FIG. 20 can change the positions of the objective lenses 321, 331 in a direction perpendicular to the surface of the recording medium 301, thereby allowing focus servo. Additionally, according to the optical head lower portion 40A and the optical head upper portion 40B, the linear motors 222 in FIG. 20 can change the positions of the objective lenses 321, 331 in a direction of the radius of the recording medium 301, thereby allowing access to a desired track and tracking servo. Furthermore, according to the optical head lower portion 40A and the optical head upper portion 40B, the linear motors 232 can change the positions of the objective lenses 321, 331 in a direction tangential to the tracks, i.e., in a direction generally along the tracks. This allows control of the irradiating position of the information light and the recording-specific reference light to follow the information recording areas 307.

Figure 24:
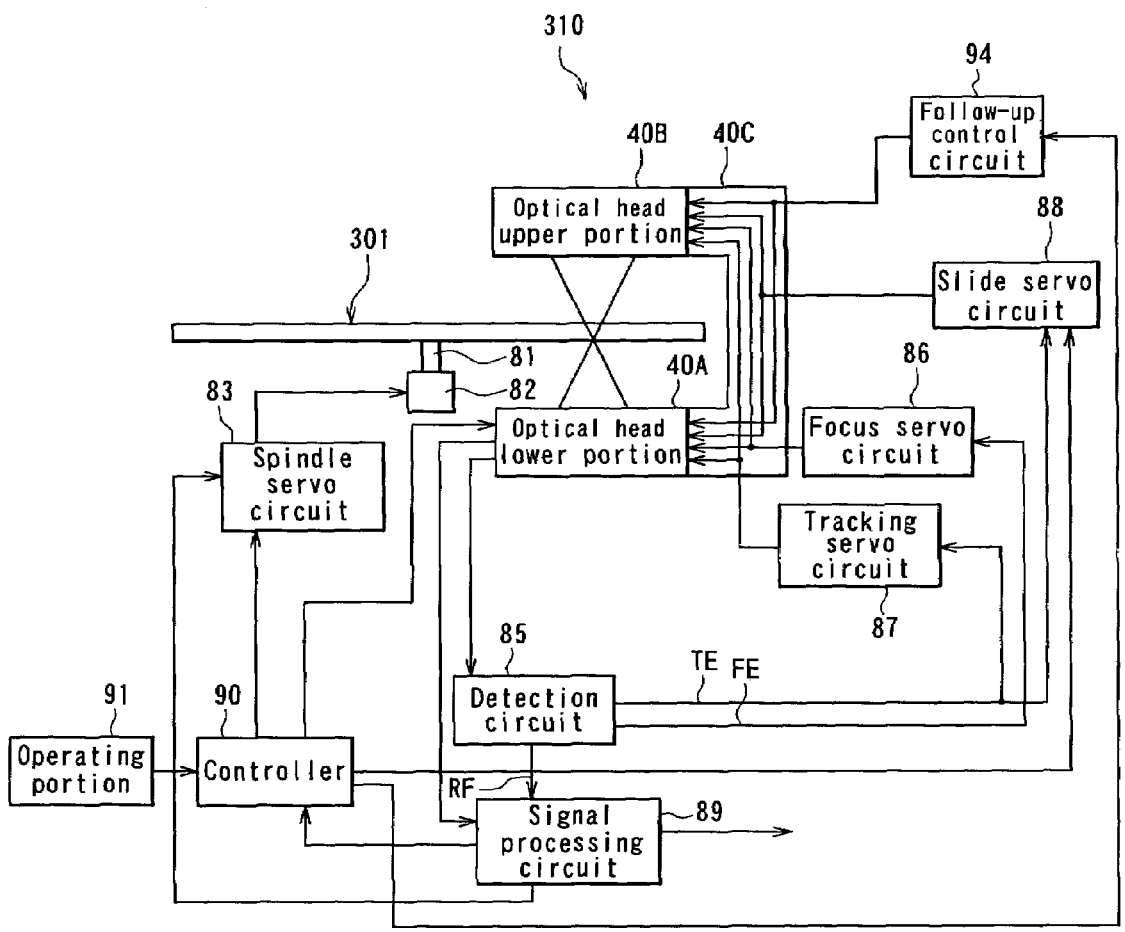
FIG. 24 is a block diagram showing a configuration of the optical information recording/reproducing apparatus according to the third embodiment of the invention.

The semiconductor laser 342, the spatial light modulator 327, and the phase spatial light modulator 338 are controlled by the controller 90 shown in FIG. 24. The controller 90 holds information on a plurality of modulation patterns for spatially modulating the phase of light with the phase spatial light modulator 338. The operating portion 91 can select any one of the plurality of modulation patterns. Then, the controller 90 supplies the information on a modulation pattern selected by itself according to predetermined conditions or a modulation pattern selected by the operating portion 91 to the phase spatial light modulator 338. In accordance with the information on the modulation pattern supplied by the controller 90, the phase spatial light modulator 338 spatially modulates the phase of light in the corresponding modulation pattern.

Servo, information recording, and information reproducing operations of the optical information recording/reproducing apparatus according to the embodiment will now be separately described in succession.

Figure 25:
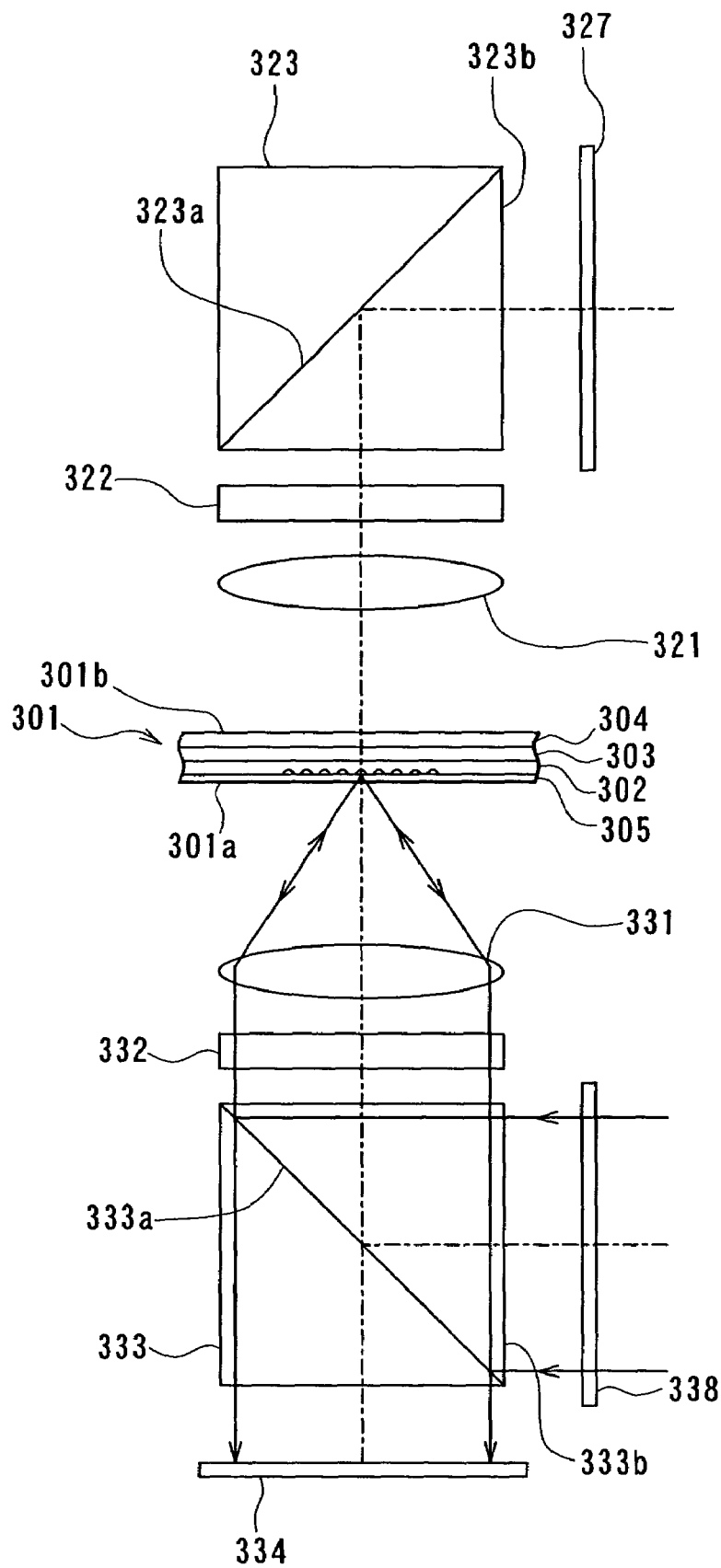
FIG. 25 is an explanatory diagram showing a state of the essential parts of the recording/reproducing optical system during a servo operation in the third embodiment of the invention.

The servo operation will now be described with reference to FIG. 23 and FIG. 25. FIG. 25 is an explanatory diagram showing a state of the essential parts of the recording/reproducing optical system during the servo operation. During the servo operation, all the pixels of the spatial light modulator 327 are brought into a blocking state. The phase spatial light modulator 338 is set such that light passing through every pixel thereof has the same phase. The power of light emitted by the semiconductor laser 342 is set to a low level suitable for reproduction. The controller 90 predicts the timing at which light that has exited the objective lens 331 passes through the address servo areas 306 based on the basic clock reproduced from the reproduction signal RF, and maintains the foregoing setting while the light that has exited the objective lens 331 passes through the address servo areas 306.

The light emitted by the semiconductor laser 342 is collimated by the collimator lens 343 and passes through the mirror 344 and the rotation-causing optical element 345 to be incident on the polarization beam splitter 346. S-polarized components of the light incident on the polarization beam splitter 346 are reflected by the polarization beam splitter surface 346a and are blocked by the spatial light modulator 327.

P-polarized components of the light incident on the polarization beam splitter 346 are transmitted through the polarization beam splitter surface 346a, pass through the mirrors 340 and 339, are transmitted through the polarization beam splitter surface 335a of the polarization beam splitter 335, pass through the convex lens 336 and the concave lens 337, and are incident on the phase spatial light modulator 338. Since the phase spatial light modulator 338 rotates the direction of polarization of outgoing light by 90° with respect to the direction of polarization of incident light, the light that exits the phase spatial light modulator 338 becomes S-polarized light. The light that has exited the phase spatial light modulator 338 passes through the concave lens 337 and the convex lens 336, is reflected by the polarization beam splitter surface 335a of the polarization beam splitter 335, and is further reflected by the polarization beam splitter surface 333a of the polarization beam splitter 333 to impinge on the quarter-wave plate 332. The light having passed through the quarter-wave plate 332 becomes circularly polarized light, is collected by the objective lens 331, and is applied to the recording medium 301 while converging to become minimum in diameter on the interface between the transparent substrate 302 and the protective layer 305.

Return light that is generated when the light applied to the recording medium 301 by the objective lens 331 is reflected off the interface between the transparent substrate 302 and the protective layer 305 is collimated through the objective lens 331, passes through the quarter-wave plate 332 to become P-polarized light, and passes through the polarization beam splitter surface 333a of the polarization beam splitter 333 to impinge on the photodetector 334. Based on the output of the photodetector 334, the detection circuit 385 generates a focus error signal FE, a tracking error signal TE, and a reproduction signal RF. Focus servo and tracking servo are performed, the basic clock is reproduced, and addresses are determined based on these signals.

For the above-described setting for the servo operation, the configuration of the optical head lower portion 40A is similar to that of the optical head for recording and reproduction on a typical optical disk. Thus, the optical information recording/reproducing apparatus of the embodiment allows recording and reproduction using a typical optical disk.

Figure 26:
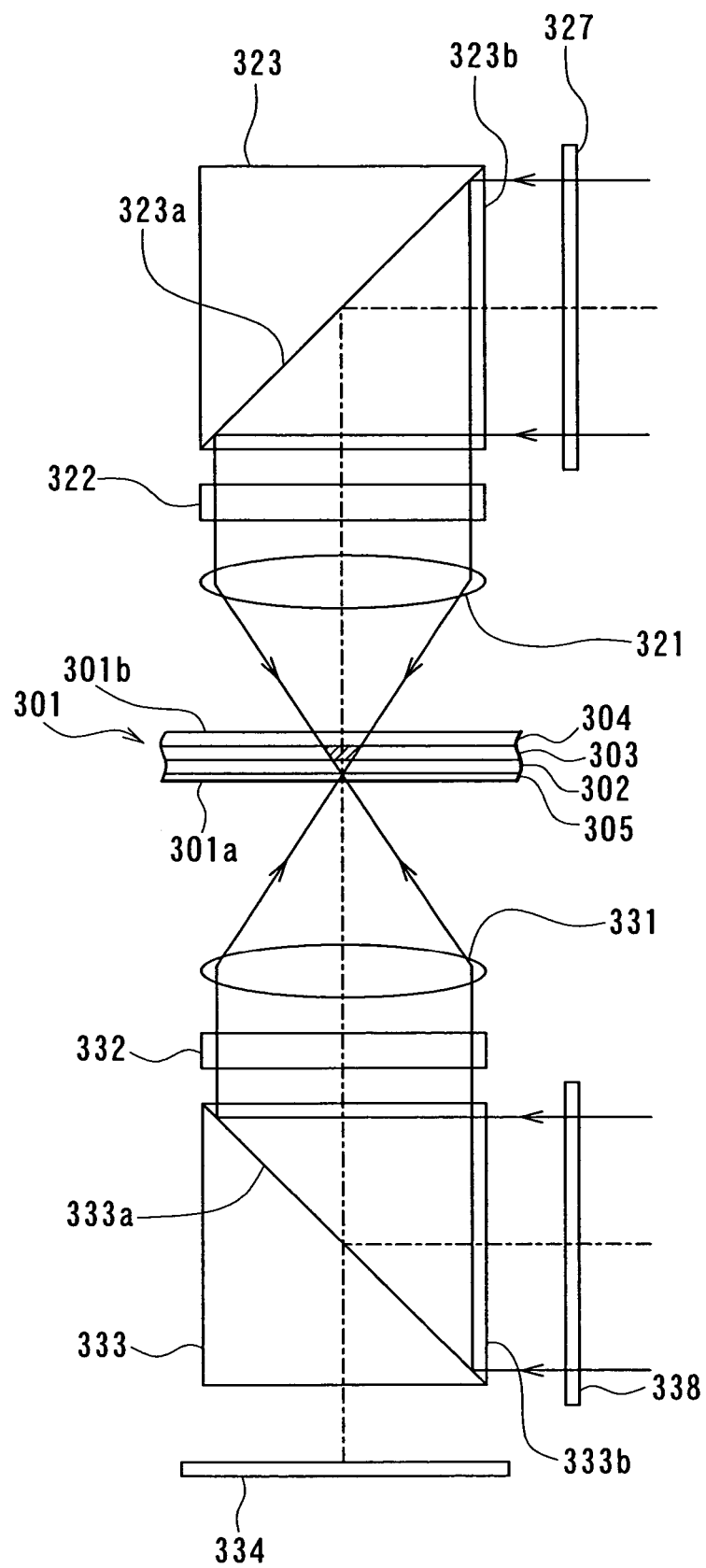
FIG. 26 is an explanatory diagram showing a state of the essential parts of the recording/reproducing optical system during a recording operation in the third embodiment of the invention.

An information recording operation will now be described with reference to FIG. 23 and FIG. 26. FIG. 26 is an explanatory diagram showing a state of the essential parts of the recording/reproducing optical system during the recording operation. During the recording operation, the spatial light modulator 327 spatially modulates the intensity of light passing therethrough by selecting a transmitting state (hereinafter also referred to as ON) or a blocking state (hereinafter also referred to as OFF) for each pixel according to the information to be recorded, to thereby generate information light. The phase spatial light modulator 338 spatially modulates the phase of light passing therethrough by selectively giving the light a phase difference of either 0 (rad) or π (rad) from a predetermined reference phase for each pixel according to a predetermined modulation pattern, to thereby generate recording-specific reference light having a spatially modulated phase.

The controller 90 supplies the information on the modulation pattern selected by itself in accordance with predetermined conditions or the modulation pattern selected by the operating portion 91 to the phase spatial light modulator 338, and the phase spatial light modulator 338 spatially modulates the phase of light passing therethrough in accordance with the information on the modulation pattern supplied by the controller 90.

The power of light emitted by the semiconductor laser 342 is set to reach high levels on a pulse basis suitable for recording. Under the control of the controller 90, while the light that has exited the objective lenses 321 and 331 passes through an area other than the address servo areas 306, neither focus servo nor tracking servo is performed.

The light emitted by the semiconductor laser 342 is collimated by the collimator lens 343 and passes through the mirror 344 and the rotation-causing optical element 345 to be incident on the polarization beam splitter 346. S-polarized components of the light incident on the polarization beam splitter 346 are reflected by the polarization beam splitter surface 346a and pass through the spatial light modulator 327, at which time the light is spatially modulated in intensity in accordance with the information to be recorded, to become information light. This information light passes through the convex lens 326, the pin hole 325, and the convex lens 324 in succession, and is reflected by the polarization beam splitter surface 323a of the polarization beam splitter 323 to impinge on the quarter-wave plate 322. The information light having passed through the quarter-wave plate 322 becomes circularly polarized light, is collected by the objective lens 321, and is applied to the recording medium 301 while converging to become minimum in diameter on the interface between the transparent substrate 302 and the protective layer 305. As shown in FIG. 26, the information light passes through the information recording layer 303 in the recording medium 301 while converging.

P-polarized components of the light incident on the polarization beam splitter 346 are transmitted through the polarization beam splitter surface 346a, pass through the mirrors 340 and 339, are transmitted through the polarization beam splitter surface 335a of the polarization beam splitter 335, pass through the convex lens 336 and the concave lens 337, and impinge on the phase spatial light modulator 338 to become recording-specific reference light, being spatially modulated in phase. Since the recording-specific reference light exiting from the phase spatial light modulator 338 becomes S-polarized light, it passes through the concave lens 337 and the convex lens 336, is reflected by the polarization beam splitter surface 335a of the polarization beam splitter 335, and is further reflected by the polarization beam splitter surface 333a of the polarization beam splitter 333 to impinge on the quarter-wave plate 332. The recording-specific reference light having passed through the quarter-wave plate 332 becomes circularly polarized light, is collected by the objective lens 331, and is applied to the recording medium 301 while converging to become minimum in diameter on the interface between the transparent substrate 302 and the protective layer 305. As shown in FIG. 26, the recording-specific reference light passes through the information recording layer 303 in the recording medium 301 while diverging.

In this way, for recording, the information light and the recording-specific reference light are coaxially applied to opposite sides of the information recording layer 303 while converging to become minimum in diameter at the same position (on the interface between the transparent substrate 302 and the protective layer 305). The information light and the recording-specific reference light interfere with each other to form an interference pattern in the information recording layer 303. When the power of the light emitted by the semiconductor laser 342 has reached a high level for recording, the interference pattern is volumetrically recorded in the information recording layer 303 to form a reflection-type (Lippmann-type) hologram.

According to the present embodiment, a plurality of pieces of information can be recorded in an identical location of the information recording layer 303 on a multiplex basis through phase-encoding multiplexing by changing the modulation pattern of the phase of the recording-specific reference light for each piece of the information to be recorded.

In the embodiment, a method called shift multiplexing may also be used to record a plurality of pieces of data on a multiplex basis. Shift multiplexing is a method for recording a plurality of pieces of information on a multiplex basis by forming a plurality of hologram forming regions corresponding to the respective pieces of information in the information recording layer 303 such that the hologram forming regions are slightly shifted from each other and overlap each other in a horizontal direction.

The multiplex recording through phase-encoding multiplexing or the multiplex recording through shift multiplexing may be used alone, or both of them may be used in combination.

Figure 27:
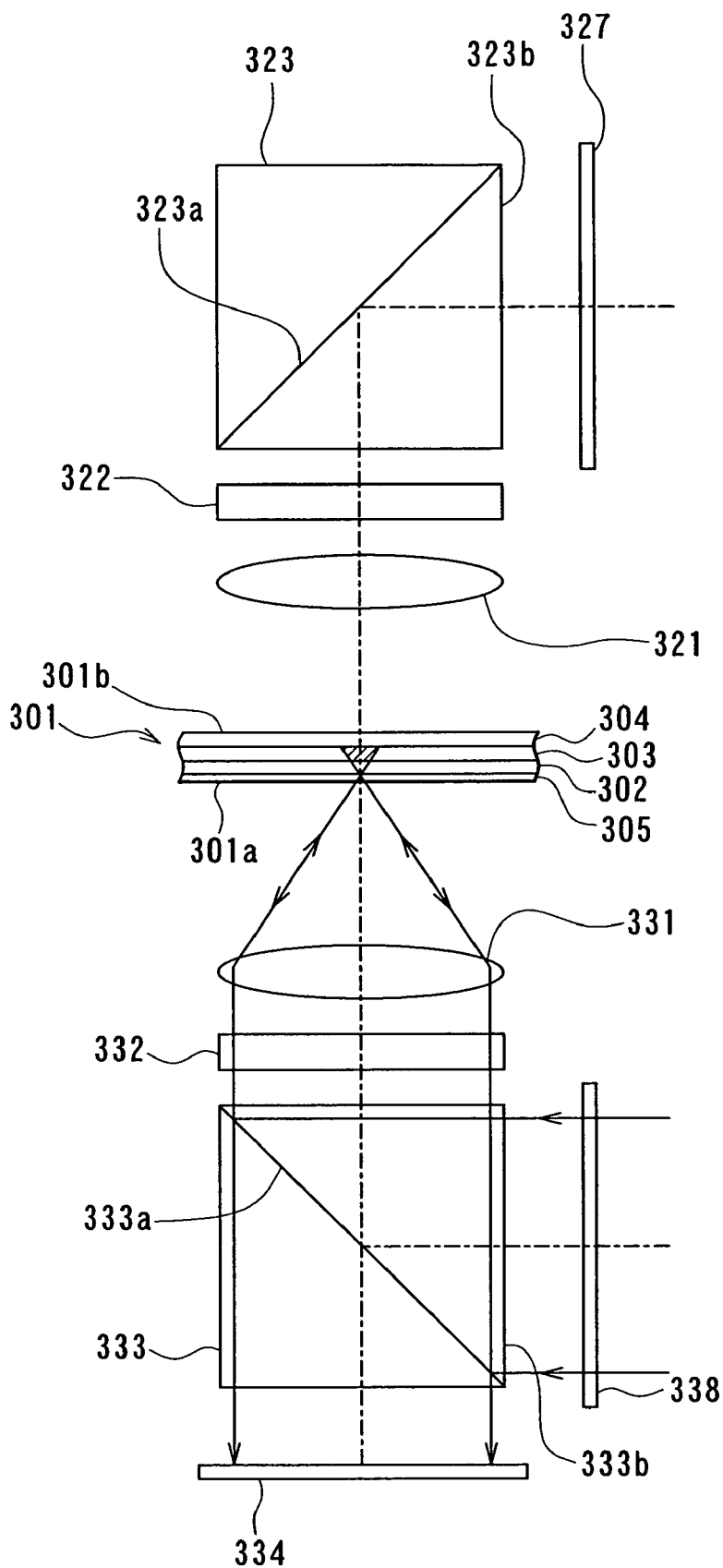
FIG. 27 is an explanatory diagram showing a state of the essential parts of the recording/reproducing optical system during a reproducing operation in the third embodiment of the invention.

An information reproducing operation will now be described with reference to FIG. 23 and FIG. 27. FIG. 27 is an explanatory diagram showing a state of the essential parts of the recording/reproducing optical system during the reproducing operation. During the reproducing operation, all pixels of the spatial light modulator 327 are brought into a blocking state. The phase spatial light modulator 338 spatially modulates the phase of light passing therethrough by selectively giving the light a phase difference of either 0 (rad) or π (rad) from a predetermined reference phase for each pixel according to a predetermined modulation pattern, to thereby generate reproduction-specific reference light having a spatially modulated phase.

The controller 90 supplies the information on the modulation pattern selected by itself in accordance with predetermined conditions or the modulation pattern selected by the operating portion 91 to the phase spatial light modulator 338, and the phase spatial light modulator 338 spatially modulates the phase of light passing therethrough in accordance with the information on the modulation pattern supplied by the controller 90.

The power of the light emitted by the semiconductor laser 342 is set to a low level suitable for reproduction. Under the control of the controller 90, while the light that has exited the objective lenses 321 and 331 passes through an area other than the address servo areas 306, neither focus servo nor tracking servo is performed.

The light emitted by the semiconductor laser 342 is collimated by the collimator lens 343 and passes through the mirror 344 and the rotation-causing optical element 345 to be incident on the polarization beam splitter 346. S-polarized components of the light incident on the polarization beam splitter 346 are reflected by the polarization beam splitter surface 346a and blocked by the spatial light modulator 327.

P-polarized components of the light incident on the polarization beam splitter 346 are transmitted through the polarization beam splitter surface 346a, pass through the mirrors 340 and 339, are transmitted through the polarization beam splitter surface 335a of the polarization beam splitter 335, pass through the convex lens 336 and the concave lens 337, and are incident on the phase spatial light modulator 338 to become reproduction-specific reference light, being spatially modulated in phase. Since the reproduction-specific reference light exiting from the phase spatial light modulator 338 becomes S-polarized light, it passes through the concave lens 337 and the convex lens 336, is reflected by the polarization beam splitter surface 335a of the polarization beam splitter 335, and is further reflected by the polarization beam splitter surface 333a of the polarization beam splitter 333 to impinge on the quarter-wave plate 332. The reproduction-specific reference light having passed through the quarter-wave plate 332 becomes circularly polarized light, is collected by the objective lens 331, and is applied to the recording medium 301 while converging to become minimum in diameter on the interface between the transparent substrate 302 and the protective layer 305. As shown in FIG. 27, the reproduction-specific reference light passes through the information recording layer 303 in the recording medium 301 while diverging.

Upon application of the reproduction-specific reference light, reproduction light that corresponds to the information light used for recording is generated in the information recording layer 303. The reproduction light travels toward the transparent substrate 302 while converging, becomes minimum in diameter on the interface between the transparent substrate 302 and the protective layer 305, and exits the recording medium 301 while diverging. Then, the light is collimated through the objective lens 331, passes through the quarter-wave plate 332 to become P-polarized light, and passes through the polarization beam splitter surface 333a of the polarization beam splitter 333 to impinge on the photodetector 334.

On the photodetector 334 is formed an image of the ON/OFF pattern caused by the spatial light modulator 327 in the recording operation, so that information is reproduced by detecting this pattern. When a plurality of pieces of information are recorded in the information recording layer 303 on a multiplex basis by changing modulation patterns of the recording-specific reference light, among the plurality of pieces of information, the one corresponding to the modulation pattern of the reproduction-specific reference light is only reproduced.

In this way, for reproduction, the reproduction-specific reference light is applied to the recording medium 301 to converge to become minimum in diameter on the interface between the transparent substrate 302 and the protective layer 305. The application of the reproduction-specific reference light and the collection of the reproduction light are performed on the incidence side for the recording-specific reference light on the recording medium 301. The reproduction-specific reference light and the reproduction light are arranged coaxially.

As has been described, in the present embodiment, the optical head upper portion 40B and the optical head lower portion 40A move the irradiating position of the information light and the recording-specific reference light such that the irradiating position of the information light and the recording-specific reference light follows a single moving information recording area 307 for a predetermined period. As a result, the single information recording area 307 is kept being irradiated with the information light and the recording-specific reference light for the predetermined period.

Moreover, according to the present embodiment, the information light, the recording-specific reference light, and the reproduction-specific reference light are all arranged coaxially and converge to become minimum in diameter at the same position. The optical system for recording and reproduction can thus be simplified in configuration.

According to the embodiment, the information light can carry information using the entire cross section of the beam thereof.

Likewise, the reproduction light can also carry information using the entire cross section of the beam thereof.

From the foregoing, the embodiment makes it possible to record and reproduce information through the use of holography and to simplify the configuration of the optical system for recording and reproduction without causing a reduction in the amount of information.

In the embodiment, the recording medium 301 is provided with positioning areas (address servo areas 306) in which information for alignment of the information light, the recording-specific reference light, and the reproduction-specific reference light is recorded. The recording/reproducing optical system applies the information light, the recording-specific reference light, and the reproduction-specific reference light to the recording medium 301, letting them converge to become minimum in diameter at the position where the positioning areas are provided. The positioning areas are irradiated with light that converges, like the recording-specific reference light and the reproduction-specific reference light, to become minimum in diameter at the position where the positioning areas are provided, and return light from the positioning areas is detected. It is thereby possible to position the information light, the recording-specific reference light, and the reproduction-specific reference light by using the information recorded in the positioning areas. Thus, the embodiment allows precise positioning of the information light, the recording-specific reference light, and the reproduction-specific reference light with respect to the recording medium 301 without complicating the configuration of the recording/reproducing optical system.

Furthermore, in the embodiment, because the positioning areas are located on the incidence side for the recording-specific reference light with respect to the information recording layer 303, return light from the positioning areas will not pass through the information recording layer 303. This prevents the light used for positioning from being disturbed by the information recording layer 303, and it is thus possible to prevent deterioration in the reproduction accuracy of the information for positioning.

The remainder of the configuration, operations, and effects of the present embodiment are the same as those of the first or second embodiment.

[Fourth Embodiment]

Figure 28:
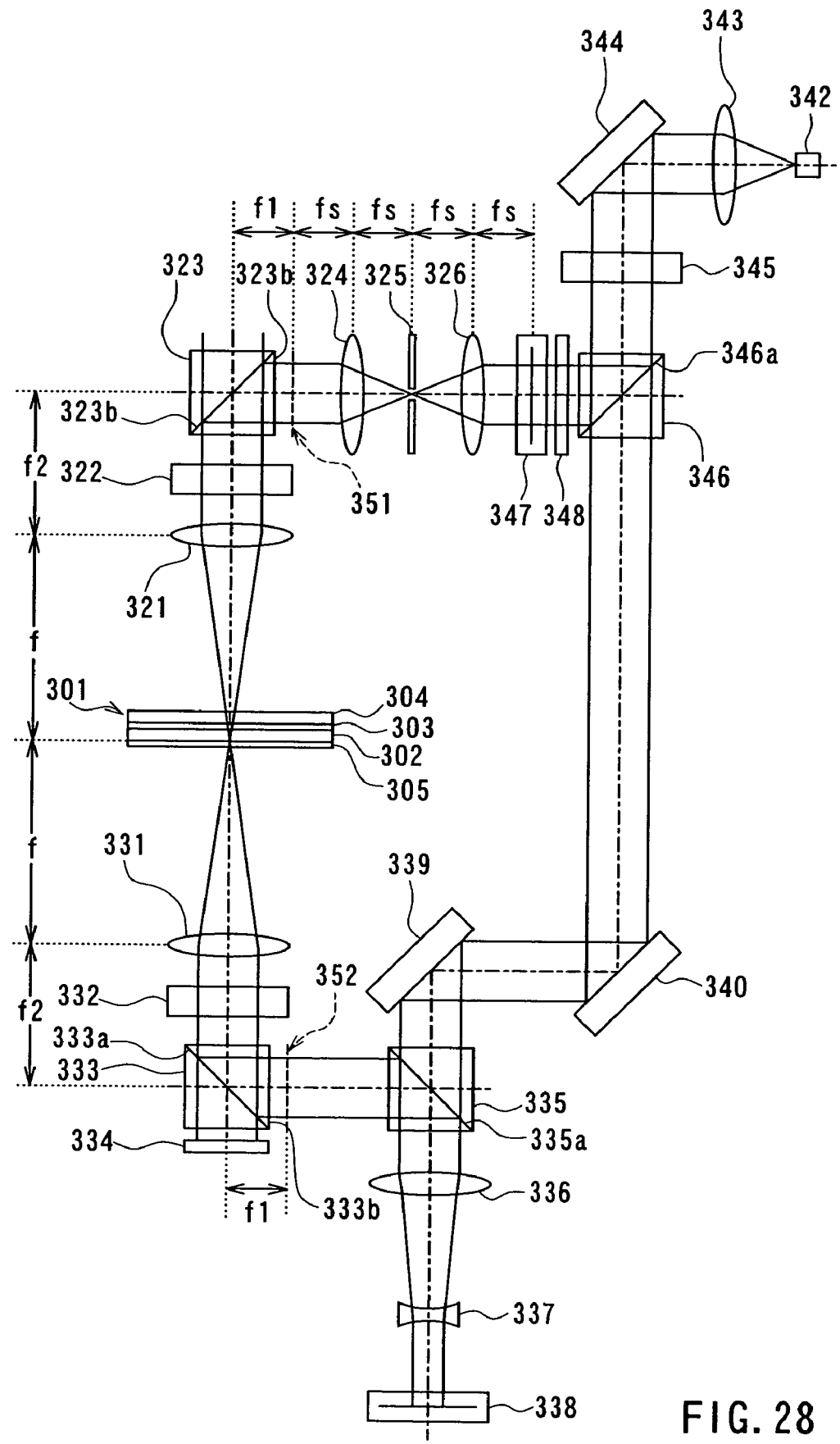
FIG. 28 is an explanatory diagram showing a general configuration of a recording/reproducing optical system of an optical information recording/reproducing apparatus according to a fourth embodiment of the invention.

Now, description will be given of an optical information recording/reproducing apparatus according to a fourth embodiment of the invention. FIG. 28 is an explanatory diagram showing a general configuration of a recording/reproducing optical system of the optical information recording/reproducing apparatus according to the present embodiment.

In the present embodiment, information light is generated by spatially modulating the phase of light based on the information to be recorded. The recording/reproducing optical system of the embodiment has a phase spatial light modulator 347 instead of the spatial light modulator 327 in FIG. 23. Besides, a shutter 348 for selecting a light-transmitting state or a light-blocking state is provided between the phase spatial light modulator 347 and the polarization beam splitter 346. The phase spatial light modulator 347 has a number of pixels arranged in a matrix, and is capable of spatially modulating the phase of light by selecting the phase of outgoing light from between two values or from among three or more values for each of the pixels. For example, a liquid crystal device may be used for the phase spatial light modulator 347. The shutter 348 may also be a liquid crystal device.

Servo, information recording, and information reproducing operations of the optical information recording/reproducing apparatus according to the embodiment will now be separately described in succession.

The servo operation will now be described. During the servo operation, the shutter 348 is brought into a blocking state. The remainder of the servo operation is the same as in the third embodiment.

Figure 29:
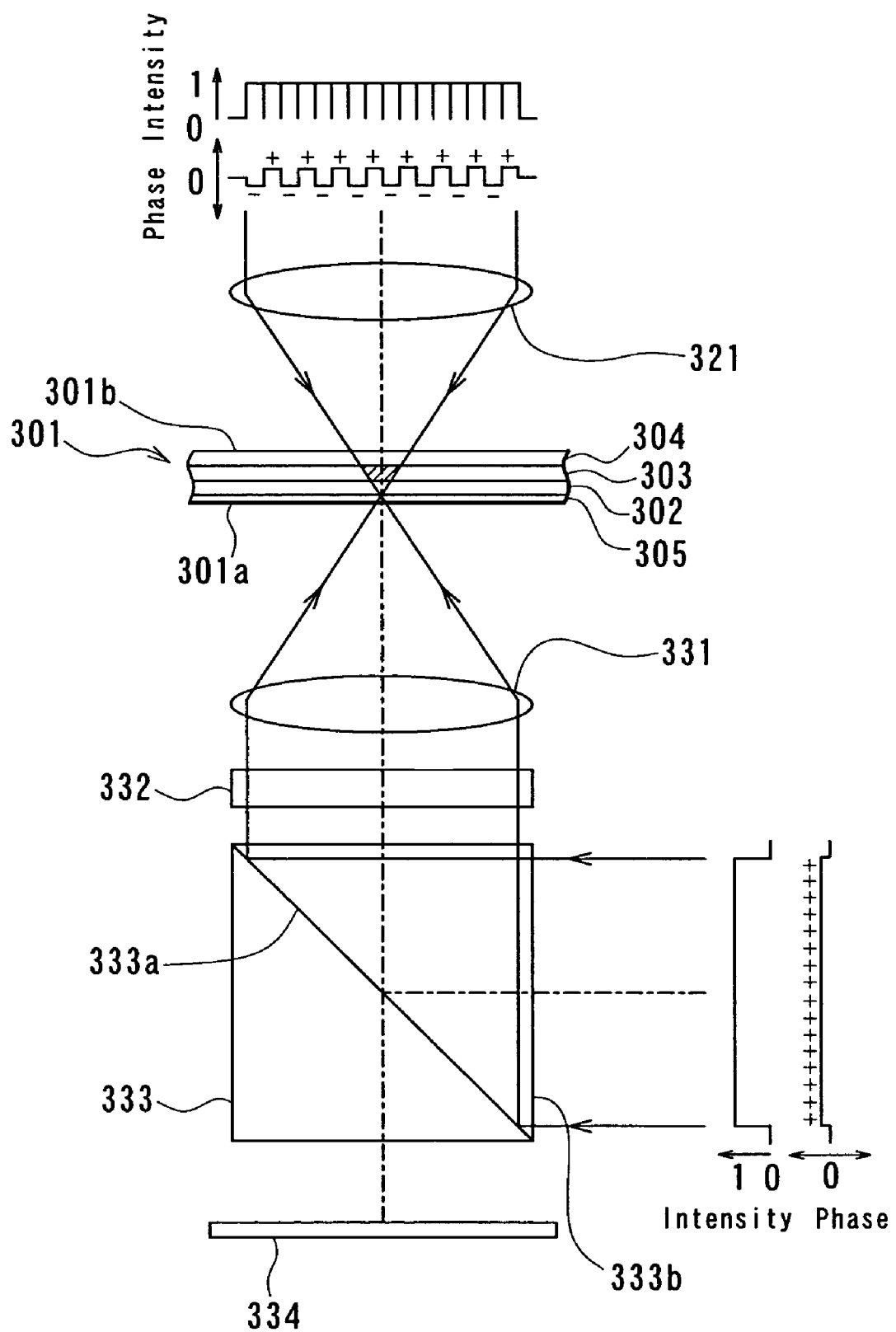
FIG. 29 is an explanatory diagram showing a state of essential parts of the recording/reproducing optical system during a recording operation using recording-specific reference light whose phase is not spatially modulated in the fourth embodiment of the invention.

Now, with reference to FIG. 29, a recording operation will be described for situations where information is recorded using information light whose phase is spatially modulated and recording-specific reference light whose phase is not spatially modulated. FIG. 29 is an explanatory diagram showing the state of essential parts of the recording/reproducing optical system during the recording operation. During the recording operation, the shutter 348 is brought into a transmitting state. The phase spatial light modulator 347 spatially modulates the phase of light by selecting the phase of outgoing light from between two values or from among three or more values for each pixel according to the information to be recorded. Here, for ease of explanation, the phase spatial light modulator 347 shall spatially modulate the phase of the light by setting the phase of the outgoing light to either a first phase having a phase difference of $+\pi/2$ (rad) from a predetermined reference phase or a second phase having a phase difference of $-\pi/2$ (rad) from the reference phase for each pixel. The phase difference between the first phase and the second phase is $\pi$ (rad). In this way, information light having a spatially modulated phase is generated. The information light locally drops in intensity at the borders between first-phase pixels and second-phase pixels.

As in the third embodiment, the information light is collected by the objective lens 321 and applied to the recording medium 301 while converging to become minimum in diameter on the interface between the transparent substrate 302 and the protective layer 305. Then, the information light passes through the information recording layer 303 in the recording medium 301 while converging.

Here, the phase spatial light modulator 338 generates recording-specific reference light by setting the phase of outgoing light to the first phase having a phase difference of $+\pi/2$ (rad) from the predetermined reference phase for every pixel, without spatially modulating the phase of the light. The phase spatial light modulator 338 may set the phase of the outgoing light for every pixel to the second phase or a certain phase different from both the first phase and the second phase.

In FIG. 29, the symbol "+" represents the first phase, and the symbol "−" the second phase. FIG. 29 also shows the maximum value of intensity as "1", and the minimum value of intensity as "0".

As in the third embodiment, the recording-specific reference light is collected by the objective lens 331 and applied to the recording medium 301 while converging to become minimum in diameter on the interface between the transparent substrate 302 and the protective layer 305. Then, the recording-specific reference light passes through the information recording layer 303 in the recording medium 301 while diverging.

As in the third embodiment, the information light and the recording-specific reference light interfere with each other to form an interference pattern in the information recording layer 303. When the power of the light emitted by the semiconductor laser 342 has reached a high level suitable for recording, the interference pattern is volumetrically recorded in the information recording layer 303 to form a reflection-type (Lippmann-type) hologram.

Figure 30:
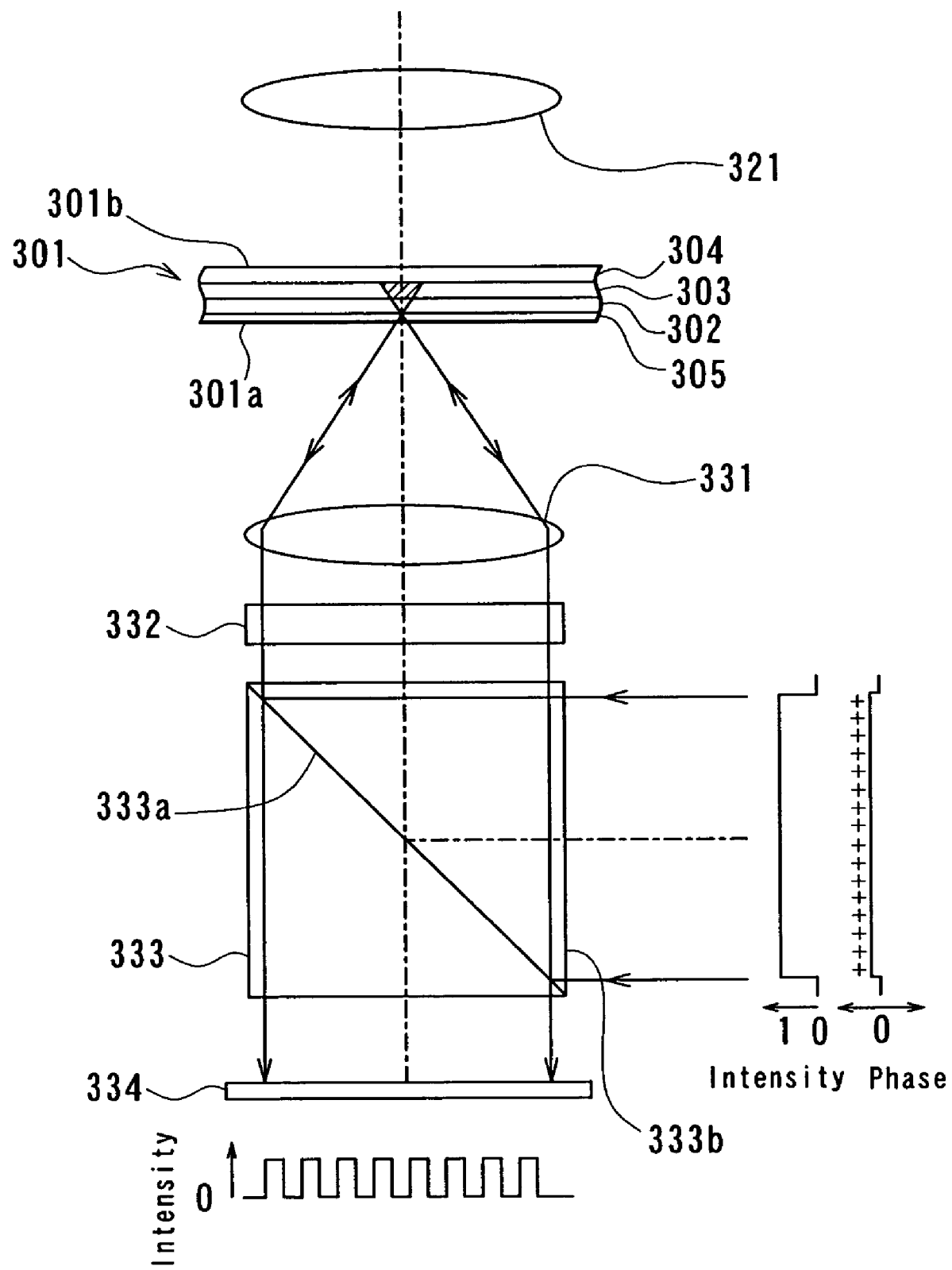
FIG. 30 is an explanatory diagram showing a state of the essential parts of the recording/reproducing optical system during a reproducing operation using reproduction-specific reference light whose phase is not spatially modulated in the fourth embodiment of the invention.

Now, with reference to FIG. 30, an operation for reproducing information that is recorded using the information light whose phase is spatially modulated and the recording-specific reference light whose phase is not spatially modulated. FIG. 30 is an explanatory diagram showing the state of the essential parts of the recording/reproducing optical system during the reproducing operation. During the reproducing operation, the shutter 348 is brought into a blocking state. The phase spatial light modulator 338 generates reproduction-specific reference light by setting the phase of outgoing light to the first phase having a phase difference of $+\pi/2$ (rad) from the predetermined reference phase for every pixel, without spatially modulating the phase of the light. In FIG. 30, the phases and intensities are indicated in the same manner as in FIG. 29.

As in the third embodiment, the reproduction-specific reference light is collected by the objective lens 331 and applied to the recording medium 301 while converging to become minimum in diameter on the interface between the transparent substrate 302 and the protective layer 305. Then, the reproduction-specific reference light passes through the information recording layer 303 in the recording medium 301 while diverging.

Upon application of the reproduction-specific reference light, reproduction light that corresponds to the information light used for recording is generated in the information recording layer 303. The reproduction light has a spatially modulated phase, as is the case with the information light used for recording. The reproduction light travels toward the transparent substrate 302 while converging, becomes minimum in diameter on the interface between the transparent substrate 302 and the protective layer 305, and exits the recording medium 301 while diverging. Then, the light is collimated through the objective lens 331, passes through the quarter-wave plate 332 and the polarization beam splitter surface 333a of the polarization beam splitter 333, and is incident on the photodetector 334.

Part of the reproduction-specific reference light applied to the recording medium 301 is reflected off the interface between the transparent substrate 302 and the protective layer 305, and exits the recording medium 301 while diverging. It is then collimated through the objective lens 331, and passes through the quarter-wave plate 332 and the polarization beam splitter surface 333a of the polarization beam splitter 333 to impinge on the photodetector 334.

In reality, the reproduction light is superimposed on the reproduction-specific reference light that is reflected off the interface between the transparent substrate 302 and the protective layer 305 to generate composite light, and this composite light is received by the photodetector 334. The composite light has an intensity that is spatially modulated according to the information recorded. Thus, the photodetector 334 detects a two-dimensional intensity pattern of the composite light, from which the information is reproduced.

Figure 31:
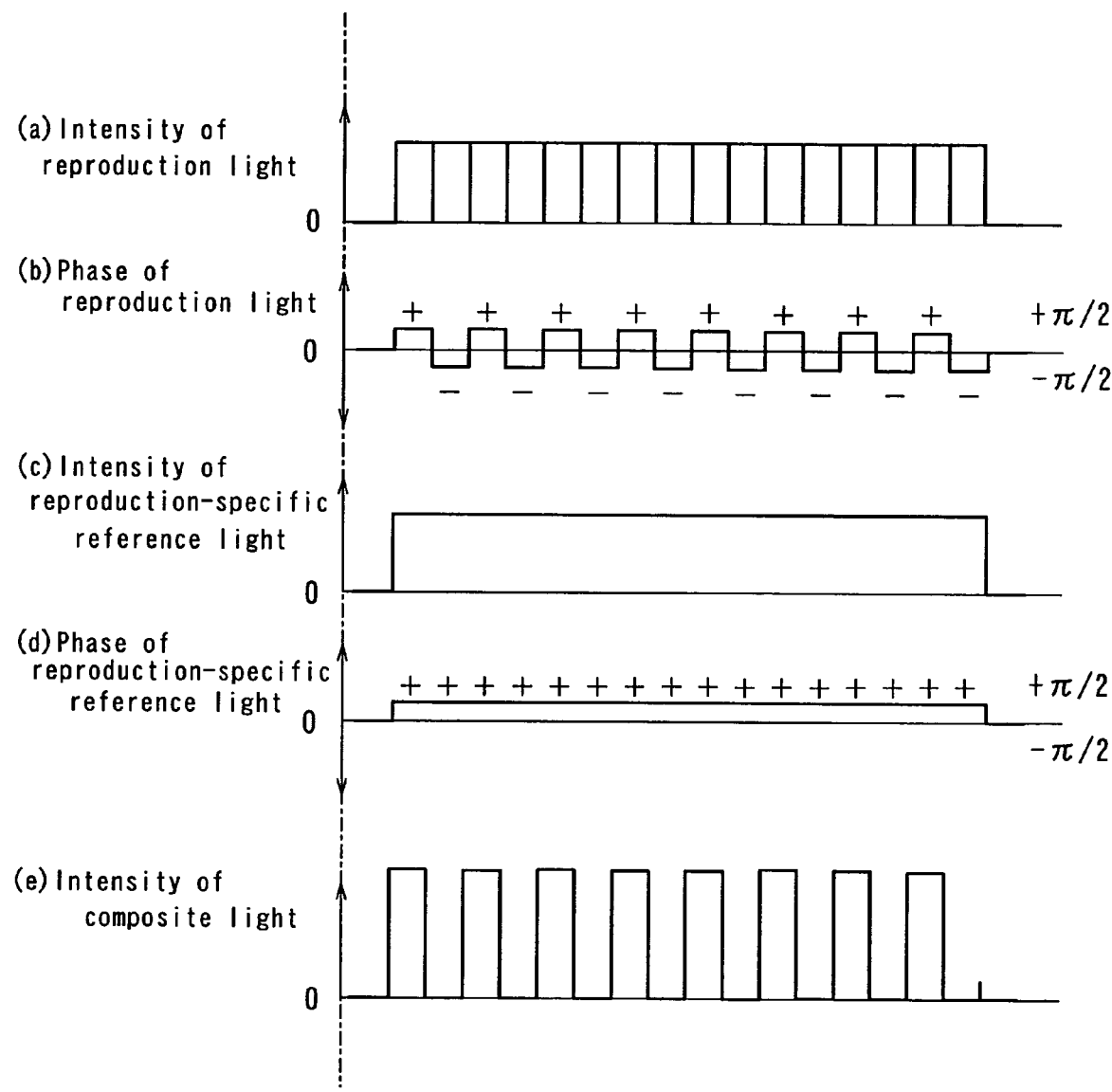
FIG. 31 is a waveform diagram for explaining in detail the principle of reproduction of information using the reproduction-specific reference light whose phase is not spatially modulated in the optical information recording/reproducing apparatus according to the fourth embodiment of the invention.

Now, with reference to FIG. 31, detailed description will be given of the reproduction light, the reproduction-specific reference light, and the composite light used for reproduction mentioned above. In FIG. 31, (a) shows the intensity of the reproduction light 1, (b) shows the phase of the reproduction light, (c) shows the intensity of the reproduction-specific reference light, (d) shows the phase of the reproduction-specific reference light, and (e) shows the intensity of the composite light. FIG. 31 shows an example where the phase of the information light for each pixel is set to either the first phase having a phase difference of $+\pi/2$ (rad) from the reference phase, or the second phase having a phase difference of $-\pi/2$ (rad) from the reference phase. Consequently, in the example shown in FIG. 31, the reproduction light has either the first phase or the second phase pixel by pixel as the information light does. The reproduction-specific reference light has the first phase for every pixel. Assuming here that the reproduction light and the reproduction-specific reference light are equal in intensity, the composite light exceeds the reproduction light and the reproduction-specific reference light in intensity at pixels where the reproduction light has the first phase, and the composite light theoretically becomes zero in intensity at pixels where the reproduction light has the second phase, as shown in FIG. 31(e).

Figure 32:
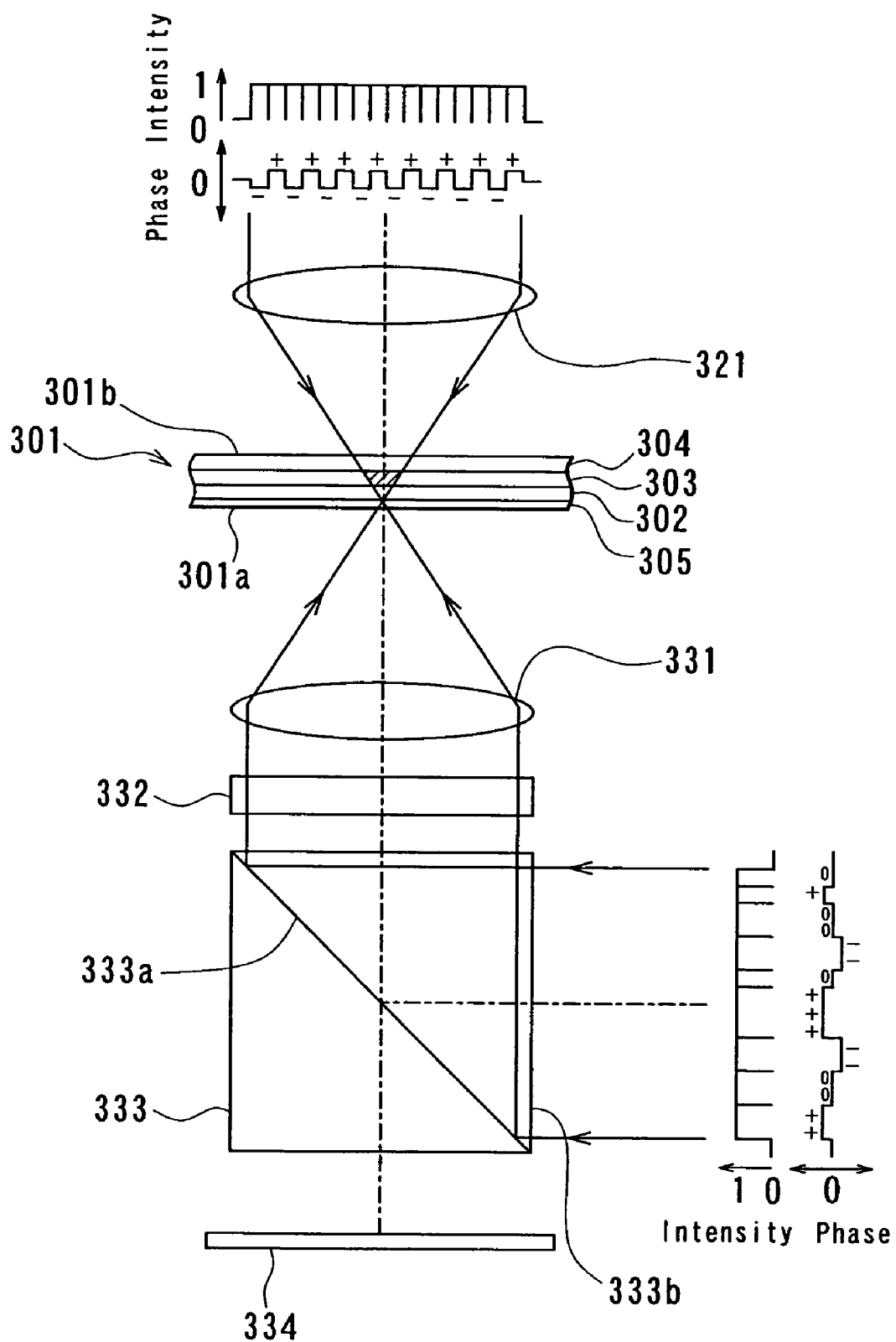
FIG. 32 is an explanatory diagram showing a state of the essential parts of the recording/reproducing optical system during a recording operation using recording-specific reference light whose phase is spatially modulated in the fourth embodiment of the invention.

Now, with reference to FIG. 32, a recording operation will be described for situations where information is recorded using information light whose phase is spatially modulated and recording-specific reference light whose phase is spatially modulated. FIG. 32 is an explanatory diagram showing the state of the essential parts of the recording/reproducing optical system during the recording operation. During the recording operation, the shutter 348 is brought into a transmitting state. The phase spatial light modulator 347 spatially modulates the phase of light by selecting the phase of outgoing light from between two values or from among three or more values each pixel according to the information to be recorded. Here, for ease of explanation, the phase spatial light modulator 347 shall spatially modulate the phase of the light by setting the phase of the outgoing light to either the first phase or the second phase for each pixel. In this way, information light having a spatially modulated phase is generated.

As in the third embodiment, the information light is collected by the objective lens 321 and applied to the recording medium 301 while converging to become minimum in diameter on the interface between the transparent substrate 302 and the protective layer 305. Then, the information light passes through the information recording layer 303 in the recording medium 301 while converging.

The phase spatial light modulator 338 spatially modulates the phase of light by selecting the phase of outgoing light from between two values or from among three or more values for each pixel. Here, the phase spatial light modulator 338 shall spatially modulate the phase of the light by setting, for each pixel, the phase of the outgoing light to any one of a predetermined reference phase, a first phase having a phase difference of $+\pi/2$ (rad) from the reference phase, and a second phase having a phase difference of $-\pi/2$ (rad) from the reference phase. In FIG. 32, the reference phase is represented by the symbol "0". In FIG. 32, the phases and intensities are otherwise indicated in the same manner as in FIG. 29. The recording-specific reference light locally drops in intensity at portions where the phase changes.

As in the third embodiment, the recording-specific reference light is collected by the objective lens 331 and applied to the recording medium 301 while converging to become minimum in diameter on the interface between the transparent substrate 302 and the protective layer 305. Then, the recording-specific reference light passes through the information recording layer 303 in the recording medium 301 while diverging.

As in the third embodiment, the information light and the recording-specific reference light interfere with each other to form an interference pattern in the information recording layer 303. When the power of the light emitted by the semiconductor laser 342 has reached a high level suitable for recording, the interference pattern is volumetrically recorded in the information recording layer 303 to form a reflection-type (Lippmann-type) hologram.

Figure 33:
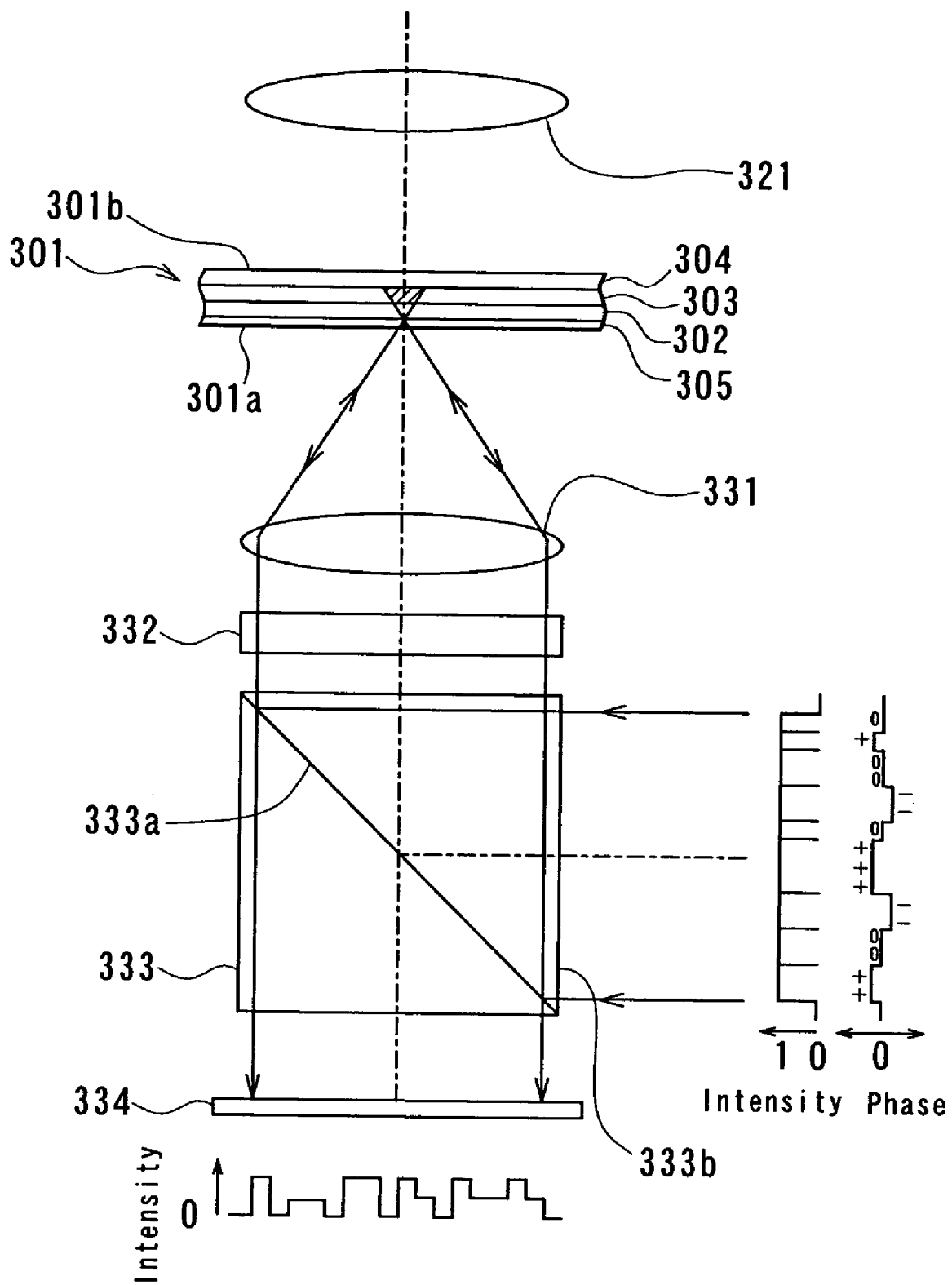
FIG. 33 is an explanatory diagram showing a state of the essential parts of the recording/reproducing optical system during a reproducing operation using reproduction-specific reference light whose phase is spatially modulated in the fourth embodiment of the invention.

Now, with reference to FIG. 33, an operation for reproducing information that is recorded using the information light whose phase is spatially modulated and the recording-specific reference light whose phase is spatially modulated. FIG. 33 is an explanatory diagram showing the state of the essential parts of the recording/reproducing optical system during the reproducing operation. During the reproducing operation, the shutter 348 is brought into a blocking state. As is the case with the recording operation, the phase spatial light modulator 338 spatially modulates the phase of outgoing light to generate reproduction-specific reference light having a spatially modulated phase. In FIG. 33, the phases and intensities are indicated in the same manner as in FIG. 32.

As in the third embodiment, the reproduction-specific reference light is collected by the objective lens 331 and applied to the recording medium 301 while converging to become minimum in diameter on the interface between the transparent substrate 302 and the protective layer 305. Then, the reproduction-specific reference light passes through the information recording layer 303 in the recording medium 301 while diverging.

Upon application of the reproduction-specific reference light, reproduction light that corresponds to the information light used for recording is generated in the information recording layer 303. The reproduction light has a spatially modulated phase, as the information light used for recording does. The reproduction light travels toward the transparent substrate 302 while converging, becomes minimum in diameter on the interface between the transparent substrate 302 and the protective layer 305, and exits the recording medium 301 while diverging. Then, the light is collimated through the objective lens 331, and passes through the quarter-wave plate 332 and the polarization beam splitter surface 333a of the polarization beam splitter 333 to impinge on the photodetector 334.

Part of the reproduction-specific reference light applied to the recording medium 301 is reflected off the interface between the transparent substrate 302 and the protective layer 305, and exits the recording medium 301 while diverging. It is then collimated through the objective lens 331, and passes through the quarter-wave plate 332 and the polarization beam splitter surface 333a of the polarization beam splitter 333 to impinge on the photodetector 334.

In reality, the reproduction light is superimposed on the reproduction-specific reference light that is reflected off the interface between the transparent substrate 302 and the protective layer 305 to generate composite light, and this composite light is received by the photodetector 334. The composite light has an intensity which is spatially modulated according to the information recorded. Thus, the photodetector 334 detects a two-dimensional intensity pattern of the composite light, from which the information is reproduced.

Figure 34:
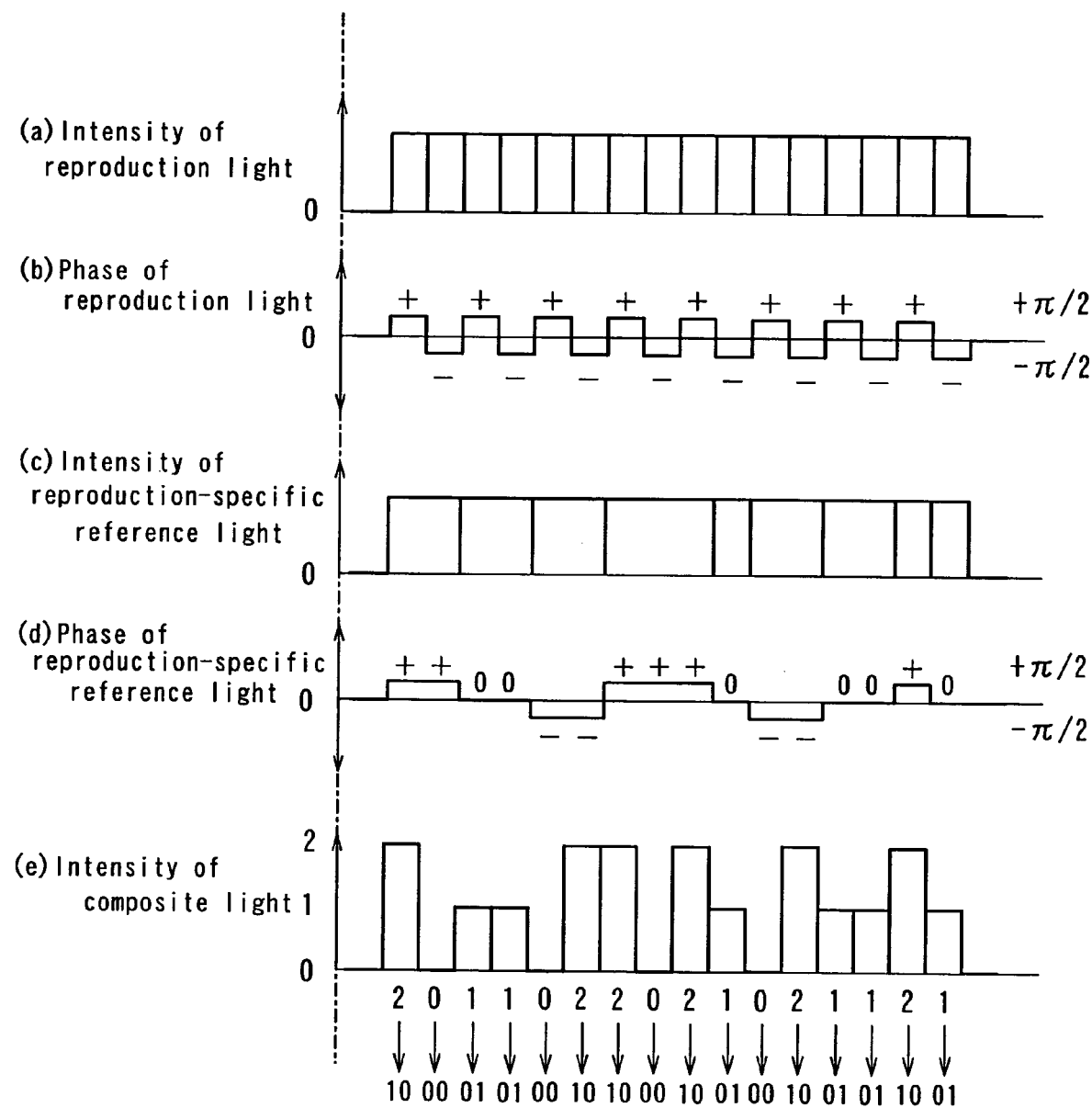
FIG. 34 is a waveform diagram for explaining in detail the principle of reproduction of information using the reproduction-specific reference light whose phase is spatially modulated in the optical information recording/reproducing apparatus according to the fourth embodiment of the invention.

Now, with reference to FIG. 34, detailed description will be given of the reproduction light, the reproduction-specific reference light, and the composite light used for reproduction mentioned above. In FIG. 34, (a) shows the intensity of the reproduction light, (b) shows the phase of the reproduction light, (c) shows the intensity of the reproduction-specific reference light, (d) shows the phase of the reproduction-specific reference light, and (e) shows the intensity of the composite light. FIG. 34 show an example where the phase of the information light is set at either the first phase or the second phase for each pixel, and the phases of the recording-specific reference light and the reproduction-specific reference light are set at any one of the reference phase, the first phase, and the second phase for each pixel. In this case, the phase of the reproduction light for each pixel is either the first phase or the second phase, as is the case with the information light. Consequently, the phase difference between the reproduction light and the reproduction-specific reference light is any of zero, ±π/2 (rad), and ±π (rad). Suppose here that the intensity of the reproduction light and the intensity of the reproduction-specific reference light are equal. In that case, as shown in FIG. 34(e), the intensity of the composite light becomes maximum at pixels where the phase difference between the reproduction light and the reproduction-specific reference light is zero, and becomes theoretically zero at pixels where the phase difference between the reproduction light and the reproduction-specific reference light is ±π (rad). At pixels where the phase difference between the reproduction light and the reproduction-specific reference light is ±π/2 (rad), the intensity becomes ½ that at a zero-phase-difference pixel. In FIG. 34(e), the intensity at the pixels where the phase difference is ±π (rad) is represented by "0", the intensity at the pixels where the phase difference is π/2 (rad) is represented by "1", and the intensity at the pixels where the phase difference is zero is represented by "2".

In the example shown in FIG. 32 to FIG. 34, the intensity of the composite light at each pixel has three values. Then, for example, the intensity "0" can be associated with two bits of data "00", the intensity "1" with two bits of data "01", and the intensity "2" with two bits of data "10" as shown in FIG. 34(e). Thus, in the example shown in FIG. 32 to FIG. 34, the composite light can carry an increased amount of information with the same intensity and phase of the reproduction light as compared to the cases where the intensity of the composite light at each pixel has two values as shown in FIG. 29 to FIG. 31. As a result, the recording medium 301 can be enhanced in recording density.

As described in the foregoing, in the present embodiment, to record information, the information recording layer 303 of the recording medium 301 is irradiated with the information light that is spatially modulated in phase based on information to be recorded and the recording-specific reference light, so that the information is recorded in the information recording layer 303 in the form of an interference pattern resulting from interference between the information light and the recording-specific reference light. Then, to reproduce the information, the information recording layer 303 is irradiated with the reproduction-specific reference light. Reproduction light thereby generated from the information recording layer 303 is superimposed on the reproduction-specific reference light to produce composite light, and this composite light is detected to thereby reproduce the information.

Consequently, according to the present embodiment, the reproduction light and the reproduction-specific reference light need not be separated from each other when reproducing information. Thus, when recording information, it is not necessary that the information light and the recording-specific reference light form a predetermined angle therebetween when incident on the recording medium. The embodiment therefore allows a compact configuration of the optical system for recording and reproduction.

In the conventional methods for reproduction, the reproduction light and the reproduction-specific reference light are separated to detect the reproduction light alone. Hence, there has been a problem that the reproduced information deteriorates in SIN ratio if the reproduction-specific reference light is also incident on the photodetector for detecting the reproduction light. On the contrary, in the present embodiment, since the reproduction light and the reproduction-specific reference light are both used to reproduce information, the reproduction-specific reference light will not deteriorate the S/N ratio of the reproduced information. Consequently, the present embodiment makes it possible to improve the S/N ratio of the reproduced information.

The remainder of the configuration, operations, and effects of the present embodiment are the same as those of the third embodiment.

[Fifth Embodiment]

Next, description will be given of an optical information recording/reproducing apparatus according to a fifth embodiment of the invention. As with the fourth embodiment, the present embodiment is designed such that information light is generated by modulating the phase of light spatially based on the information to be recorded. It differs from the fourth embodiment, however, as to the driving mechanism of the optical head and the configuration of the recording/reproducing optical system.

Figure 35:
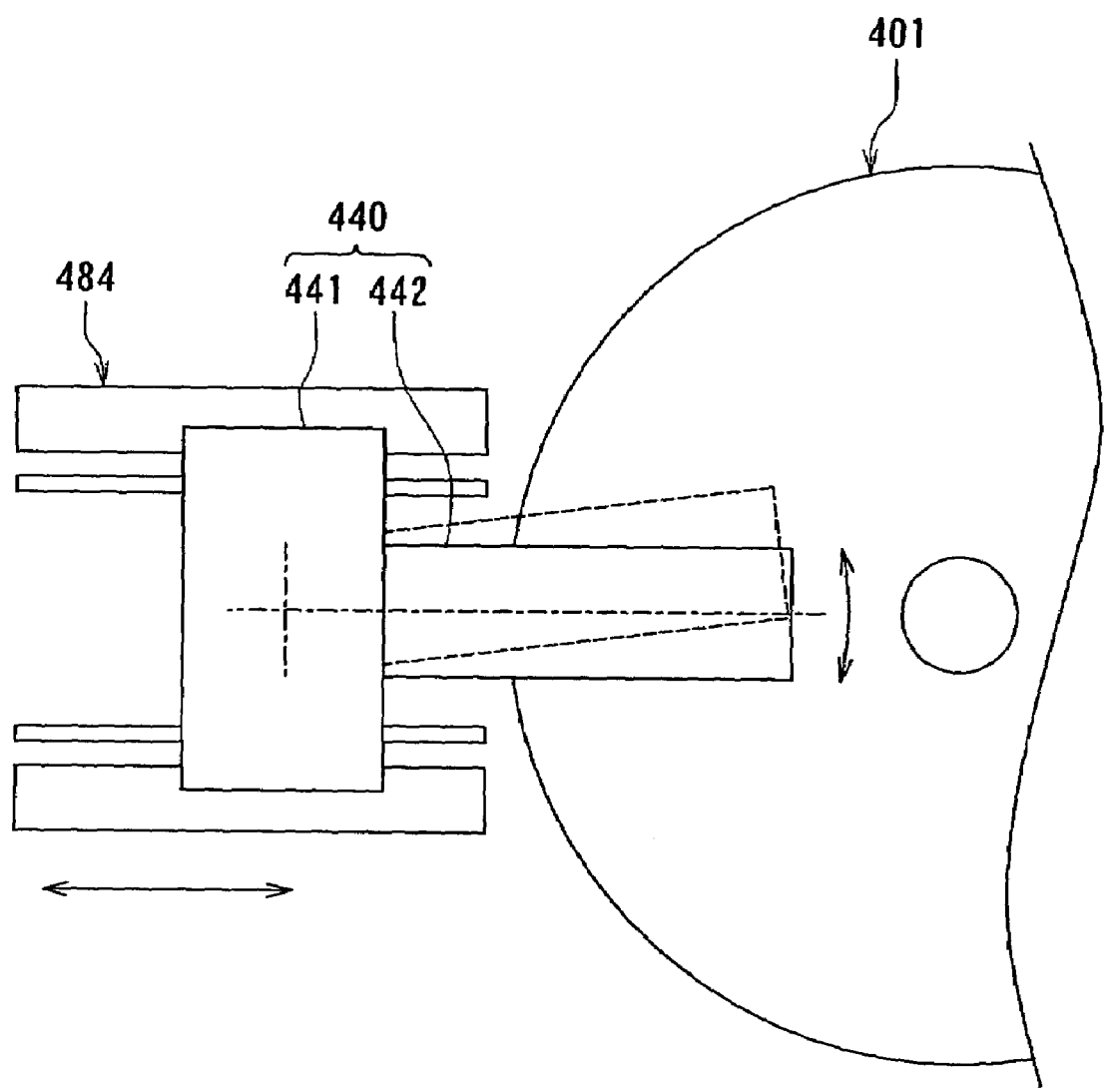
FIG. 35 is a plan view showing an optical head and a recording medium of a fifth embodiment of the invention.
Figure 36:
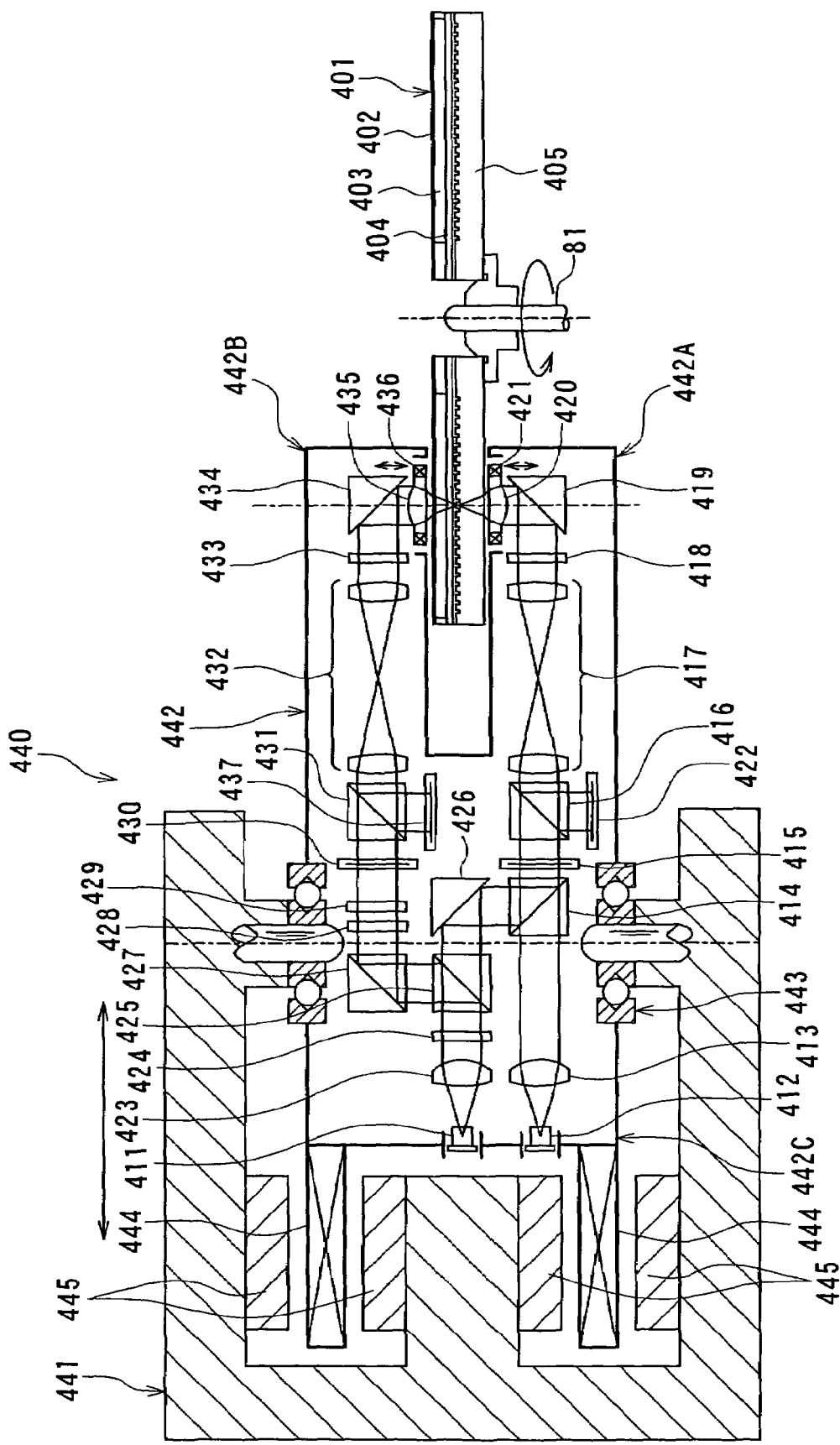
FIG. 36 is a cross-sectional view showing the configuration of the optical head of the fifth embodiment of the invention.
Figure 37:
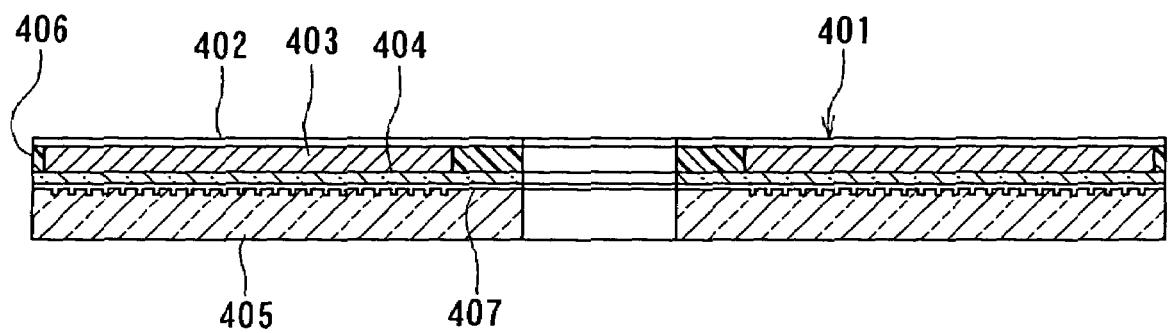
FIG. 37 is a cross-sectional view showing the configuration of a recording medium of the fifth embodiment of the invention.

FIG. 35 is a plan view showing the optical head and a recording medium of the present embodiment. FIG. 36 is a cross-sectional view showing the configuration of the optical head of the present embodiment. FIG. 37 is a cross-sectional view showing the configuration of the recording medium of the present embodiment.

As shown in FIG. 35 and FIG. 36, the optical information recording/reproducing apparatus according to the present embodiment has an optical head 440 and a driving device 484 instead of the optical head 40 and the driving device 84 in the optical information recording/reproducing apparatus 10 according to the first embodiment which is shown in FIG. 2. The present embodiment is not provided with the function of correcting the relative inclinations of a recording medium 401 to the optical head 440. Thus, the inclination correction circuit 93 shown in FIG. 2 is not provided. The circuit configuration of the optical information recording/reproducing apparatus according to the embodiment is otherwise the same as that of the optical information recording/reproducing apparatus 10 shown in FIG. 2.

The optical head 440 has a first movable portion 441 and a second movable portion 442. The first movable portion 441 is moved by the driving device 484 in a direction of the radius of the recording medium 401 of the present embodiment. The second movable portion 442 has a lower arm portion 442A to be placed under the recording medium 401, an upper arm portion 442B to be placed over the recording medium 401, and a coupling portion 442C for coupling the lower arm portion 442A and the upper arm portion 442B at a position outside the outer periphery of the recording medium 401. The extremities of the lower arm portion 442A and the upper arm portion 442B are located at opposite positions across the recording medium 401.

The coupling portion 442C is rotatably coupled to the first movable portion 441 via ball bearings 443. Two coils 444 for irradiating-position follow-up are attached to an end of the coupling portion 442C opposite from the lower arm portion 442A and the upper arm portion 442B. In the first movable portion 441, two magnets 445 are placed at opposite positions across each of the coils 444. In the optical head 440, the second movable portion 442 can be rotated with respect to the first movable portion 441 by means of the coils 444 and the magnets 445 so as to change the positions of the extremities of the lower arm portion 442A and the upper arm portion 442B in directions generally along the tracks of the recording medium 401.

Next, with reference to FIG. 36, description will be given of the configuration of the recording/reproducing optical system provided inside the second movable portion 442. The recording/reproducing optical system has a recording/reproducing semiconductor laser 411 and a servo semiconductor laser 412 which are fixed to an inside end of the coupling portion 442C opposite from the lower arm portion 442A and the upper arm portion 442B. The recording/reproducing optical system further has a collimator lens 413, a dichroic mirror 414, a phase spatial light modulator 415 of transmission type, a polarization beam splitter 416, a relay lens system 417, a quarter-wave plate 418, and a mirror 419 that are arranged in this order from the servo semiconductor laser 412 on the optical path of light emitted from the semiconductor laser 412. The dichroic mirror 414 has a reflecting surface which reflects light of predetermined wavelengths and transmits light of other wavelengths. This reflecting surface reflects the light emitted from the recording/reproducing semiconductor laser 411, and transmits the light emitted from the servo semiconductor laser 412. The polarization beam splitter 416 has a polarization beam splitter surface which reflects or transmits light depending on the direction of polarization of the light.

The recording/reproducing optical system further has an objective lens 420 which is disposed in the extremity of the lower arm portion 442A and faces the bottom surface of the recording medium 401, and an actuator 421 which moves the objective lens 420 in a direction perpendicular to the surface of the recording medium 401. The mirror 419 reflects light that is incident from the quarter-wave plate 418, and guides the light to the objective lens 420. The recording/reproducing optical system further has a photodetector 422 for receiving light that is incident on the polarization beam splitter 416 from the relay lens system 417 and reflected by the polarization beam splitter surface thereof.

The recording/reproducing optical system further has a collimator lens 423, a half-wave plate 424, a polarization beam splitter 425, and a mirror 426 that are arranged in this order from the recording/reproducing semiconductor laser 411 on the optical path of the light emitted from the semiconductor laser 411. The polarization beam splitter 425 has a polarization beam splitter surface. The mirror 426 reflects light incident from the polarization beam splitter 425, and guides the light to the reflecting surface of the dichroic mirror 414.

The recording/reproducing optical system further has a polarization beam splitter 427 disposed on the optical path of light that is incident on the polarization beam splitter 425 from the half-wave plate 424 and reflected by the polarization beam splitter surface thereof. The recording/reproducing optical system further has a shutter 428, a half-wave plate 429, a phase spatial light modulator 430 of transmission type, a polarization beam splitter 431, a relay lens system 432, a quarter-wave plate 433, and a mirror 434 that are arranged in this order from the polarization beam splitter 427 on the optical path of light that is incident from the polarization beam splitter 425 on the polarization beam splitter 427 and reflected by the polarization beam splitter surface thereof. The polarization beam splitter 431 has a polarization beam splitter surface.

The recording/reproducing optical system further has an objective lens 435 which is disposed in the extremity of the upper arm portion 442B and faces the top surface of the recording medium 401, and an actuator 436 which moves the objective lens 435 in a direction perpendicular to the surface of the recording medium 401. The mirror 434 reflects light that is incident from the quarter-wave plate 433, and guides the light to the objective lens 436. The recording/reproducing optical system further has a photodetector 437 for receiving light that is incident on the polarization beam splitter 431 from the relay lens system 432 and reflected by the polarization beam splitter surface thereof.

Next, with reference to FIG. 37, description will given of the configuration of the recording medium 401 of the present embodiment. The recording medium 401 is disk-shaped and has a plurality of tracks, like the recording medium 1 of the first embodiment. Each of the tracks has a plurality of address servo areas arranged at regular intervals. One or more information recording areas are provided between adjacent ones of the address servo areas.

The recording medium 401 comprises two disk-shaped transparent substrates 402 and 404 made of polycarbonate or the like, a spacer 406 for separating these transparent substrates 402 and 404 at a predetermined distance, an information recording layer 403 provided between the transparent substrates 402 and 404, and a transparent substrate 405 bonded to a surface of the transparent substrate 404 opposite from the information recording layer 403 via a bonding layer 407.

The information recording layer 403 is a layer in which information is recorded through the use of holography, and is made of a hologram material having sensitivity to light of a predetermined wavelength range. The recording/reproducing semiconductor laser 411 emits light having a wavelength to which the hologram material constituting the information recording layer 403 has sensitivity. The servo semiconductor laser 412 emits light having a wavelength that falls outside the wavelength range to which the hologram material constituting the information recording layer 403 has sensitivity. Possible combinations of wavelength of the light emitted from the recording/reproducing semiconductor laser 411 and the wavelength of the light emitted from the servo semiconductor laser 412 include a combination of 650 nm and 780 nm, a combination of 523 nm and 650 nm, and a combination of 405 nm and 650 nm.

In the address servo areas, emboss pits for expressing address information and the like are formed at a surface of the transparent substrate 405 closer to the transparent substrate 404. Focus servo may also be performed by using the surface of the transparent substrate 405 closer to the transparent substrate 404.

In the recording medium 401, the total optical thickness of the transparent substrate 402, the information recording layer 403, the transparent substrate 404, and the bonding layer 407 is equal to the optical thickness of the transparent substrate 405.

In the recording medium 401, the surface of the transparent substrate 405 opposite from the transparent substrate 404 (the bottom surface in FIG. 37) serves as the surface on which recording-specific reference light and reproduction-specific reference light are incident and from which reproduction light is emitted. The surface of the transparent substrate 402 opposite from the information recording layer 403 (the top surface in FIG. 37) serves as the surface on which information light that carries information to be recorded is incident.

Servo, information recording, and information reproducing operations of the optical head 440 in the present embodiment will now be separately described in succession. Initially, description will be given of the servo operation. During the servo operation, the servo semiconductor laser 412 emits light, whereas the recording/reproducing semiconductor laser 411 will not emit light. The servo semiconductor laser 412 emits P-polarized light. The light emitted from the semiconductor laser 412 is collimated by the collimator lens 413, is transmitted through the reflecting surface of the dichroic mirror 414, passes through the phase spatial light modulator 415, is transmitted through the polarization beam splitter surface of the polarization beam splitter 416, passes through the relay lens system 417, and passes through the quarter-wave plate 418 to become circularly-polarized light. This light is reflected by the mirror 419 to impinge on the objective lens 420, and is collected by the objective lens 420. Then, the light is applied to the recording medium 401 while converging to become minimum in diameter on the surface of the transparent substrate 405 closer to the transparent substrate 404.

The light applied to the recording medium 401 from the objective lens 420 is reflected by the surface of the transparent substrate 405 closer to the transparent substrate 404 to cause return light. The return light is collimated through the objective lens 420, reflected by the mirror 419, and passes through the quarter-wave plate 418 to become S-polarized light. This light passes through the relay lens system 417 and is reflected by the polarization beam splitter surface of the polarization beam splitter 416 to impinge on the photodetector 422. Based on the output of the photodetector 422, a focus error signal on the objective lens 420 is obtained by the same method as that described in conjunction with FIG. 11, for example. Based on this focus error signal, the actuator 421 adjusts the position of the objective lens 420 to effect focus servo on the objective lens 420.

The light that has been applied to the recording medium 401 from the objective lens 420 and has passed through the recording medium 401 is collimated through the objective lens 435, reflected by the mirror 434, and passes through the quarter-wave plate 433 to become S-polarized light. This light passes through the relay lens system 432 and is reflected by the polarization beam splitter surface of the polarization beam splitter 431 to impinge on the photodetector 437. Based on the output of the photodetector 437, a focus error signal on the objective lens 435 is obtained by the same method as that described in conjunction with FIG. 11, for example. Based on this focus error signal, the actuator 436 adjusts the position of the objective lens 435 to effect focus servo on the objective lens 435.

Figure 13:
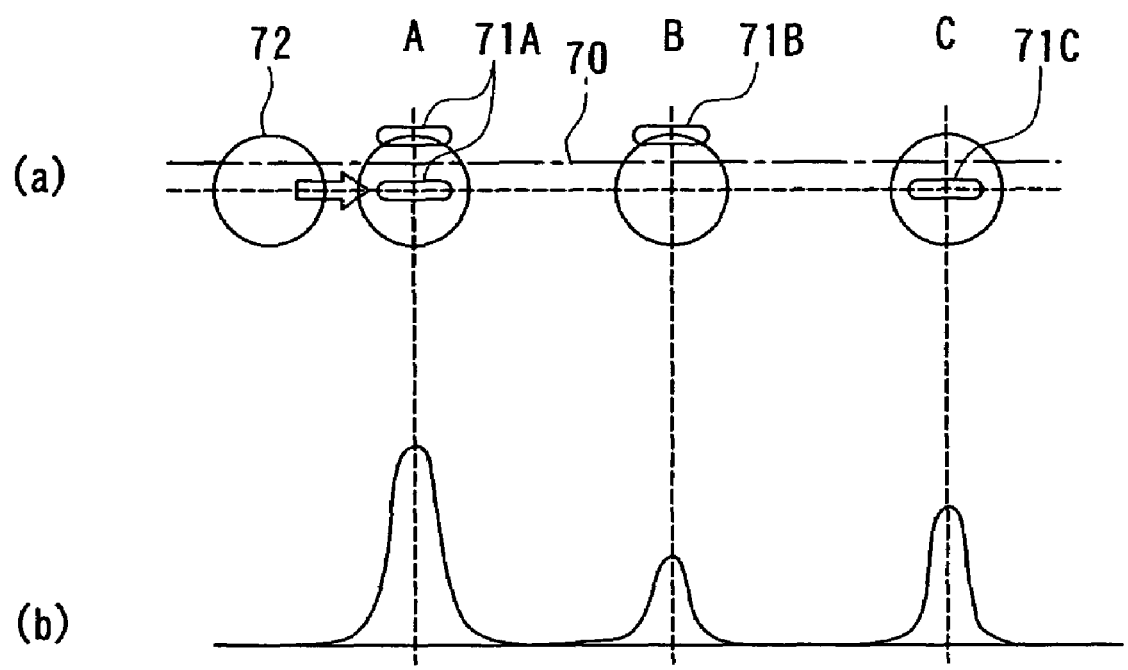
FIG. 13 is an explanatory diagram for explaining an example of the method for producing tracking error information and the method for tracking servo in the first embodiment of the invention.

Based on the output of at least either one of the photodetectors 422 and 437, a tracking error signal is obtained by the same method as that described in conjunction with FIG. 12 and FIG. 13, for example. In addition, based on the output of at least either one of the photodetectors 422 and 437, a basic clock is generated and addresses are recognized.

Next, description will be given of an information recording operation. At the time of recording, the recording/reproducing semiconductor laser 411 emits light, whereas the servo semiconductor laser 412 will not emit light. During the recording operation, the shutter 428 is brought into a transmitting state. The phase spatial light modulator 430 selects the phase of outgoing light from between two values or from among three or more values for each pixel based on the information to be recorded, thereby modulating the phase of the light spatially to generate information light. The phase spatial light modulator 415 selects the phase of outgoing light from between two values or from among three or more values for each pixel in accordance with a predetermined modulation pattern, thereby modulating the phase of the light spatially to generate recording-specific reference light.

The controller 90 supplies the information on the modulation pattern selected by itself in accordance with predetermined conditions or the modulation pattern selected by the operating portion 91 to the phase spatial light modulator 415, and the phase spatial light modulator 415 spatially modulates the phase of light passing therethrough in accordance with the information on the modulation pattern supplied by the controller 90. The power of the light emitted by the recording/reproducing semiconductor laser 411 is set to reach high levels on a pulse basis suitable for recording. Under the control of the controller 90, while the light that has exited the objective lenses 420 and 435 passes through an area other than the address servo areas, neither focus servo nor tracking servo is performed.

The recording/reproducing semiconductor laser 411 emits P-polarized or S-polarized light. The light emitted from the semiconductor laser 411 passes through the half-wave plate 424 to become light that contains a P-polarized component and an S-polarized component. The light of the P-polarized component from the half-wave plate 424 is transmitted through the polarization beam splitter surface of the polarization beam splitter 425, reflected by the mirror 426, and reflected by the reflecting surface of the dichroic mirror 414. This light passes through the phase spatial light modulator 415 to become recording-specific reference light. This recording-specific reference light is transmitted through the polarization beam splitter surface of the polarization beam splitter 416, passes through the relay lens system 417, and passes through the quarter-wave plate 418 to become circularly-polarized light. This recording-specific reference light is reflected by the mirror 419 to impinge on the objective lens 420, and is collected by the objective lens 420. Then, the light is applied to the recording medium 401 while converging to become minimum in diameter on the surface of the transparent substrate 405 closer to the transparent substrate 404. The recording-specific reference light passes through the information recording layer 403 in the recording medium 401 while diverging.

Meanwhile, the light of the S-polarized component from the half-wave plate 424 is reflected by the polarization beam splitter surface of the polarization beam splitter 425, and further reflected by the polarization beam splitter surface of the polarization beam splitter 427. Then, it passes through the shutter 428 and through the half-wave plate 429 to become P-polarized light. This light passes through the phase spatial light modulator 430 to become information light. This information light is transmitted through the polarization beam splitter surface of the polarization beam splitter 431, passes through the relay lens system 432, and passes through the quarter-wave plate 433 to become circularly-polarized light. This information light is reflected by the mirror 434 to impinge on the objective lens 435, and is collected by the objective lens 435. Then, the light is applied to the recording medium 401 while converging to become minimum in diameter on the surface of the transparent substrate 405 closer to the transparent substrate 404. The information light passes through the information recording layer 403 in the recording medium 401 while converging.

In the present embodiment, the optical length of the optical path that leads from the recording/reproducing semiconductor laser 411 to the objective lens 420 is equal to the optical length of the optical path that leads from the recording/reproducing semiconductor laser 411 to the objective lens 435.

The information light and the recording-specific reference light interfere with each other to form an interference pattern in the information recording layer 403. When the power of the light emitted by the semiconductor laser 411 has reached a high level suitable for recording, the interference pattern is volumetrically recorded in the information recording layer 403 to form a reflection-type (Lippmann-type) hologram.

Next, description will be given of an information reproducing operation. At the time of reproduction, the recording/reproducing semiconductor laser 411 emits light, whereas the servo semiconductor laser 412 will not emit light. During the reproducing operation, the shutter 428 is brought into a blocking state. The phase spatial light modulator 415 selects the phase of outgoing light from between two values or from among three or more values for each pixel in accordance with a predetermined modulation pattern, thereby modulating the phase of the light spatially to generate reproduction-specific reference light. The reproduction-specific reference light follows the same path as with the recording-specific reference light, and is applied to the recording medium 401 while converging to become minimum in diameter on the surface of the transparent substrate 405 closer to the transparent substrate 404. The reproduction-specific reference light passes through the information recording layer 403 in the recording medium 401 while diverging.

Upon application of the reproduction-specific reference light, reproduction light that corresponds to the information light used for recording is generated in the information recording layer 403. This reproduction light has a spatially modulated phase, as with the information light used for recording. The reproduction light travels toward the transparent substrate 405 while converging, becomes minimum in diameter on the surface of the transparent substrate 405 closer to the transparent substrate 404, and exits the recording medium 401 while diverging. Then, the light is collimated through the objective lens 420, reflected by the mirror 419, and passes through the quarter-wave plate 418 to become S-polarized light. This reproduction light passes through the relay lens system 417, and is reflected by the polarization beam splitter surface of the polarization beam splitter 416 to impinge on the photodetector 422.

Part of the reproduction-specific reference light applied to the recording medium 401 is reflected by the surface of the transparent substrate 405 closer to the transparent substrate 404, and exits the recording medium 401 while diverging.

Then, the light is collimated through the objective lens 420, reflected by the mirror 419, and passes through the quarter-wave plate 418 to become S-polarized light. This reproduction light passes through the relay lens system 417, and is reflected by the polarization beam splitter surface of the polarization beam splitter 416 to impinge on the photodetector 422.

In reality, the reproduction light is superimposed on the reproduction-specific reference light that is reflected by the surface of the transparent substrate 405 closer to the transparent substrate 404 to generate composite light, and this composite light is received by the photodetector 422. The composite light has an intensity that is spatially modulated according to the information recorded. Thus, the photodetector 422 detects a two-dimensional intensity pattern of the composite light, from which the information is reproduced.

The principles of information recording and reproduction in the present embodiment are the same as those of the fourth embodiment.

In the present embodiment, the actuators 421 and 436 can change the positions of the objective lenses 420 and 435 in a direction perpendicular to the surface of the recording medium 401, thereby effecting focus servo. In addition, in the present embodiment, the driving device 484 shown in FIG. 35 can move the entire optical head 440 in a direction of the radius of the recording medium 401 to change the positions of the objective lenses 420 and 435 in the direction of the radius of the recording medium 401. This allows access to desired tracks and tracking servo. Furthermore, in the present embodiment, the second movable portion 442 is rotatably moved by the coils 444 and the magnets 445 with respect to the first movable portion 441, so that the positions of the objective lenses 420 and 435 are changed in a direction generally along the tracks. This allows such control that the irradiating position of the information light and the recording-specific reference light follows the information recording areas. In this control, as with the first embodiment, such driving voltages as shown in FIG. 16(b) may be supplied to the coils 444 to change the positions of the objective lenses 420 and 435 as in FIG. 16(a). The positions of the objective lenses 420 and 435 may also be changed by a simpler method as described below.

Figure 38:
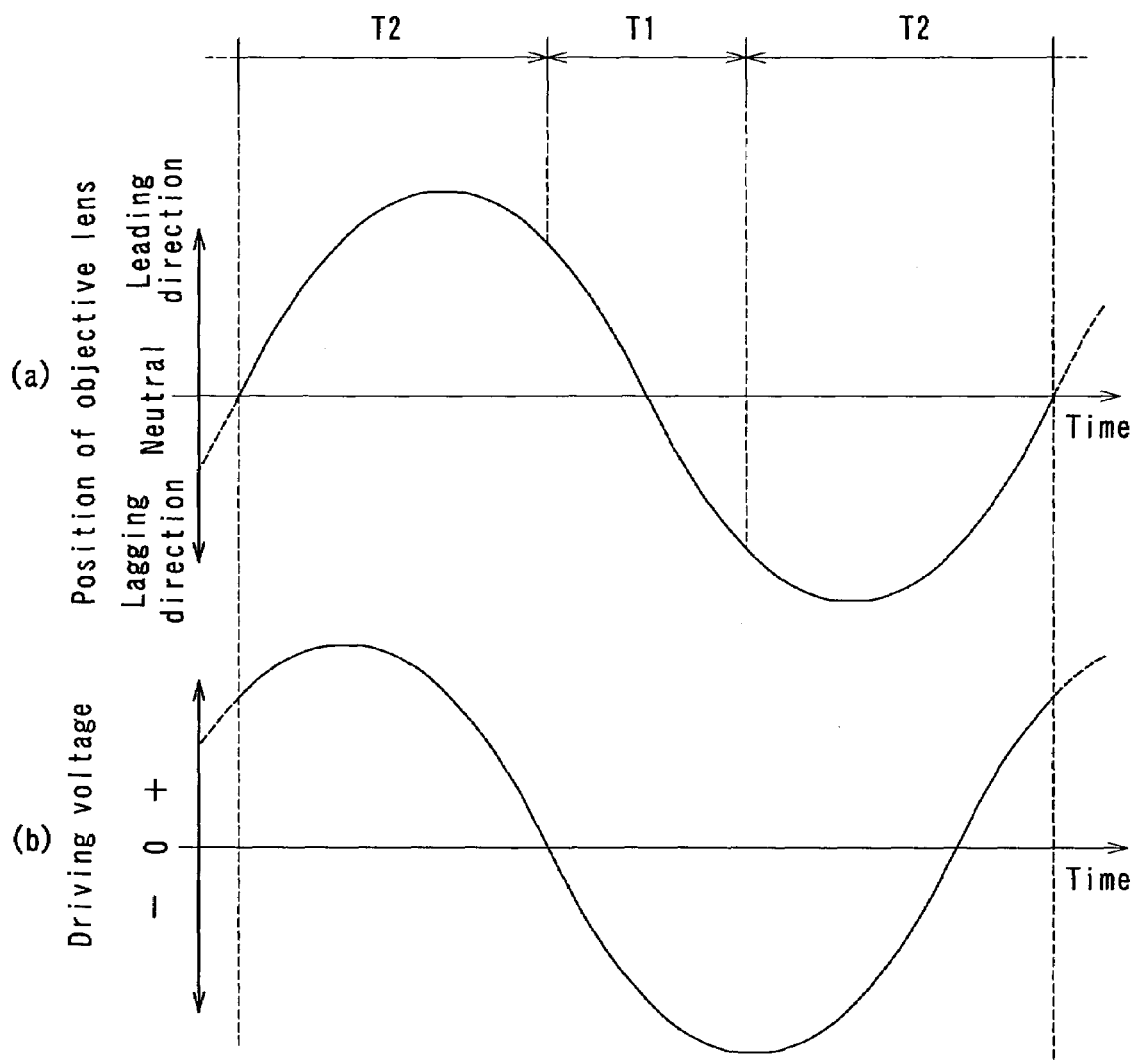
FIG. 38 is an explanatory diagram showing an example of changes in the position of the objective lens and changes in the driving voltage for moving the positions of the objective lenses in a direction tangential to the tracks in the fifth embodiment of the invention.

Here, with reference to FIG. 38, description will be given of the simpler method for changing the positions of the objective lenses 420 and 435. FIG. 38 shows an example of changes in the positions of the objective lenses 420, 435 and changes in the driving voltage of the coils 444. In FIG. 38, (a) shows changes in the positions of the objective lenses 420 and 435, and (b) shows changes in the driving voltage. In this method, as shown in FIG. 38(a), the positions of the objective lenses 420 and 435 are put into simple harmonic motion about a neutral position. Then, in this method, the period where the moving speed of the positions of the objective lenses 420 and 435 becomes nearly equal to the moving speed of the information recording areas in the recording medium 401 shall be referred to as a follow-up period T1. The other period shall be referred to as a catch-up period T2.

The positions of the objective lenses 420 and 435 can be changed as shown in FIG. 38(a) by using the driving voltage that traces a sine wave as shown in FIG. 38(b). Such a driving voltage can be generated easily by configuring an oscillating circuit and a resonant circuit. When a plurality of information recording areas are provided between two adjacent address servo areas, an information recording area for the positions of the objective lenses 420 and 435 to follow up is selectable by controlling the phase of the driving voltage.

The simplified control method shown in FIG. 38 may also be used in the first to fourth embodiments.

The remainder of the configuration, operations, and effects of the present embodiment are the same as those of the fourth embodiment.

The present invention is not limited to the foregoing embodiments but may be modified in various ways. For example, the invention is applicable not only to the apparatuses that record information on a rotating disk-shaped recording medium, but to ones that record information on such a recording medium as card-shaped one which moves linearly.

In the foregoing embodiments, the address information and the like are recorded in advance in the form of emboss pits in the address servo areas of the recording medium. However, the address information and the like may be recorded in the following manner without providing the emboss pits in advance. In this case, the information recording layer is irradiated with high-power laser light selectively at a portion closer to one of its surfaces. The portion is thereby selectively changed in refractive index so that address information and the like are recorded for formatting.

As has been described, in the optical information recording apparatus or method of the invention, the irradiating position of the information light and the reference light is moved so as to follow a single moving information recording area for a predetermined period. As a result, the single information recording area is kept being irradiated with the information light and the reference light for the predetermined period. Therefore, according to the invention, it is possible to irradiate the information recording areas with the information light and the reference light for a sufficient time period to record information in the information recording areas without causing a deviation between the information recording areas and the irradiating position of the information light and the reference light. Consequently, according to the invention, it is possible to record information in each information recording area of a recording medium having a plurality of information recording areas through the use of holography with a practical light source, while moving the recording medium.

The optical information recording apparatus of the invention may comprise a detector for detecting identification information for identifying the individual information recording areas. In this case, it becomes easy to identify the individual information recording areas.

The optical information recording apparatus of the invention may comprise a detector for detecting positioning information for adjusting the irradiating position of the information light and the reference light with respect to the individual information recording areas. In this case, it becomes easy to adjust the irradiating position of the information light and the reference light with respect to the individual information recording areas.

In the optical information recording apparatus of the invention, the information light and the reference light may be applied to the same side of the information recording area coaxially so as to converge to become minimum in diameter at an identical position. In this case, the optical system for recording can be simplified in configuration.

In the optical information recording apparatus of the invention, the information light and the reference light may be applied to opposite sides of the information recording area coaxially so as to converge to become minimum in diameter at an identical position. In this case, the optical system for recording can be simplified in configuration.

It is apparent from the foregoing description that the invention may be carried out in various modes and may be modified in various ways. It is therefore to be understood that within the scope of equivalence of the appended claims the invention may be practiced in modes other than the foregoing best modes.

The invention claimed is:

1. An optical information recording apparatus for recording information through the use of holography in an information recording layer of a recording medium, comprising:
    an optical head for irradiating the recording medium with information light and reference light such that information is recorded in the information recording layer in the form of interference patterns resulting from interference between the information light and the reference light;
    a recording medium moving device for moving the recording medium; and
    an irradiating position moving device for moving an irradiating position of the information light and the reference light such that the irradiating position of the information light and the reference light follows a predetermined position of the information recording layer for a predetermined period; wherein
    the irradiating position moving device moves the optical head such that the moving speed of the irradiating position is lower than the moving speed of the predetermined position before the irradiating position overlaps the predetermined position, and the moving speed of the irradiating position is adjusted to become equal to the moving speed of the predetermined position when the irradiating position overlaps the predetermined position.

2. An optical information recording apparatus according to claim 1, wherein the recording medium moving device rotates the recording medium.

3. An optical information recording apparatus according to claim 1, wherein the irradiating position moving device moves the position of emission of the information light and the reference light in the optical head.

4. An optical information recording apparatus according to claim 1, wherein the recording medium contains identification information for identifying the individual information recording position of the information recording layer,
    the optical information recording apparatus further comprising a detector for detecting the identification information.

5. An optical information recording apparatus according to claim 1, wherein the recording medium contains positioning information for adjusting the irradiating position of the information light and the reference light with respect to the individual information recording position of the information recording layer,
    the optical information recording apparatus further comprising a detector for detecting the positioning information.

6. An optical information recording apparatus according to claim 1, wherein the optical head applies the information light and the reference light to the same side of the information recording layer coaxially such that they converge to become minimum in diameter at an identical position.

7. An optical information recording apparatus according to claim 1, wherein the optical head applies the information light and the reference light to opposite sides of the information recording layer coaxially such that they converge to become minimum in diameter at an identical position.

8. An optical information recording method for recording information through the use of holography in an information recording layer of a recording medium, comprising the steps of:

moving the recording medium;

irradiating the recording medium with information light and reference light from an optical head such that information is recorded in the information recording layer in the form of interference patterns resulting from interference between the information light and the reference light; and moving an irradiating position of the information light and the reference light such that the irradiating position of the information light and the reference light follows a predetermined position of the information recording layer for a predetermined period; wherein the irradiating position is moved at a speed lower than the moving speed of the predetermined position before the irradiating position overlaps the predetermined position, and then at a constant speed that is equal to the predetermined position when the irradiating position overlaps the predetermined position by moving the optical head.

* * * * *